Figures 50, 51, 52:
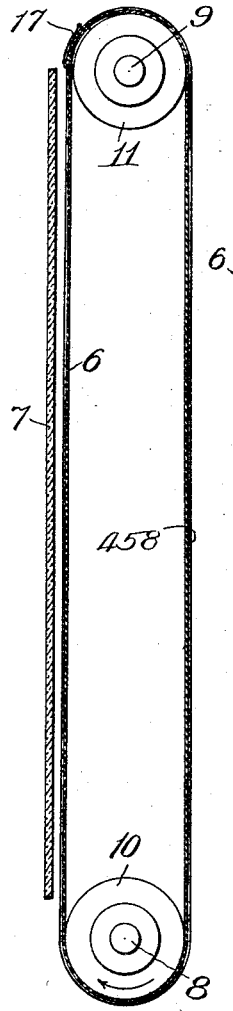

T. P. CAULKINS.
VOTING MACHINE.
APPLICATION FILED NOV. 7, 1910.
1,148,575.
Patented Aug. 3, 1915.
26 SHEETS—SHEET 1.
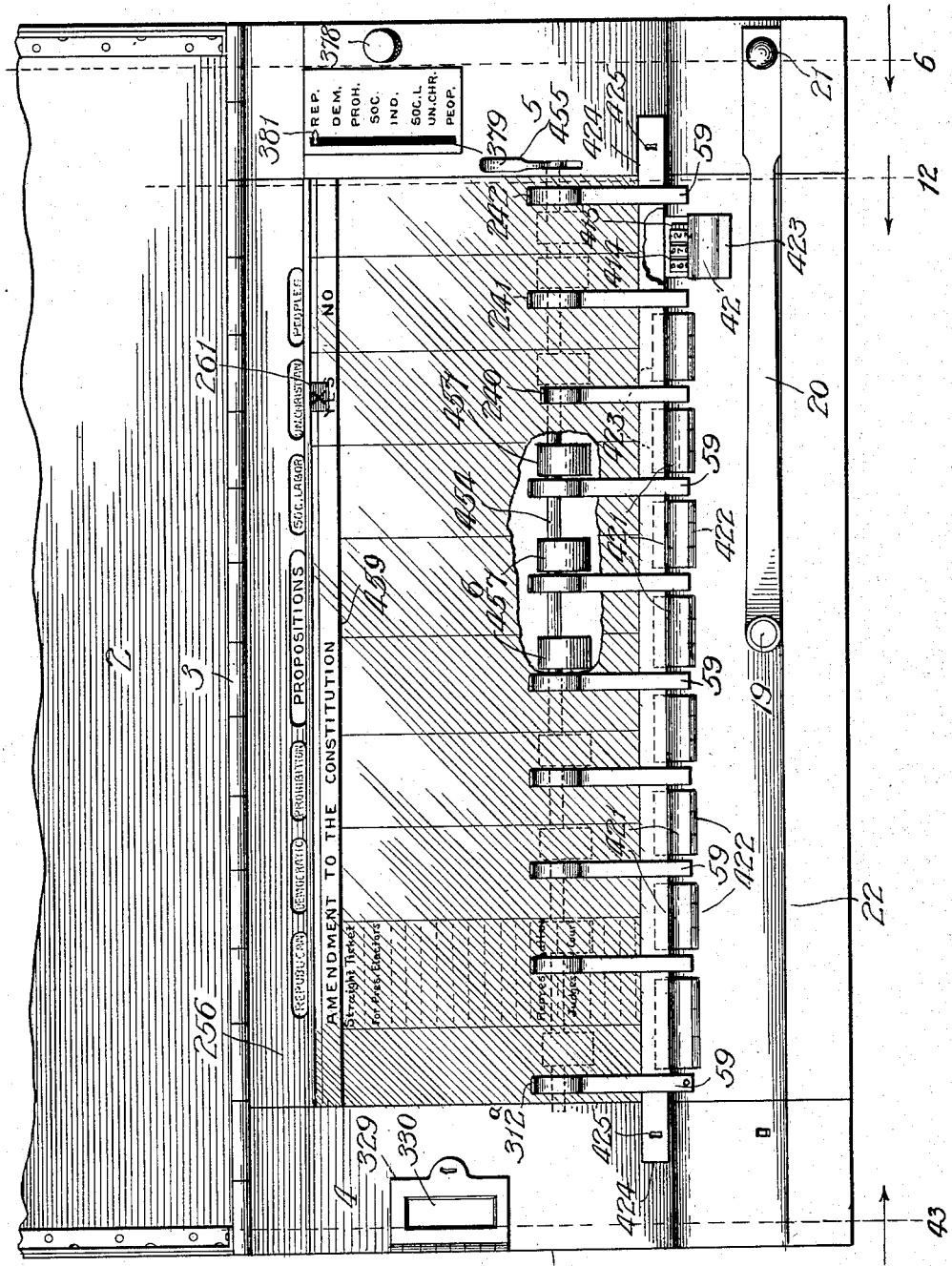

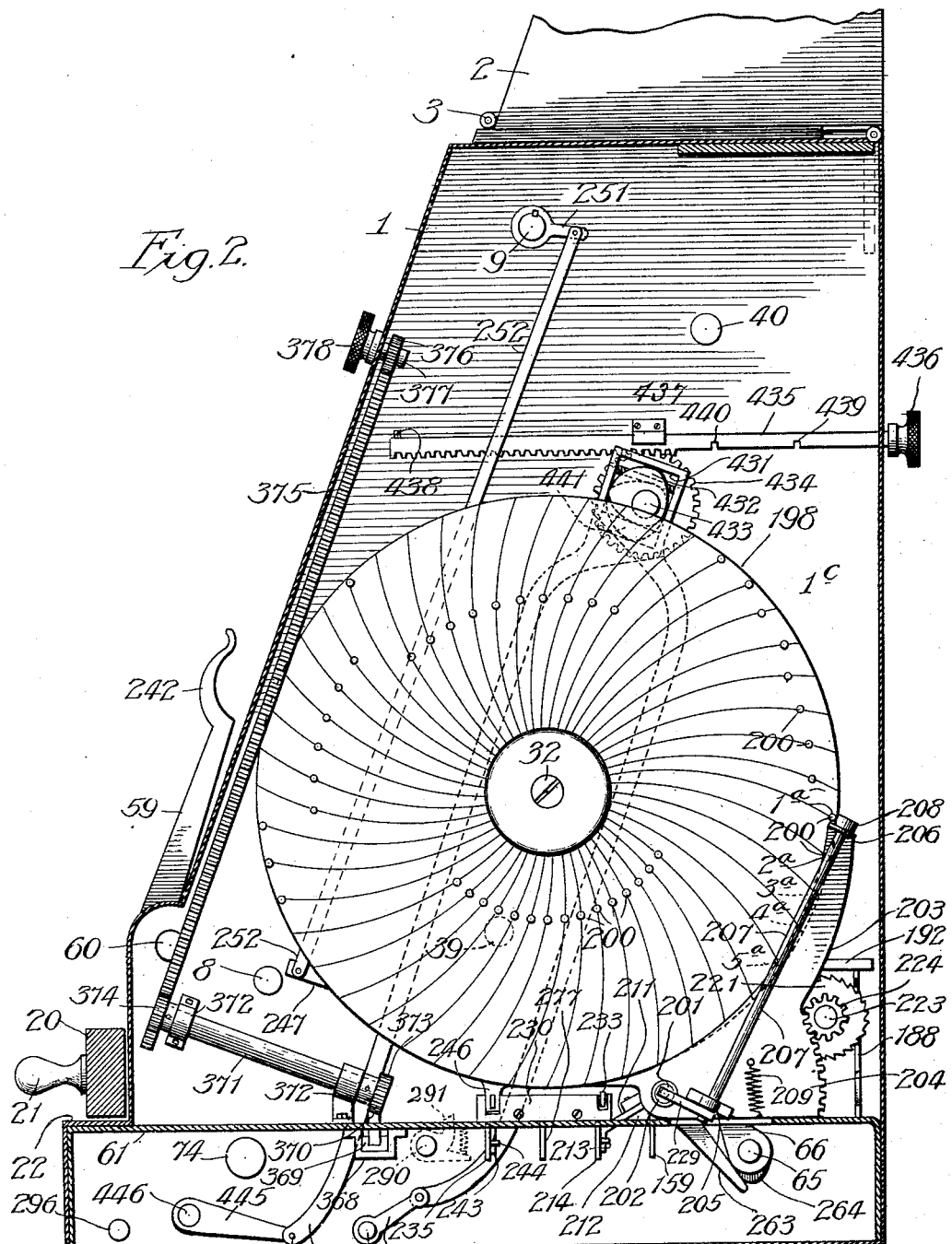

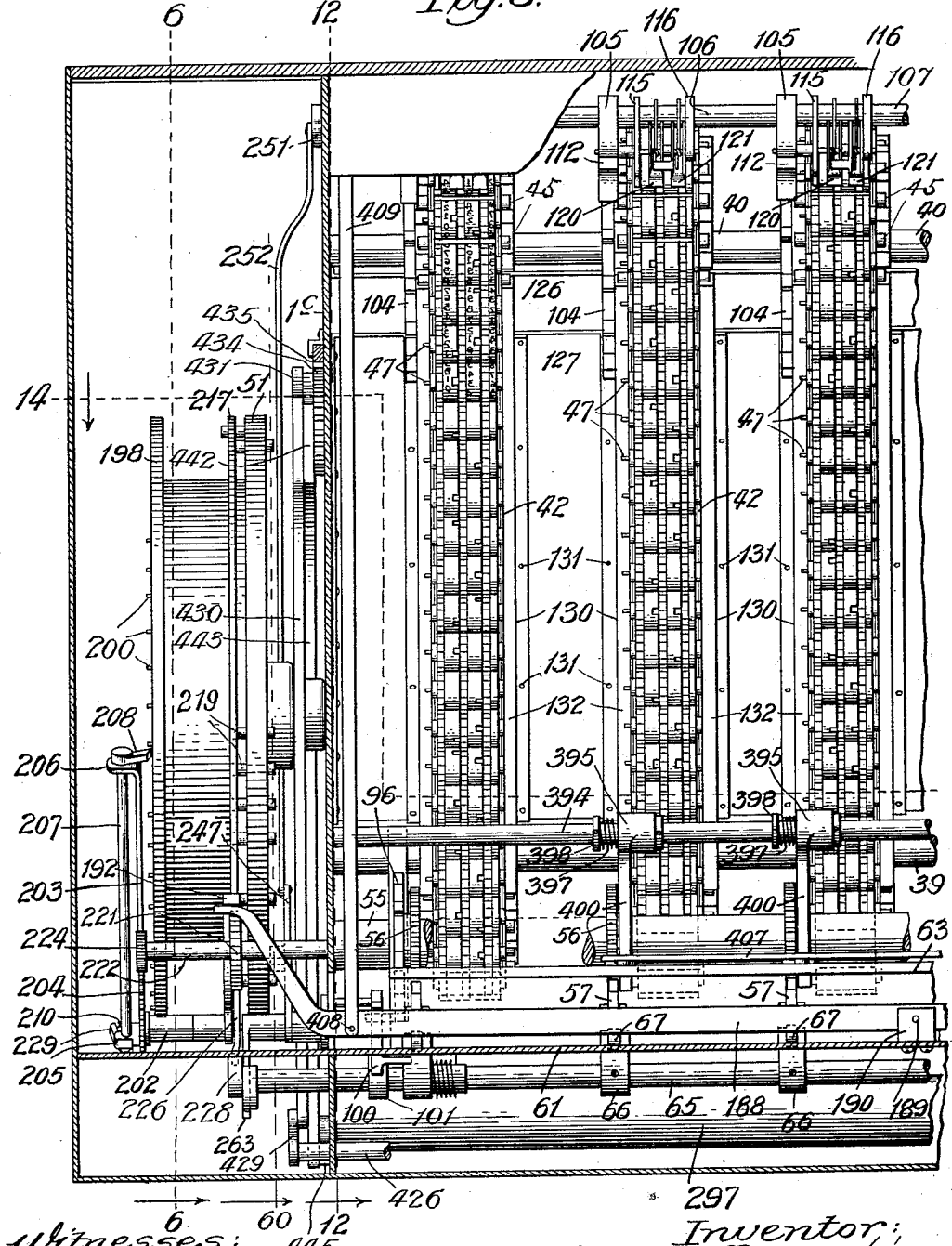

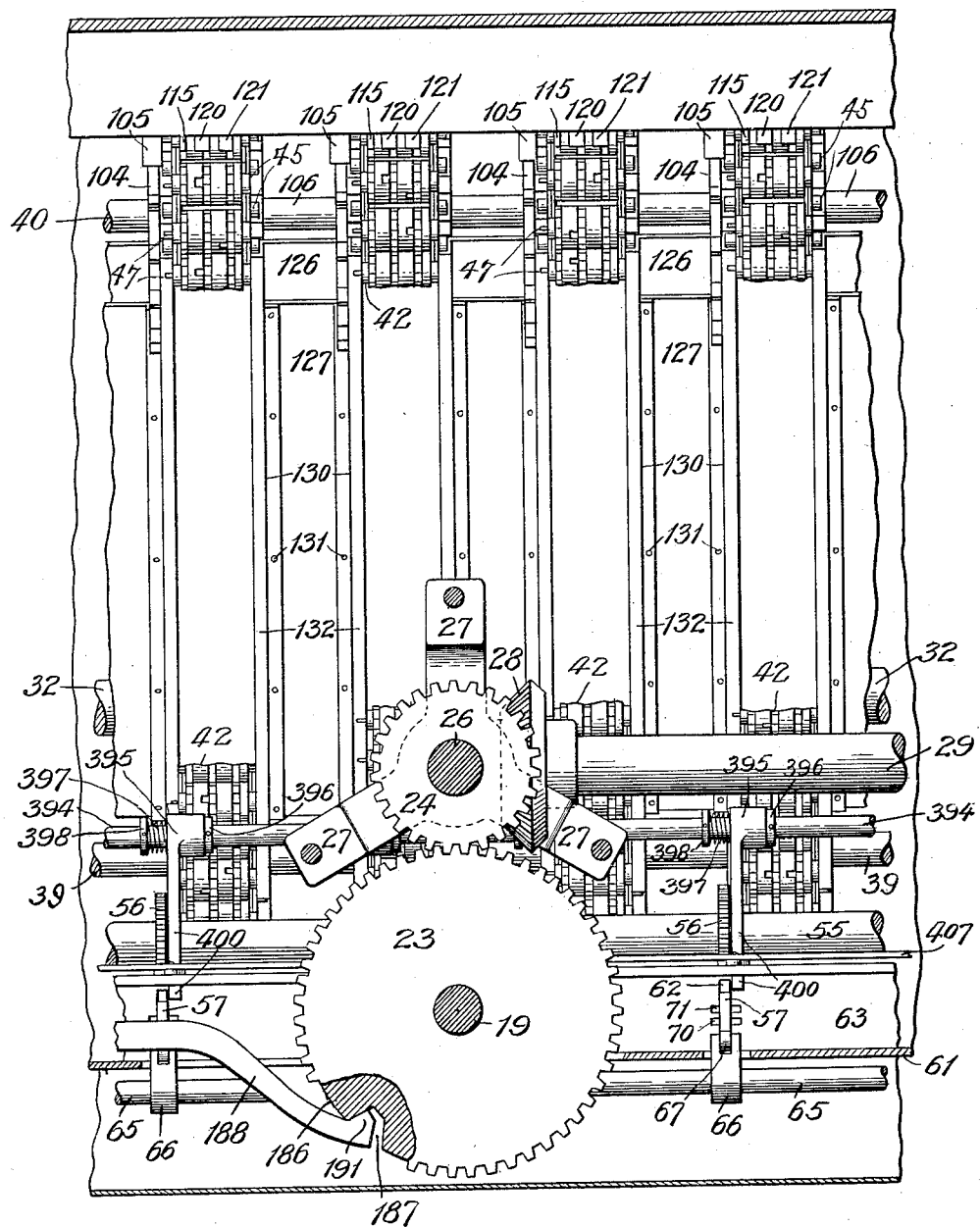

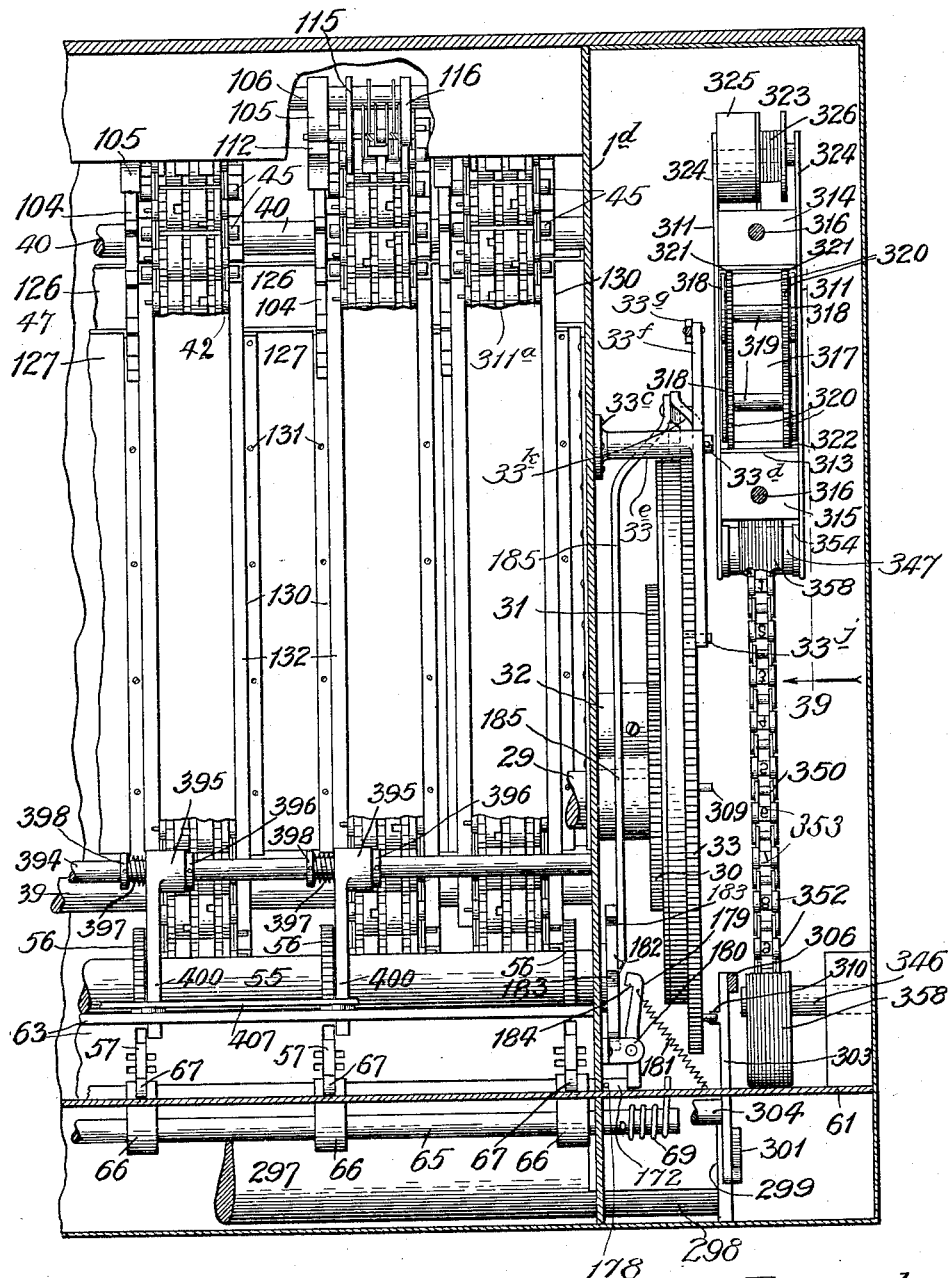

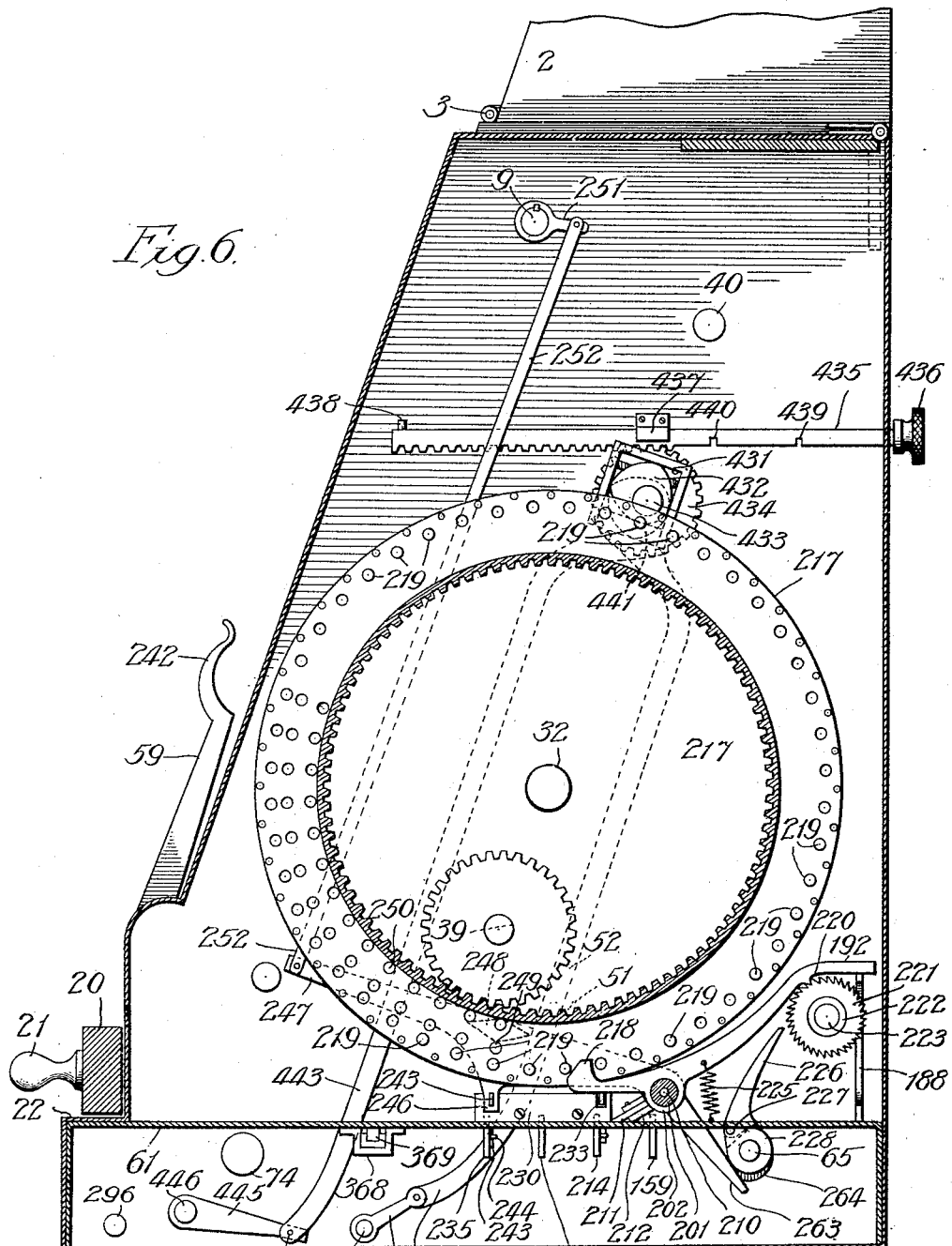

T. P. CAULKINS.
VOTING MACHINE.
APPLICATION FILED NOV. 7, 1910.
1,148,575.
Patented Aug. 3, 1915.
26 SHEETS—SHEET 7.
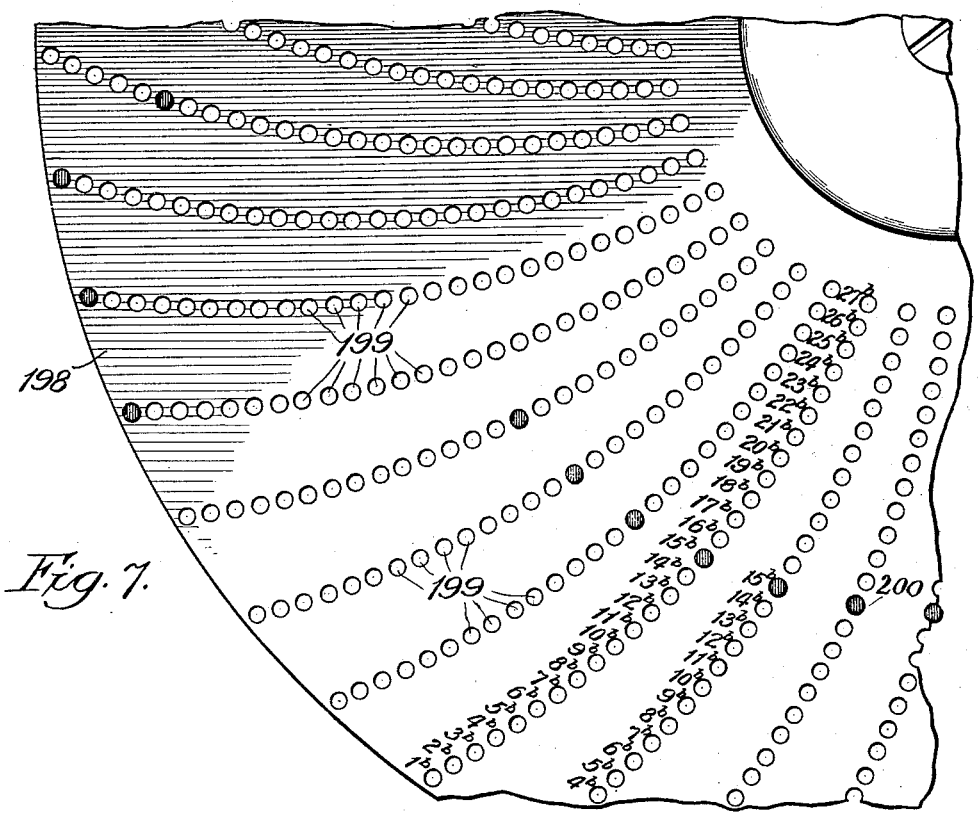
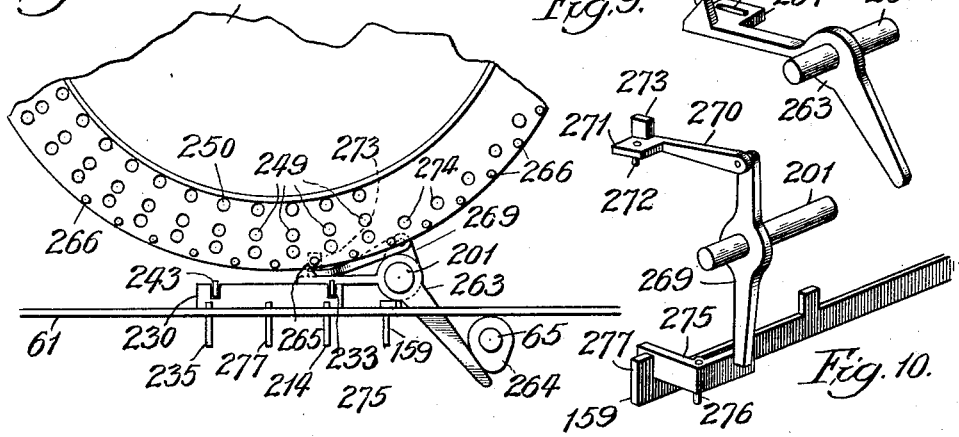
Witnesses:
John Enders
Chas. H. Buell
Inventor:
Theodore P. Caulkins
By David H. Fletcher
Atty.

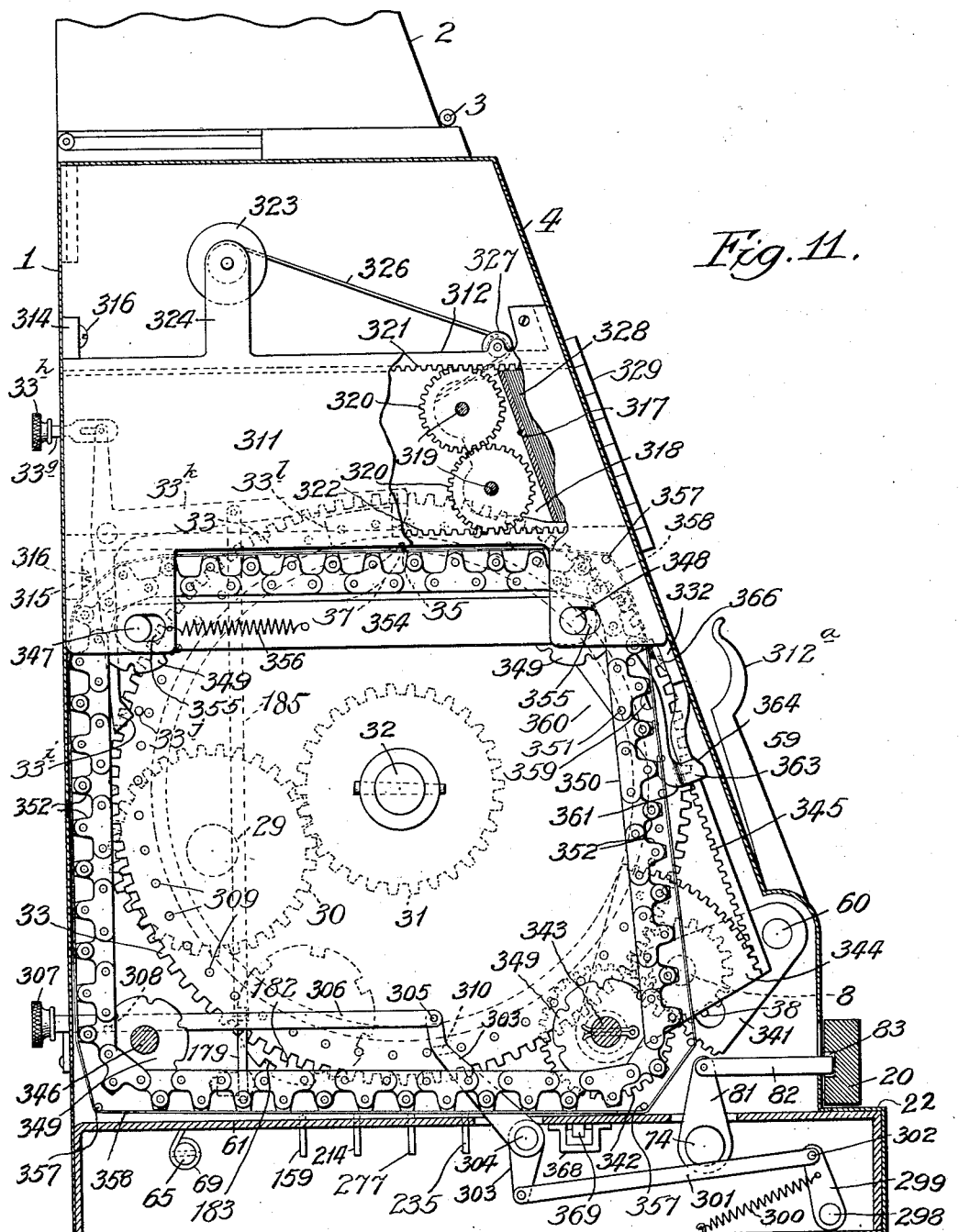

T. P. CAULKINS.
VOTING MACHINE.
APPLICATION FILED NOV. 7, 1910.
1,148,575.
Patented Aug. 3, 1915.
26 SHEETS—SHEET 9.
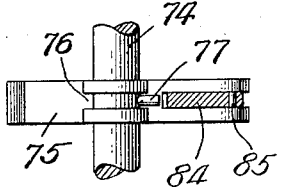
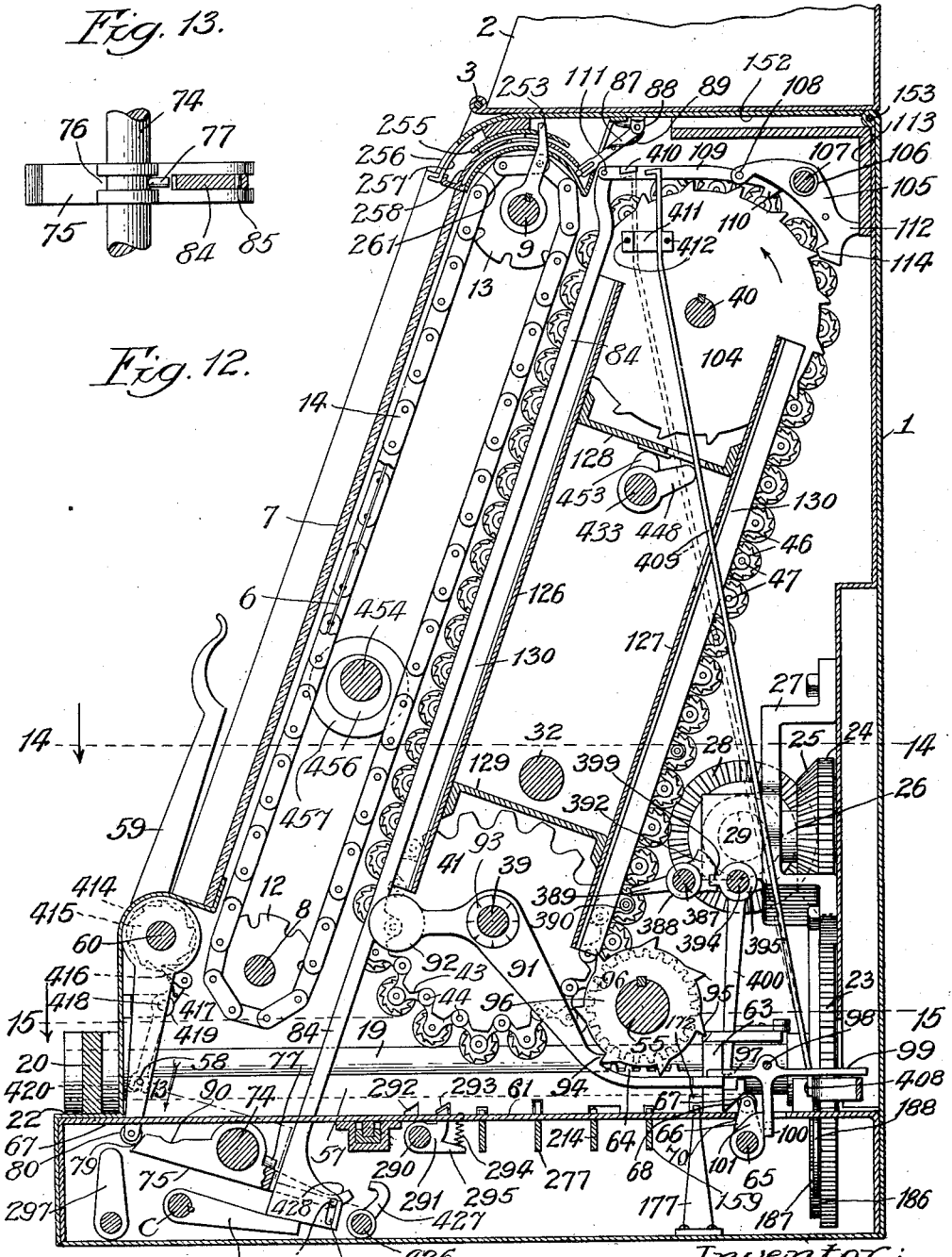

T. P. CAULKINS.
VOTING MACHINE.
APPLICATION FILED NOV. 7, 1910.
1,148,575.
Patented Aug. 3, 1915.
26 SHEETS—SHEET 10.
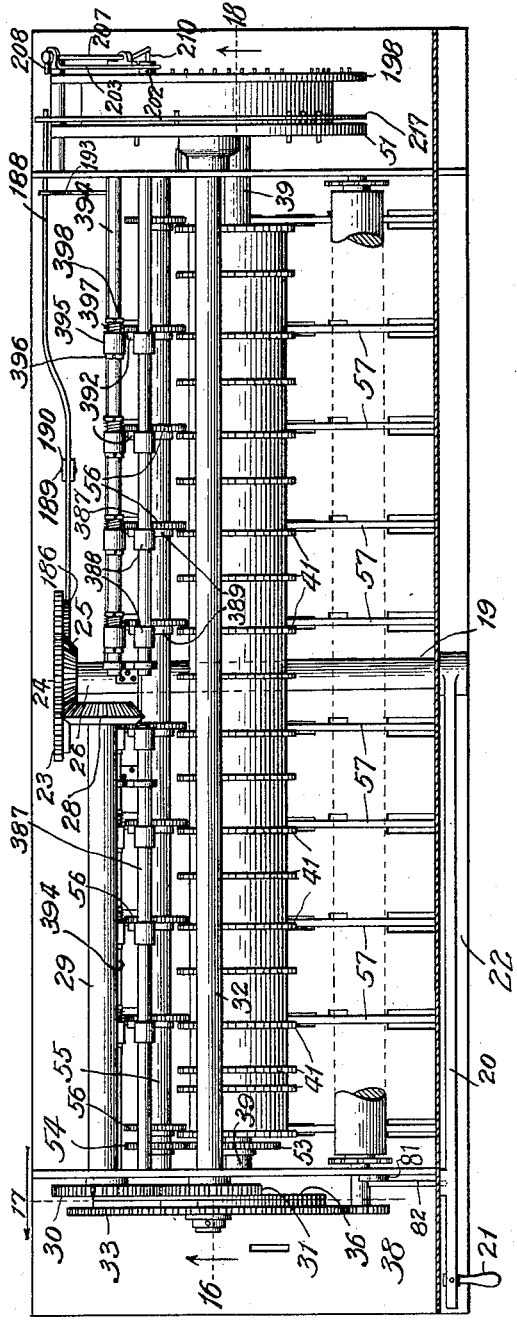
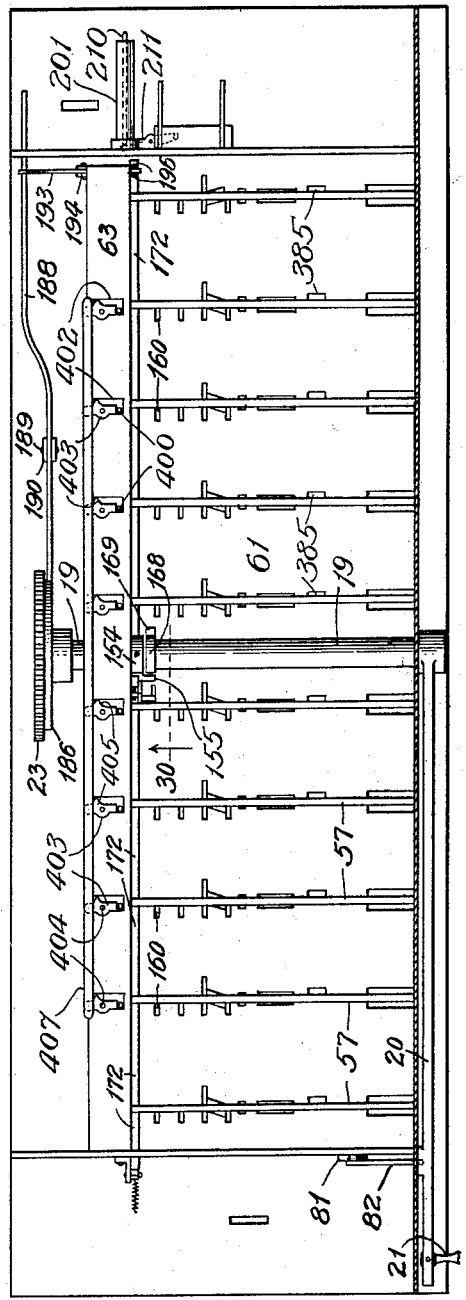
Witnesses:
John Enders
Chas. H. Buell
Inventor:
Theodore P. Caulkins
By David N. Fletcher.
Atty.

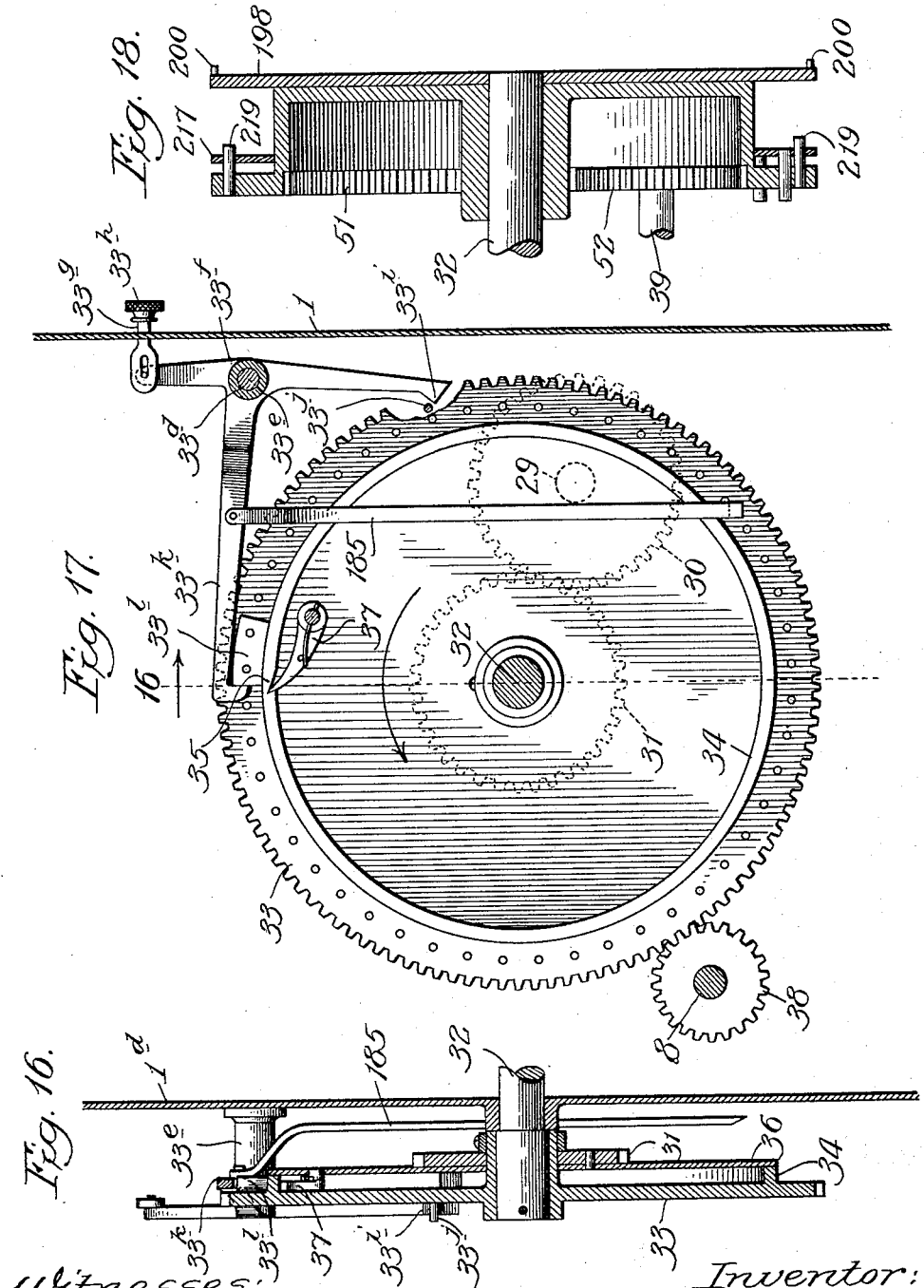

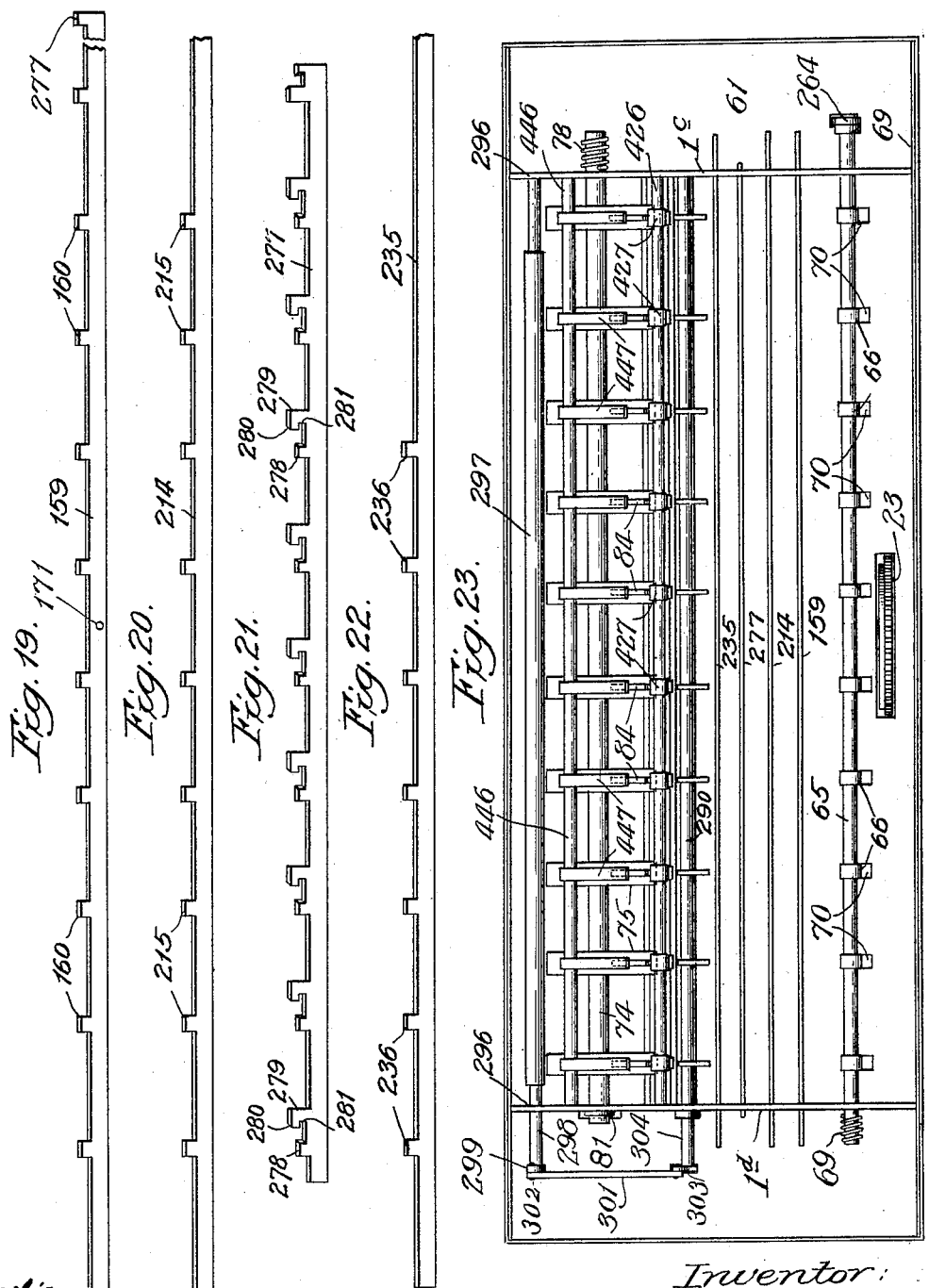

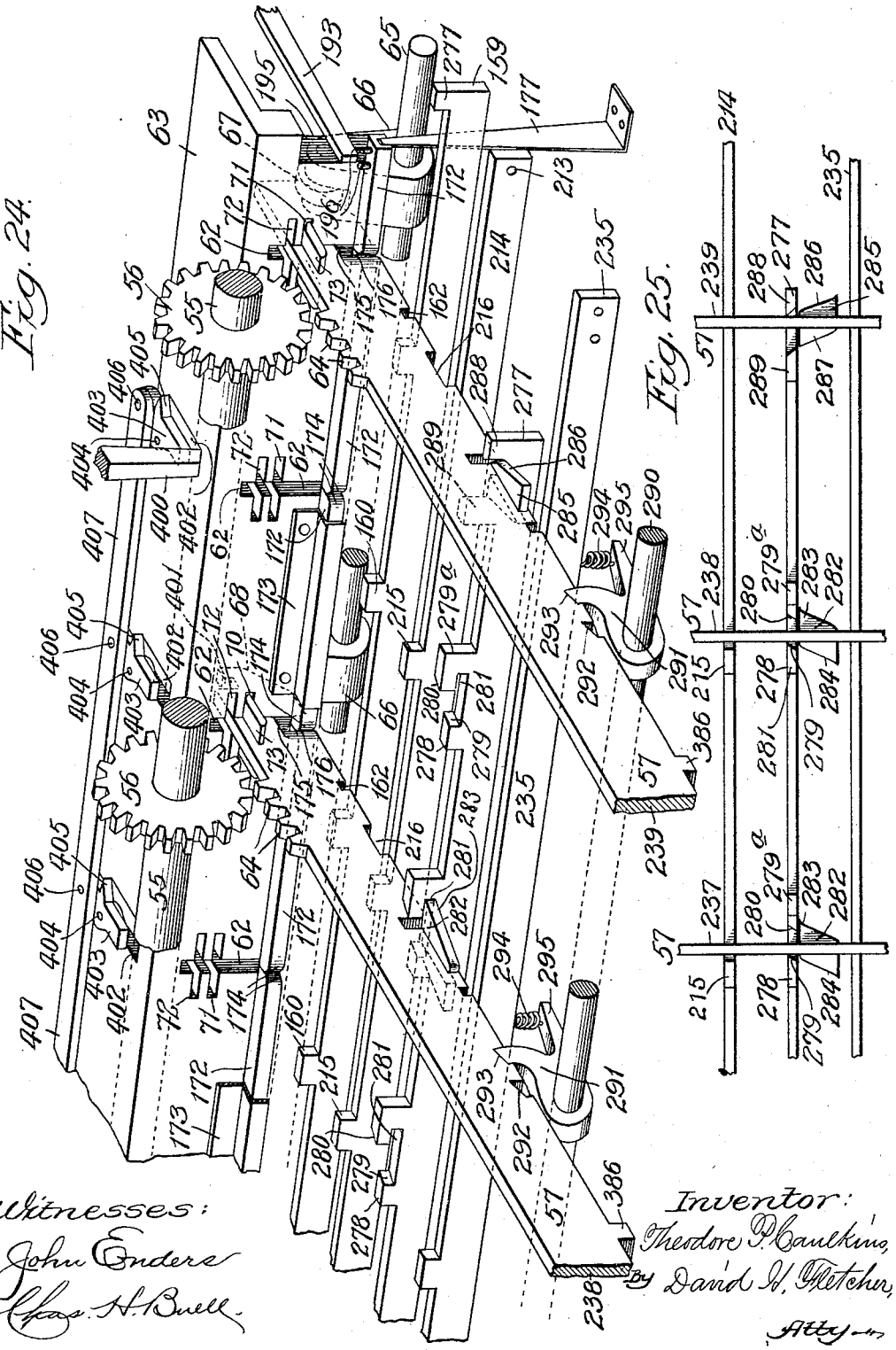

T. P. CAULKINS.
VOTING MACHINE.
APPLICATION FILED NOV. 7, 1910.
1,148,575.
Patented Aug. 3, 1915.
26 SHEETS—SHEET 14.
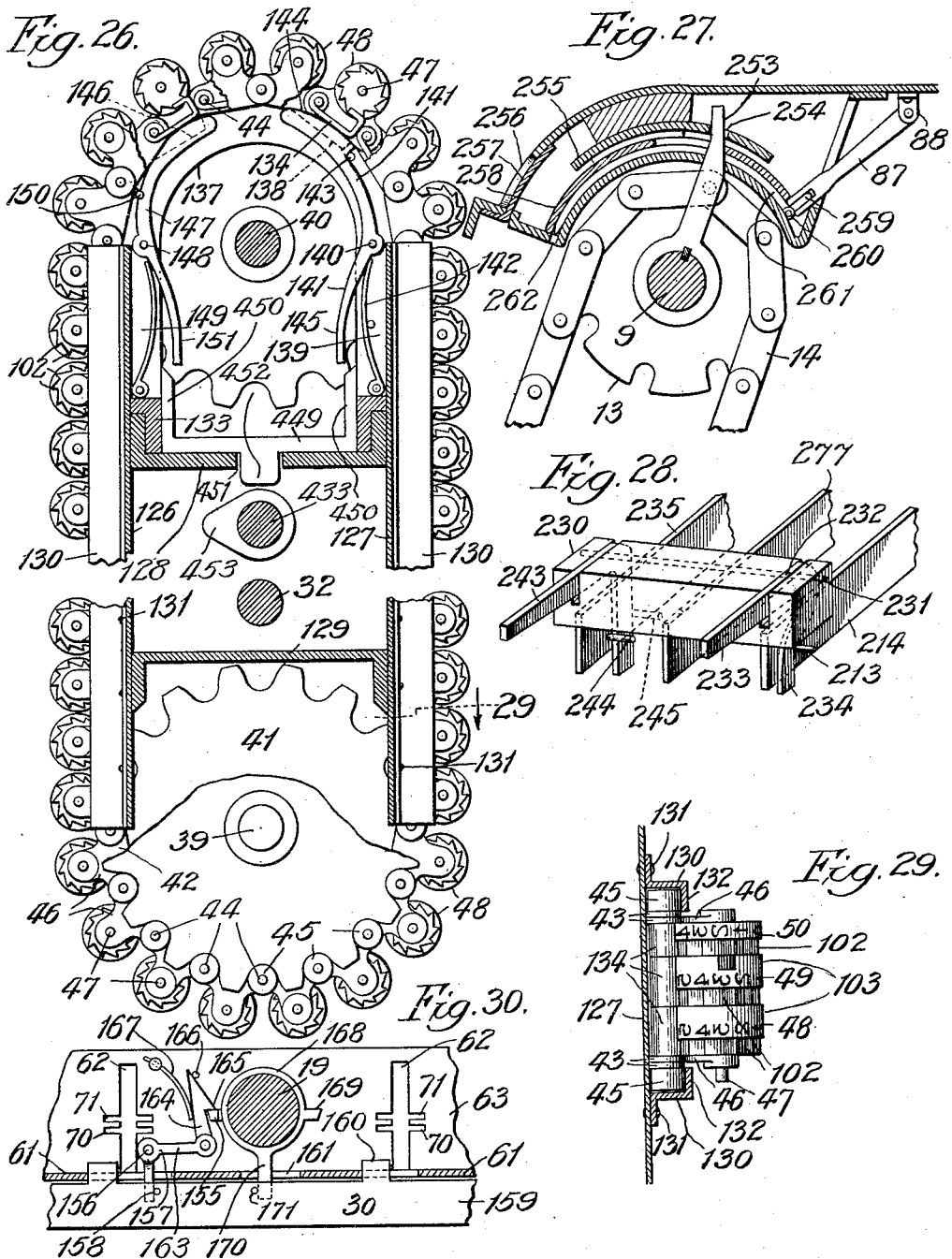

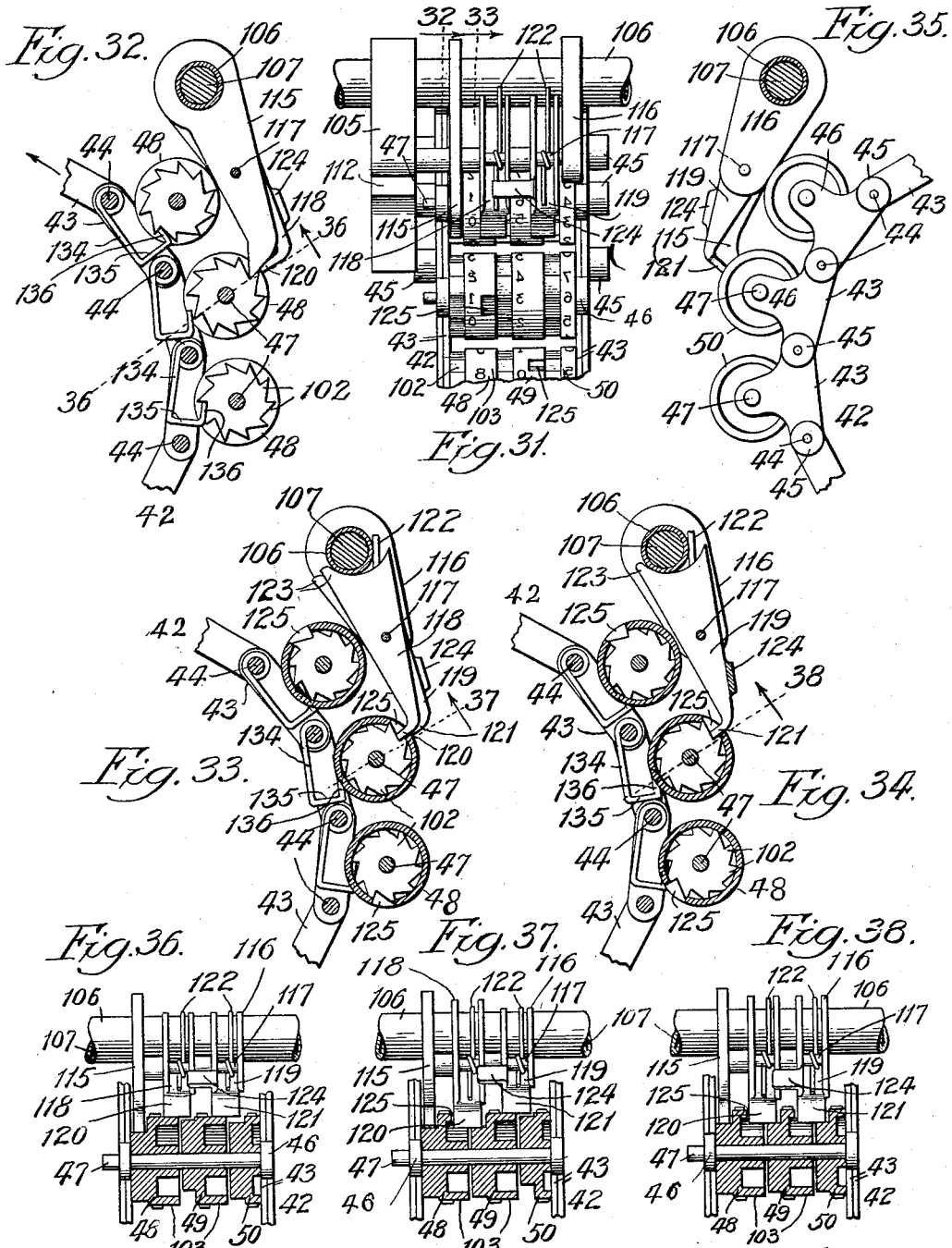

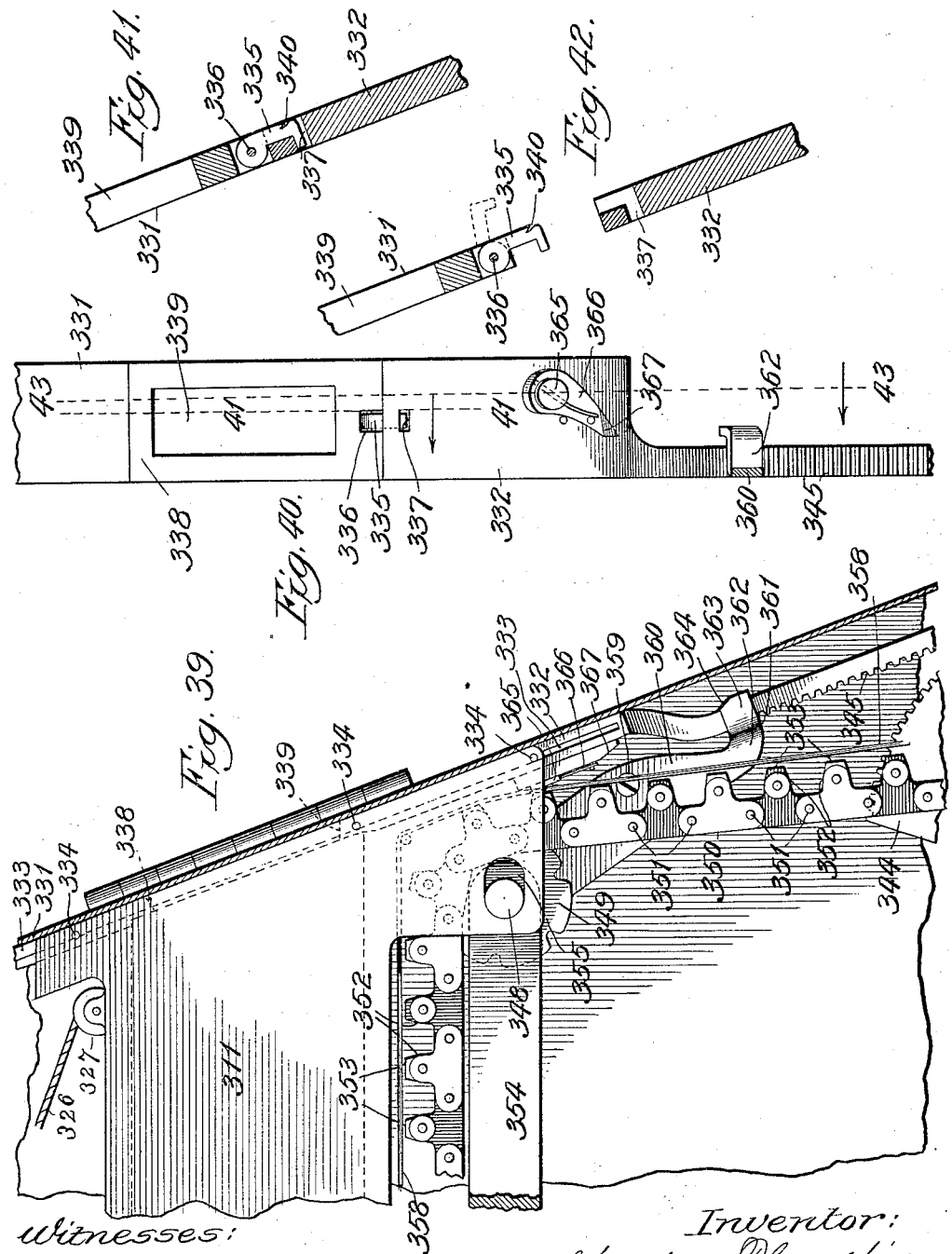

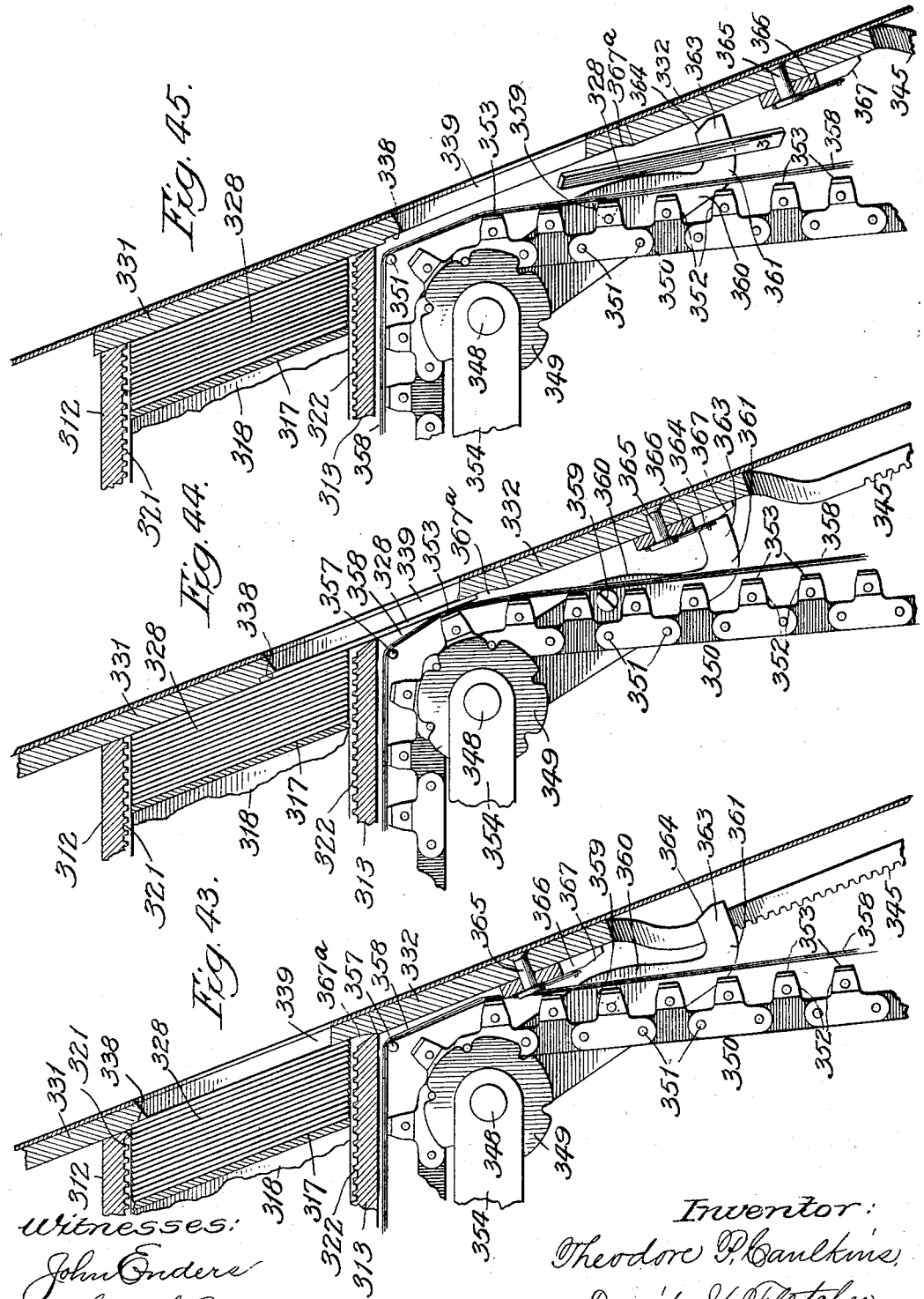

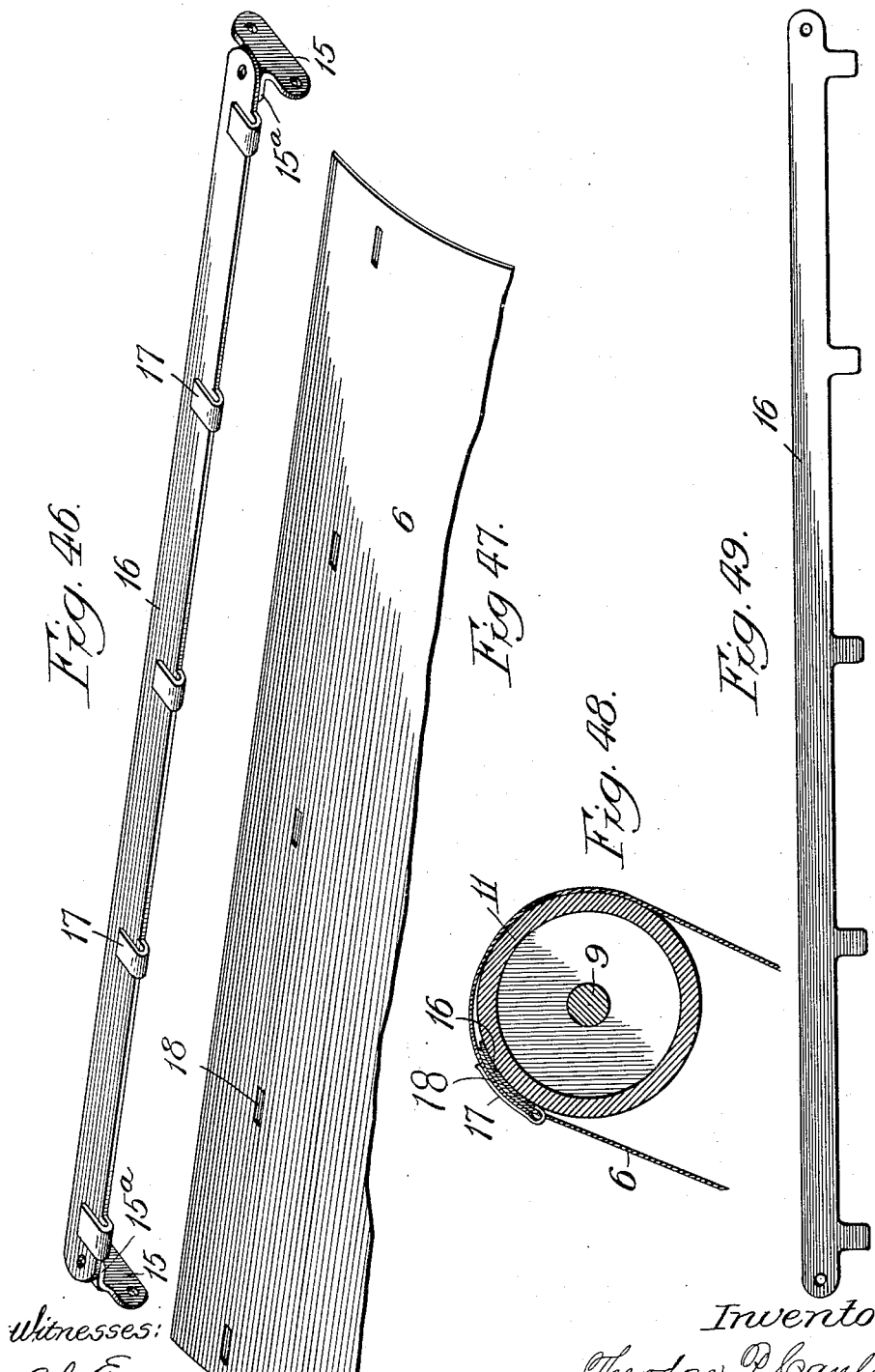

T. P. CAULKINS.
VOTING MACHINE.
APPLICATION FILED NOV. 7, 1910.

1,148,575.

Patented Aug. 3, 1915.
26 SHEETS—SHEET 19.

Witnesses:
John Enders
Chas. H. Buell

Inventor:
Theodore P. Caulkins
By David H. Fletcher
Atty.

T. P. CAULKINS.
VOTING MACHINE.
APPLICATION FILED NOV. 7, 1910.

1,148,575.

Patented Aug. 3, 1915.
26 SHEETS—SHEET 20.

Fig. 53.

| | PROPOSITIONS | | | | YES | NO | PASS |
|---|---|---|---|---|---|---|---|
| 1ᵃ | | | | | YES | NO | |
| 2ᵃ | | | | | YES | NO | |
| 3ᵃ | | | | | YES | NO | |
| 4ᵃ | | | | | YES | NO | |
| 5ᵃ | REPUBLICAN STRAIGHT TICKET | DEMOCRATIC STRAIGHT TICKET | PROHIBITION STRAIGHT TICKET | INDEPENDENT STRAIGHT TICKET | | | |
| 6ᵃ | ELECTORS 15 TO BE ELECTED (1) | ELECTORS 15 TO BE ELECTED | ELECTORS 15 TO BE ELECTED | ELECTORS 15 TO BE ELECTED | | | |
| 7ᵃ | (2) | | | | | | |
| 8ᵃ | (3) | | | | | | |
| 9ᵃ | (4) | | | | | | |
| 10ᵃ | (5) | | | | | | |
| 11ᵃ | (6) | | | | | | |
| 12ᵃ | (7) | | | | | | |
| 13ᵃ | (8) | | | | | | |
| 14ᵃ | (9) | | | | | | |
| 15ᵃ | (10) | | | | | | |
| 16ᵃ | (11) | | | | | | |
| 17ᵃ | (12) | | | | | | |
| 18ᵃ | (13) | | | | | | |
| 19ᵃ | (14) | | | | | | |
| 20ᵃ | (15) | | | | | | |
| 21ᵃ | MEMBER OF CONGRESS | MEMBER OF CONGRESS | MEMBER OF CONGRESS | MEMBER OF CONGRESS | | | |
| 22ᵃ | MEMBER BOARD OF EQUALIZATION | MEMBER BOARD OF EQUALIZATION | MEMBER BOARD OF EQUALIZATION | MEMBER BOARD OF EQUALIZATION | | | |
| 23ᵃ | JUDGES SUPERIOR COURT 6 TO BE ELECTED (1) | JUDGES SUPERIOR COURT 6 TO BE ELECTED | JUDGES SUPERIOR COURT 6 TO BE ELECTED | JUDGES SUPERIOR COURT 6 TO BE ELECTED | | | |
| 24ᵃ | (2) | | | | | | |
| 25ᵃ | (3) | | | | | | 6 |
| 26ᵃ | (4) | | | | | | |
| 27ᵃ | (5) | | | | | | |
| 28ᵃ | (6) | | | | | | |
| 29ᵃ | PRESIDENT COUNTY COMMISSIONERS | PRESIDENT COUNTY COMMISSIONERS | PRESIDENT COUNTY COMMISSIONERS | PRESIDENT COUNTY COMMISSIONERS | | | |
| 30ᵃ | COUNTY COMMISSIONERS 10 TO BE ELECTED (1) | COUNTY COMMISSIONERS 10 TO BE ELECTED | COUNTY COMMISSIONERS 10 TO BE ELECTED | COUNTY COMMISSIONERS 10 TO BE ELECTED | | | |
| 31ᵃ | (2) | | | | | | |
| 32ᵃ | (3) | | | | | | |
| 33ᵃ | (4) | | | | | | |
| 34ᵃ | (5) | | | | | | |
| 35ᵃ | (6) | | | | | | |
| 36ᵃ | (7) | | | | | | |
| 37ᵃ | (8) | | | | | | |
| 38ᵃ | (9) | | | | | | |
| 39ᵃ | (10) | | | | | | |
| 40ᵃ | GENERAL ASSEMBLY 3 VOTES FOR 1 CANDIDATE | GENERAL ASSEMBLY 3 VOTES FOR 1 CANDIDATE | GENERAL ASSEMBLY 3 VOTES FOR 1 CANDIDATE | GENERAL ASSEMBLY 3 VOTES FOR 1 CANDIDATE | | | |
| 41ᵃ | | | | | | | |
| 42ᵃ | GENERAL ASSEMBLY 1½ VOTES FOR 2 CANDIDATES | GENERAL ASSEMBLY 1½ VOTES FOR 2 CANDIDATES | GENERAL ASSEMBLY 1½ VOTES FOR 2 CANDIDATES | GENERAL ASSEMBLY 1½ VOTES FOR 2 CANDIDATES | | | |
| 43ᵃ | | | | | | | |
| 44ᵃ | GENERAL ASSEMBLY 1 VOTE FOR 3 CANDIDATES | GENERAL ASSEMBLY 1 VOTE FOR 3 CANDIDATES | GENERAL ASSEMBLY 1 VOTE FOR 3 CANDIDATES | GENERAL ASSEMBLY 1 VOTE FOR 3 CANDIDATES | | | |
| 45ᵃ | | | | | | | |
| 46ᵃ | | | | | | | |
| 47ᵃ | | | | | | | |

Witnesses:
John Enders
Chas. H. Buell

Inventor:
Theodore P. Caulkins,
By David H. Fletcher,
Atty.

COLUMBIA PLANOGRAPH CO., WASHINGTON, D. C.

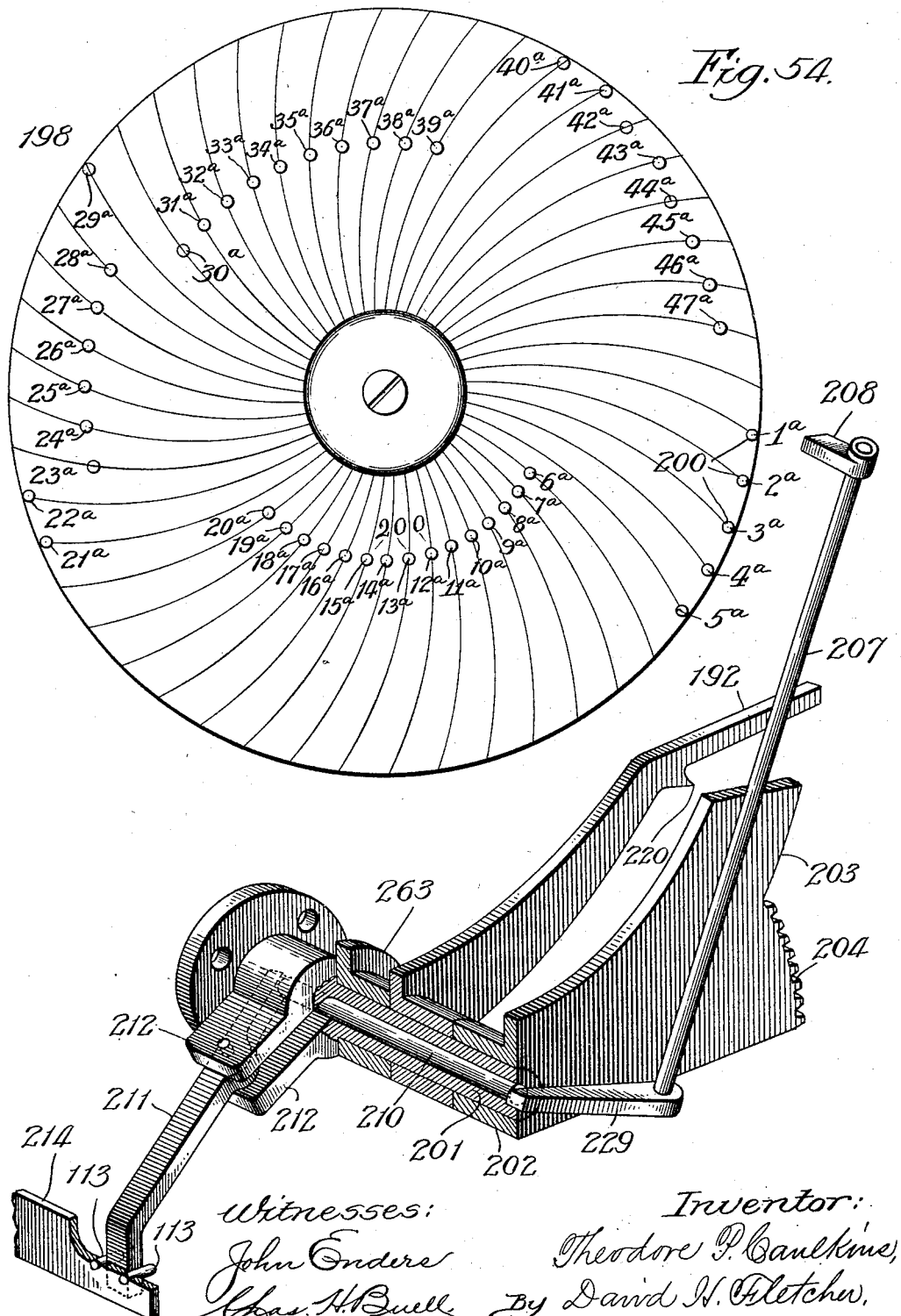

T. P. CAULKINS.
VOTING MACHINE.
APPLICATION FILED NOV. 7, 1910.
1,148,575.
Patented Aug. 3, 1915.
26 SHEETS—SHEET 22.
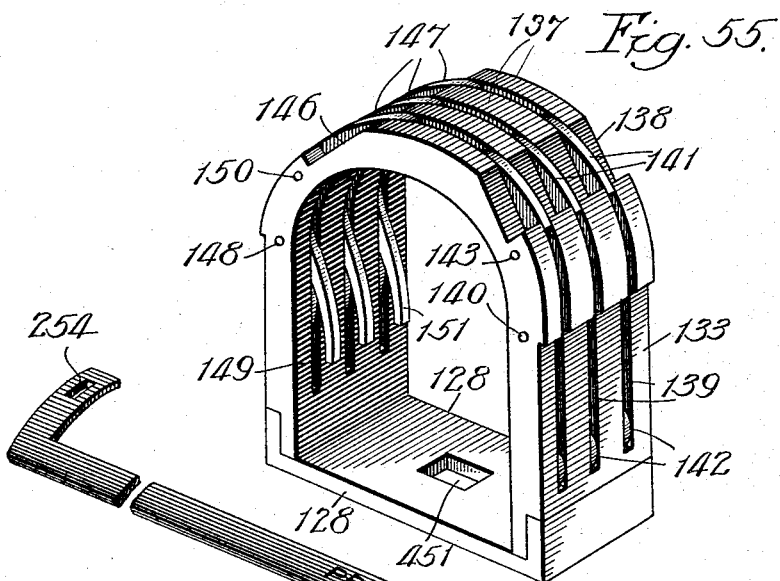
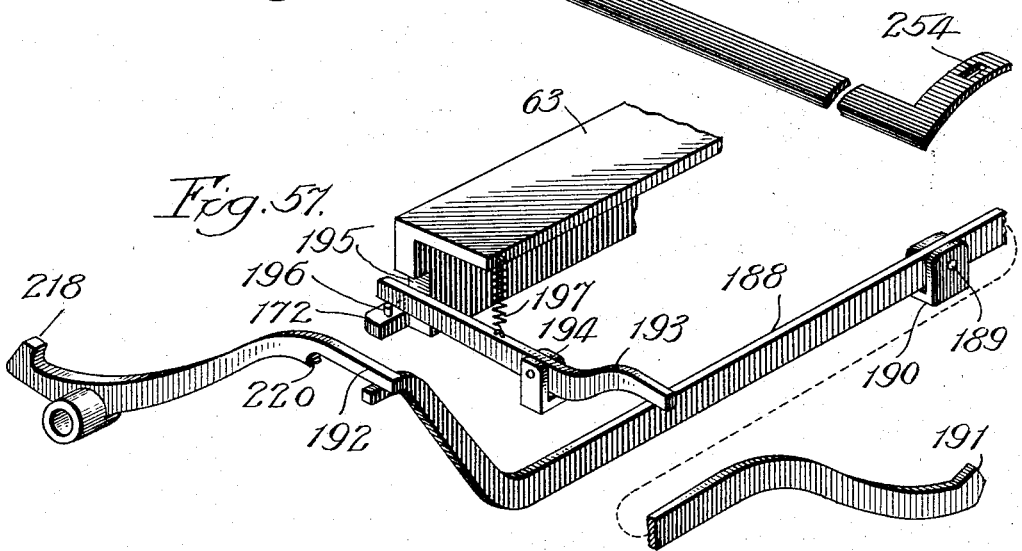
Witnesses:
John Enders
Chas. H. Buell
Inventor:
Theodore P. Caulkins
By David H. Fletcher,
Atty.

T. P. CAULKINS.
VOTING MACHINE.
APPLICATION FILED NOV. 7, 1910.
1,148,575.
Patented Aug. 3, 1915.
26 SHEETS—SHEET 23.
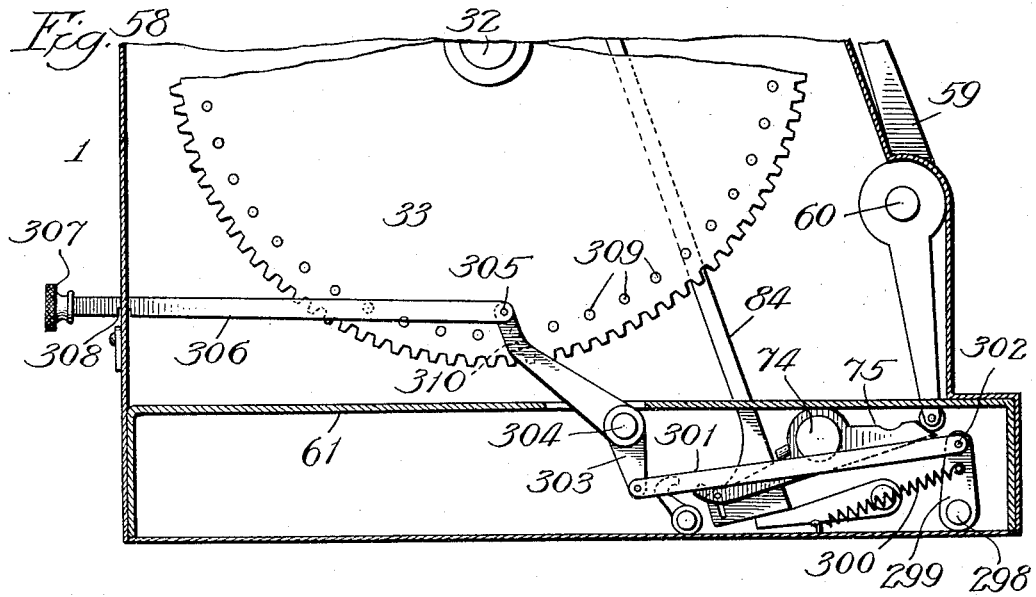
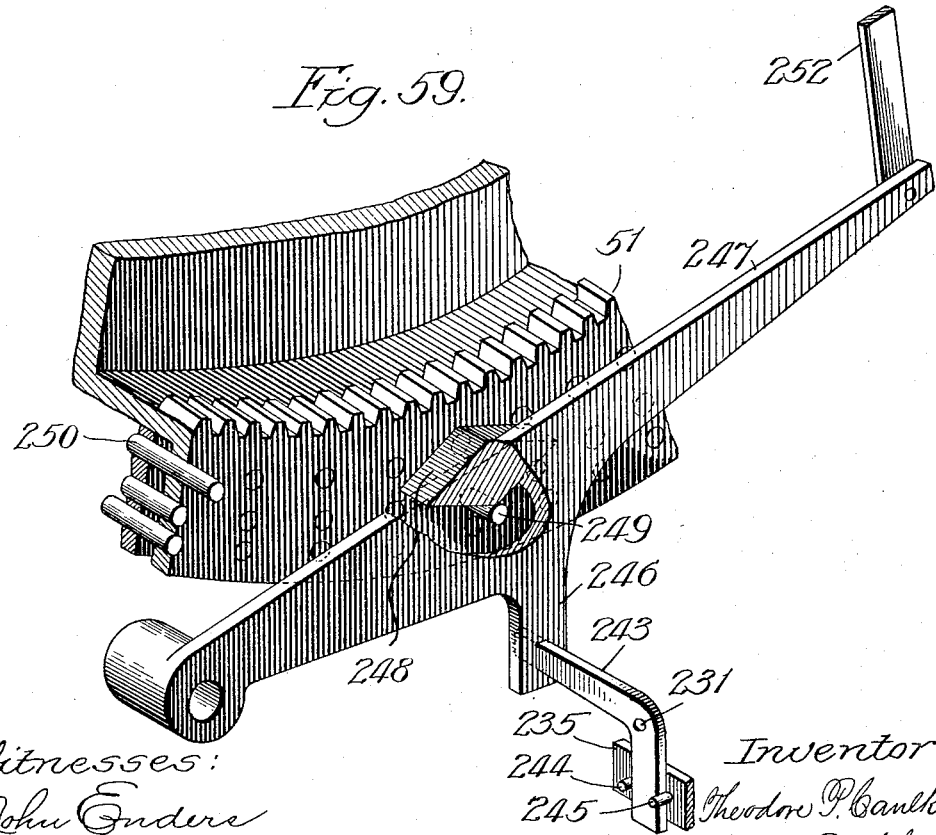
Witnesses:
John Endere
Chas. H. Buell
Inventor:
Theodore P. Caulkins,
David H. Fletcher.
By Att'y T. P. CAULKINS.
VOTING MACHINE.
APPLICATION FILED NOV. 7, 1910.
1,148,575.
Patented Aug. 3, 1915.
26 SHEETS—SHEET 24.
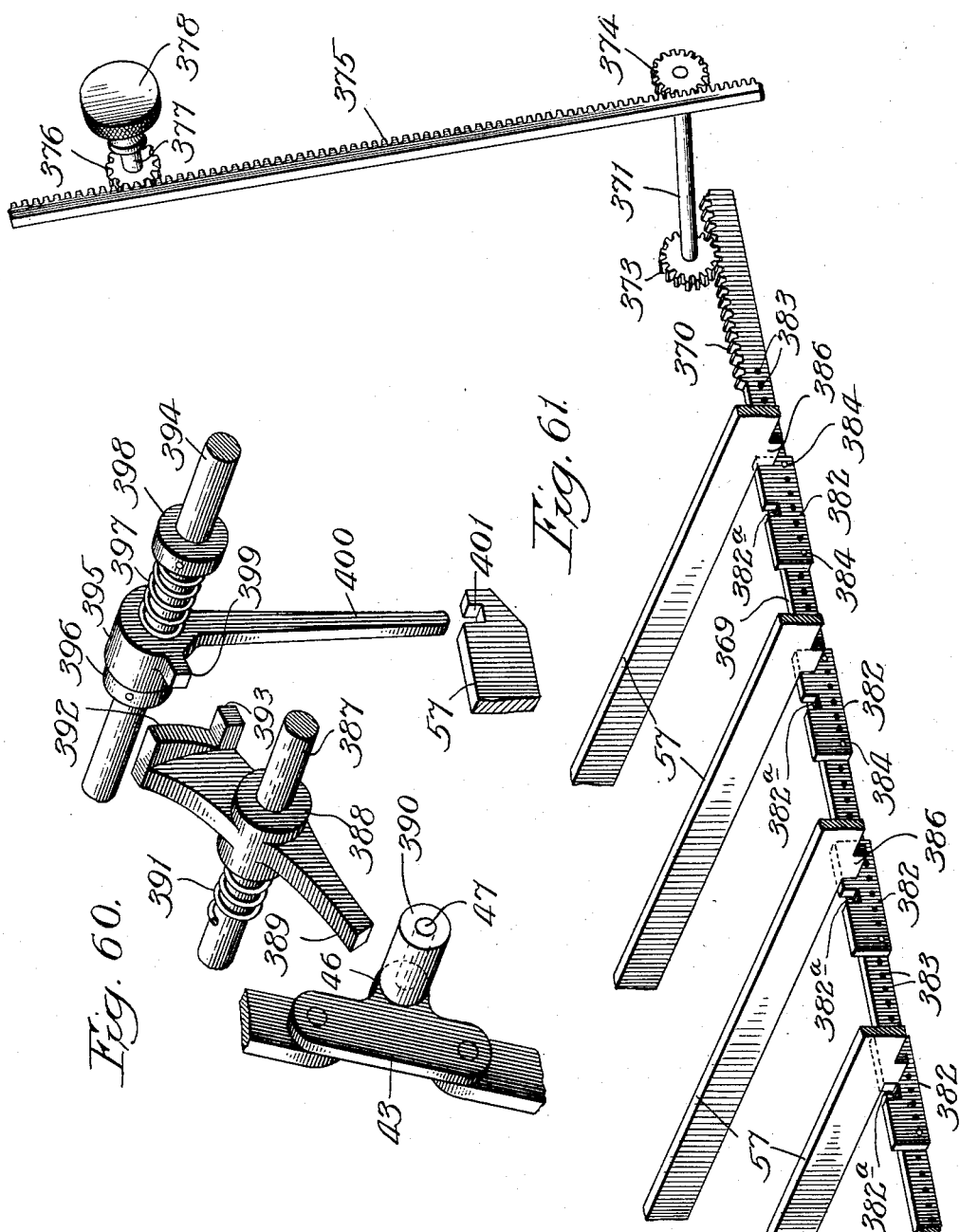
Witnesses:
John Enders
Chas. H. Buell
Inventor:
Theodore P. Caulkins,
By David H. Fletcher,
Atty.

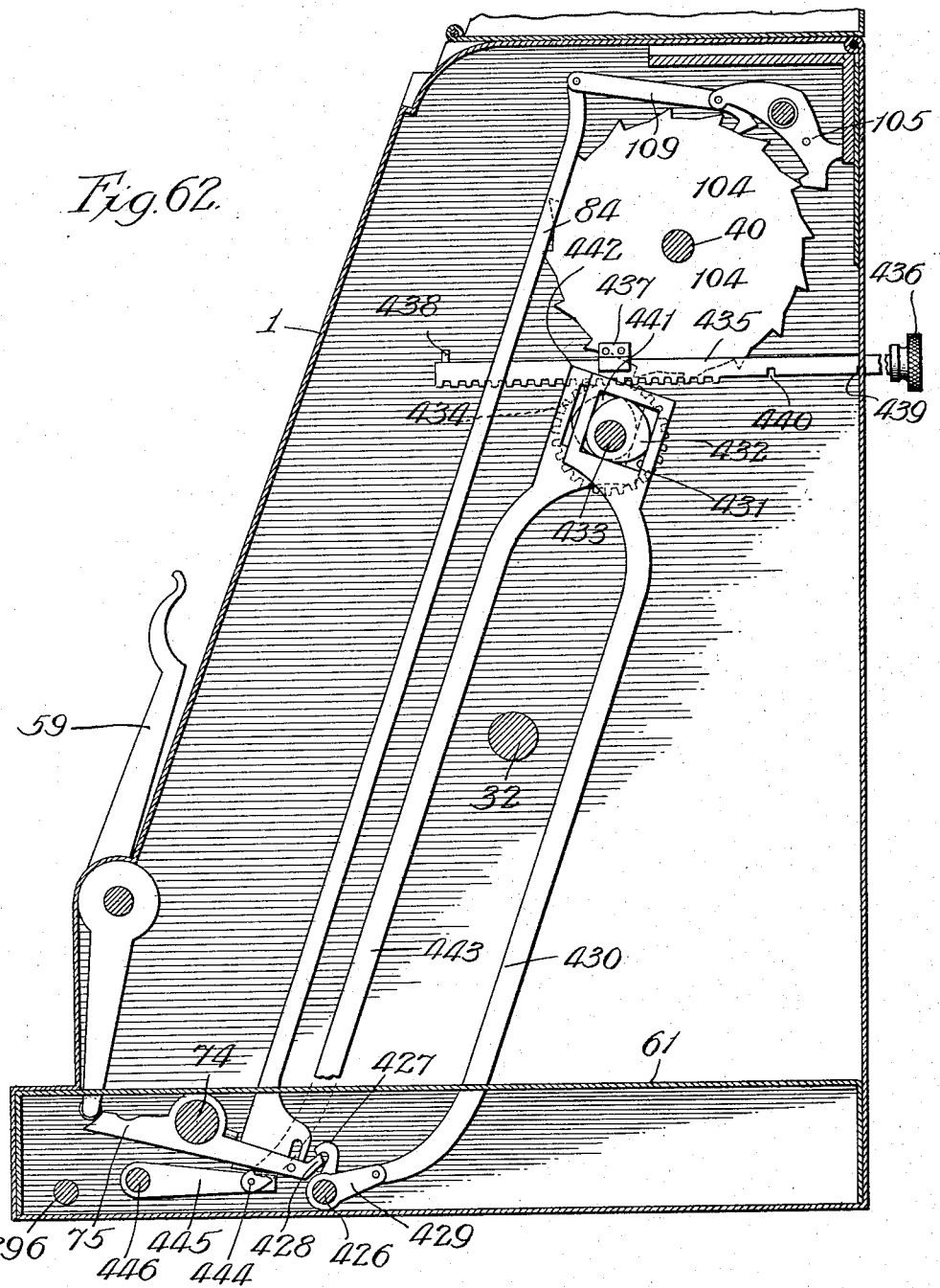

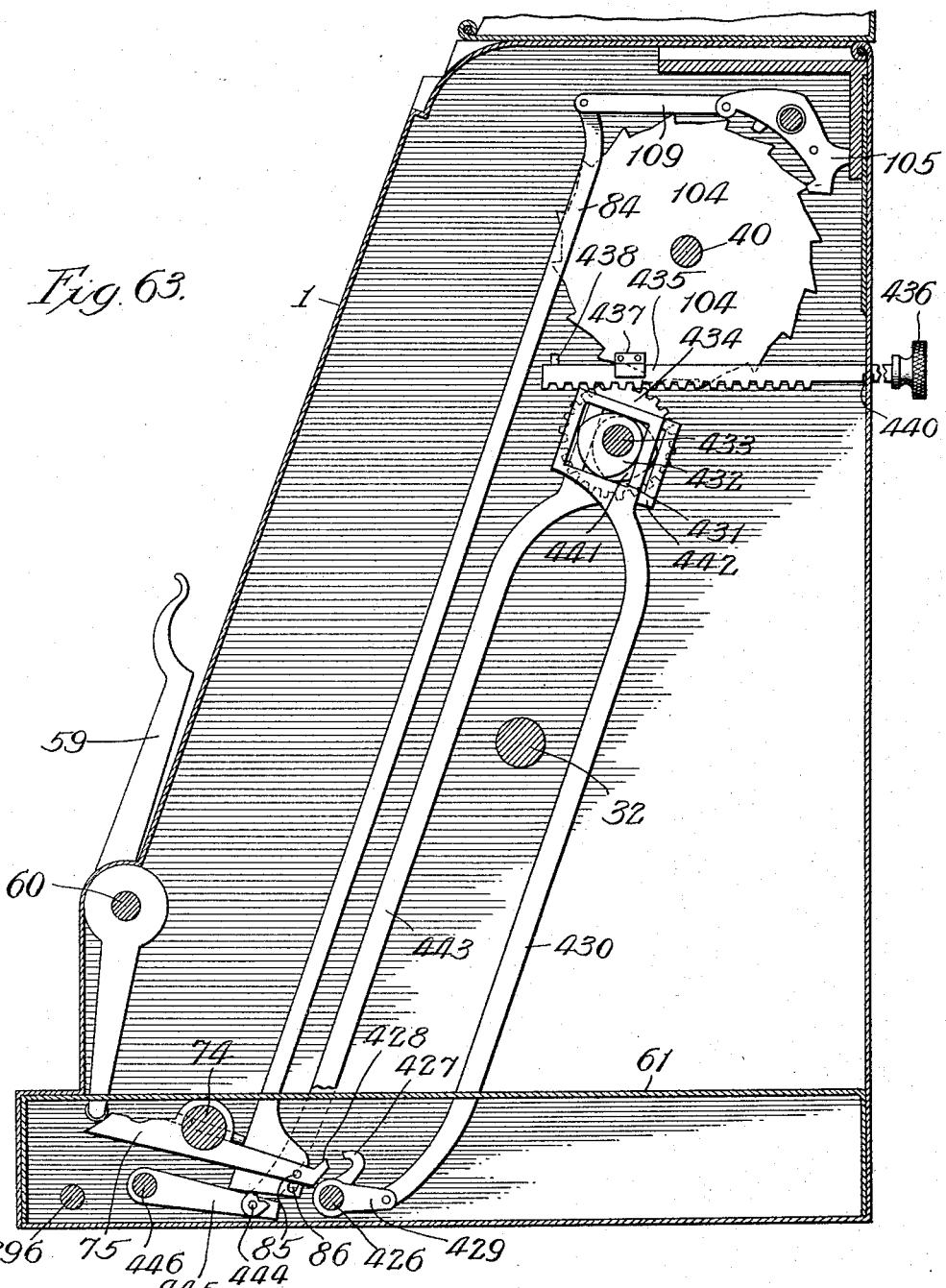

UNITED STATES PATENT OFFICE.

THEODORE P. CAULKINS, OF CHICAGO, ILLINOIS, ASSIGNOR TO ERIK L. KRAG, OF CHICAGO, ILLINOIS.

VOTING-MACHINE.

1,148,575.		Specification of Letters Patent.		Patented Aug. 3, 1915.

Application filed November 7, 1910. Serial No. 591,065.

*To all whom it may concern:*

Be it known that I, THEODORE P. CAULKINS, a citizen of the United States, residing at Chicago, in the county of Cook and State of Illinois, have invented certain new and useful Improvements in Voting-Machines, of which the following is a description, reference being had to the accompanying drawings, forming a part of this specification, in which corresponding reference-numerals in the different figures indicate like parts.

The object of my invention, stated generally, is to devise a voting machine which shall be simple, compact, cheap and durable in its construction, accurate in its operation and above all, so organized as to provide positive and certain means for indicating results while maintaining checks against error or fraudulent manipulation under all contingencies which may arise in connection with State, national or local elections, at the same time leaving the voter free to exercise all of the privileges to which he may be lawfully entitled with no further inconvenience or complication than if he were marking and depositing his ballot in the customary way.

A further object is to so embody said invention in concrete form that a printed official ballot may serve as a chart for the guidance of the voter, as well as for controlling the adjustment and ultimate operation of the machine, the latter being provided with an automatic controlling device, the elements of which may be made adjustable and so combined that each shall bear a predetermined relation to the parties, "propositions" or candidates indicated upon the ballot; thereby enabling any combination or set of combinations to be made in a given machine, so that without changing or modifying its construction, it may readily be adapted for use in conformity to the requirements of the varying laws of different States, such, for example, as voting upon "propositions" or special measures, providing for "straight" party votes, mixed or independent votes, "minority representation," restricted balloting, primary elections and the like;—said controlling device being so connected with locking mechanism that the keys, levers and other actuating elements may be locked against further manipulation when the voter shall have exhausted his legal privileges.

A further object is to provide means for permanent registration and indication of the several results, and preferably in a form that may enable the registering means to be utilized as printing elements, so that as a result of a final manipulation by those officially authorized to make it, they may be caused to print upon the ballot-sheet used by the voters, the number of votes registered by each party, candidate or measure, and to repeat such printing operation upon any desired number of ballot-sheets, so that the sheets may be utilized in certifying the returns or otherwise.

It is my further purpose, in connection with said printing mechanism, to enable a preliminary test of the setting of counters and working of the machine to be made and indicated upon the ballot before any vote is registered, so that the sheet upon which the final return is made may bear evidence of such test.

Moreover, it is my object to so combine registering means in the machine itself that one may serve as a check against the other so that an error in counting owing to a defective part or otherwise may be determined and accurately located and that in a manner to enable a certificate to be made without vitiating an election; all of which, with other specific objects not above enumerated, is hereinafter more particularly described and definitely pointed out in the claims.

In the drawings, Figure 1 is a front elevation of my improved machine as it would appear with the cover open; Fig. 2 is a right-hand end view, the case being shown in vertical section; Fig. 3 is a rear elevation of a portion of the machine commencing at the left-hand end, the casing being removed; Fig. 4 is a like view showing an intervening or middle section between the ends; Fig. 5 is a like view showing a continuation of Fig. 3 to the end of the machine; Fig. 6 is a transverse vertical sectional view taken upon the line 6—, Figs. 1 and 3; Fig. 7 is an enlarged face view in detail of a portion of the "controlling" disk; Fig. 8 is a face view of a portion of the general locking disk, together with the locking elements in immediate connection therewith; Fig. 9 is a detail view in perspective of the "optional" releasing dog; Fig. 10 is a perspective view of a portion of the main locking bar with certain of the co-acting elements connected therewith; Fig. 11 is a left-hand end elevation of the machine with the casing removed; Fig. 12 is a transverse vertical sectional view taken upon the line 12—, Figs. 1 and 3, viewed in the direction of the arrows there shown; Fig. 13 is a plan view in detail taken upon the line 13—, Fig. 12, showing one of the levers intended to coact with a hand lever; Fig. 14 is a longitudinal sectional view in plan indicated upon the line 14—14, Figs. 3 and 12; Fig. 15 is a like view taken upon the line 15—15, Fig. 12; Fig. 16 is a vertical sectional view taken upon the line 16—, Figs. 14 and 17, viewed in the direction of the arrows there shown; Fig. 17 is a sectional view taken upon the line 17—, Fig. 14, viewed in the direction of the arrow there shown; Fig. 18 is a sectional view taken upon the line 18—, Fig. 14, viewed in the direction of the arrow there shown; Fig. 19 is a side elevation of the general locking bar; Fig. 20 is a like view of the "limiting" lock-bar; Fig. 21 is a like view of the "optional" locking bar; Fig. 22 is a similar view of the "proposition" locking-bar; Fig. 23 is a bottom view of the machine showing the relative positions of the several locking-bars, and the segregating lock elements; Fig. 24 is a perspective view of portions of the locking bars and rack mechanism arranged to coact therewith; Fig. 25 is a plan view of portions of the "limiting" bar the "option" and "proposition" bars, and rack-bars; Fig. 26 is a transverse vertical sectional view of a portion of the machine showing one of the counter carriers; Fig. 27 is a side elevation, partly in section, of the upper part of the ballot carrier, being an enlarged detail of one of the features shown in Fig. 12; Fig. 28 is an enlarged perspective view of portions of the locking bars and parts of the actuating mechanism therefor; Fig. 29 is a sectional view in detail of one of the groups of counters taken upon the line 29—, Fig. 26, viewed in the direction of the arrow there shown; Fig. 30 is an enlarged sectional view in detail taken upon the line 30—30, Fig. 15, viewed in the direction of the arrow there shown, the same showing parts of the unlocking mechanism of the general lock-bar; Fig. 31 is an enlarged rear view of a portion of one of the counter carriers with counters thereon, the operating fingers being shown in operative relation thereto; Fig. 32 is a sectional view taken upon the line 32—, Fig. 31, viewed in the direction of the arrow there shown; Fig. 33 is a like view taken upon the line 33—, Fig. 31, showing the pawl engaged with the ratchet representing the tens figure; the secondary pawl, representing the hundreds figure or ratchet, being disengaged; Fig. 34 is a like view showing both pawls engaged; Fig. 35 is a right-hand view of the parts shown in Fig. 32; Fig. 36 is a sectional view taken upon the line 36—, Fig. 32, showing a pawl in engagement with the units wheel; Fig. 37 is a like view, showing the pawls engaged with the units and tens wheels; Fig. 38 is a sectional view taken upon the line 38—, Fig. 34, showing several pawls in engagement with the respective counters; Fig. 39 is an enlarged view in detail of a portion of the irregular vote mechanism shown in Fig. 11, said view being taken upon the line 39—, Fig. 5; Fig. 40 is an enlarged rear view of the "card slide", shown in Fig. 39, the same being taken in a plane at right angles thereto; Fig. 41 is a sectional view taken upon the line 41—, Fig. 40; Fig. 42 is a like view showing the parts separated; Figs. 43, 44 and 45 are vertical sectional views taken upon the line 43—43, Figs. 1 and 40, viewed in the direction indicated by the arrows there shown, respectively, said views showing the movable parts in different relative positions with respect to each other; Fig. 46 is a perspective view of the hooked bar or ballot holder; Fig. 47 is a perspective view of the upper portion of a ballot-sheet; Fig. 48 is a transverse vertical sectional view through the ballot-sheet carrying roll, and a portion of a ballot-sheet attached thereto; Fig. 49 is a face view of the ballot-holder blank as it would appear before the hooks are formed thereon; Fig. 50 is an end view of the ballot-sheet rolls showing the ballot-sheet together with a carbon sheet for taking an imprint from the counters; Fig. 51 is a face view of a portion of a ballot-sheet as it would appear before voting; Fig. 52 is a like view of the same as it would appear with the number of votes for each candidate or measure printed thereon; Fig. 53 is a face view of a ballot to illustrate the manner in which group voting may be accomplished by the use of the machine; Fig. 54 is a view of the controlling disk showing the pins thereon as they would appear when set for predetermined groups of votes, said view being associated with a perspective view of portions of the limiter mechanism to aid in explaining the joint operation of the two; Fig. 55 is a perspective view of the upper portion of the framework over which the counter chains run, showing means for normally holding the locking pawls in engagement with the counter wheels when passing the notches where the shift is made; Fig. 56 is a perspective view of the "proposition" bar; Fig. 57 is a perspective view illustrating the mechanism for locking all of the hand-levers when the main lever is in an extreme right-hand position; Fig. 58 is a transverse vertical sectional view at the left-hand end of the machine showing means for locking and unlocking certain keys intended to be withheld from those exercising a restricted privilege; Fig. 59 is a perspective view in detail of a portion of one of the controlling disks and mechanism for controlling the proposition locking-bar to lock all of the hand-levers but the "yes" and "no" and "pass-lever". Fig. 60 is a perspective view illustrating special parts considerably enlarged, which are intended to coact with each other to enable a voter in one party to indorse a candidate in another. Fig. 61 is a perspective view, in detail, of the mechanism used in connection with primary elections for locking all of the voting levers except the one representing a given party; Fig. 62 is a transverse vertical sectional view taken upon the line 60—, Fig. 3, with the partition 1$^c$ and all of the mechanism, but certain specific coacting parts removed, showing means for actuating all of the counters and testing the same prior to an election by the action of the main lever, while all of the hand-levers or keys are locked, and Fig. 63 is a like view, showing the parts in different relative positions and as they would appear when the machine is ready for voting.

Referring to the drawings, 1, Figs. 1, 2, 11 and 12, represents the main body of the inclosing metal case of the machine which is provided with a metal cover 2 for the front, said cover being hinged at 3 and adapted to lock in any approved manner when the machine is not in use. Aside from the hinged cover described, the front of the machine is protected by means of narrow metal portions 4 and 5 at each end as shown in Fig. 1, to cover and protect the mechanism at the respective ends when the cover is open.

The front space between the parts 4 and 5, is intended for the display of a ballot-sheet 6, Figs. 1, 12, 47, 48 and 50 to 53, inclusive. A glass plate 7, Figs. 12 and 50 is secured to the front between the parts 4 and 5 to permit the ballot-sheet to be seen while preventing access thereto by unauthorized persons.

Parallel shafts 8 and 9, better indicated in Figs. 2, 12, 48 and 50, are mounted in suitable bearings near the top and bottom of the frame, and have rollers 10 and 11, rigidly mounted thereon. Said shafts are arranged lengthwise of the machine, and the rollers thereon correspond substantially in length to the width of a ballot-sheet. Rigidly secured to the shafts 8 and 9 at the respective ends of the ballot rollers, are sprocket-wheels 12 and 13, Figs. 12 and 27, upon which are mounted sprocket-chains 14, the purpose of which is to drive the shaft 9 from the shaft 8 and cause the two to rotate in unison. The sprocket-chains 14, of which there are two, located near the respective ends of the shafts, constitute the ballot-sheet carrying chains. In each of said chains is a link 15, Fig. 46, which is provided with an inturned lug 15$^a$, to which lug is riveted a cross-bar 16, which I term the ballot fastening bar. The latter is provided with a series of hooks 17, Figs. 46 and 48, adapted to pass through openings 18, Fig. 47, in the upper edge of the ballot-sheet 6. In Fig. 49, the blank for the bar is shown before the hooks are bent thereon. The inner faces of the hooks 17 are intended to exert a yielding pressure against the paper, and the ballot sheet is made of proper length so that when the upper end is attached to the hooks it may be carried around the rollers 10 and 11 and caused to overlap itself. The lower end of the ballot-sheet is then passed beneath the upper end or beneath the hooks, as indicated at 18, Fig. 48, when the whole will be held in place and will present the appearance shown in Fig. 50. By rotation of the shafts 8 and 9 the ballot sheet may be caused to move so as to complete the successive cycles and as the names thereon are arranged in horizontal lines, it is obvious that they may be presented in any given predetermined position in successive order.

In the construction shown it is intended to have the ballot-sheet moved through a complete cycle by each voter whether all or only a portion of the candidates thereon are voted for, so that the head of the ticket may be regularly presented to each successive voter.

Mounted in suitable bearings in the frame of the machine near the bottom is a main driving shaft 19, Figs. 1, 4, 12, 14 and 15, which projects through the front and extends nearly to the rear within the casing. Upon the forward end of said shaft is rigidly attached a main actuating lever 20, having a handle 21 upon the end. The lever 20 is intended to be moved one half of a revolution and to rest in either of two extreme positions upon a ledge 22. Attached rigidly to the rear end of the shaft 19 is a spur gear 23, which is in mesh with a like gear 24, the latter having also formed thereon a beveled gear 25, better shown in Figs. 12 and 14, keyed to a short shaft 26, having bearings in the frame and in a bracket 27. The gear 25 is in mesh with a like gear 28 upon a horizontal shaft 29, having a spur gear 30, shown in full lines in Figs. 5 and 14 and in dotted lines in Fig. 11. The gear 30 is in mesh with a like gear 31 which is loosely mounted upon a shaft 32, Figs. 4, 5, 6, 11, 12 and 14, adjacent to a large gear 33, the hub of which is rigidly attached to the shaft 32. (See Figs. 14, 16 and 17.)

Upon the inner face of the gear 33 is an annular flange 34, having a notch 35 therein. A disk 36, Figs. 14 and 16, is riveted to the gear 31 and is provided with a spring actuated pawl 37 adapted to press outwardly against the flange 34. When the gear 31 is moved so as to carry the pawl in the direction indicated by the arrow in Fig. 17, said pawl is caused to engage with the notch 35, thereby forming a positive clutch, by means of which the gear 33 and shaft 32 may be driven.

The pawl, while in engagement with the notch serves as a stop to prevent the gear from being moved from a predetermined initial position in one direction. It is essential, however, that it be also locked against reversal, inasmuch as any accidental displacement would defeat the final purpose aimed at. To guard against such a contingency, I provide the following described mechanism: Rigidly attached to a vertical partition 1$^d$, Figs. 5 and 16, is a stud 33$^d$ having a sleeve 33$^e$ loosely mounted thereon, also shown in Fig. 17. A lever, generally designated by 33$^f$, is rigidly formed upon the sleeve having an actuating rod 33$^g$, jointedly attached to the upper end, which projects through an opening in the rear wall 1 of the casing; a button 33$^h$ being formed upon the outer end of the rod. Upon the lower arm of the lever is a beveled tooth 33$^i$ which is adapted to engage a pin 33$^j$ projecting from the face of the gear 33 near its periphery. An arm 33$^k$, extending forwardly at right angles from the lever, has a tooth thereon, adapted, when the rod 33$^g$ is pushed in, to engage a block 33$^l$ upon the inner face of the gear 33, and when in this position the gear is locked, being held against displacement in one direction by the arm 33$^k$ and in the other by the dog 37. It should be remembered that the gear 33 is intended always to be rotated in the direction indicated by the arrow and that when the gear 31 is reversed, the gear 33 should remain at rest. When rotated, however, to the position shown in Fig. 17, the pin 33$^j$ is caused to engage the upper face of the tooth 33$^i$ and tilt the lever into the locking position described, in which position it is intended to remain until released by an authorized person by pulling the rod 33$^g$ outwardly. This feature, in addition to insuring the proper operative relation of the mechanism, is provided as a special election safe-guard hereinafter to be described. The gear 33 meshes with a gear 38 upon the ballot roll driving-shaft 8, Figs. 11 and 17, by means of which the ballot-roll is actuated.

The several gears are so proportioned that when the main actuating lever 20 is moved from one extreme position to the other, it will cause the ballot-sheet to be moved through a complete cycle, provided none of the voting levers hereinafter described have been actuated, or to complete any portion of the cycle left incomplete by the movement of said voting levers or keys. In the example shown, the pawl 37 is intended to enter the notch 35 when the lever 20 is in the extreme position shown in Fig. 14, so as to insure a complete revolution thereof and cause the head of the ballot to be brought to an initial position, when said lever is in the extreme position represented in Fig. 1.

Longitudinal shafts 39 and 40, Figs. 2, 3, 4, 5, 6, 12 and 26, are mounted in suitable bearings in the frame, for the purpose of carrying the counting or registering mechanism so as to cause the latter to be moved in cycles corresponding to and in harmony with the movement of the ballot-sheet. In the example illustrated, the counting mechanism consists of a plurality of series of groups of numbering wheels or counters, supported upon endless chains, which are, in turn, carried upon the sprocket-wheels. The chains, and the manner of their mounting and grouping will be described before explaining the construction and operation of the counters. Mounted upon the shafts 39 and 40 are as many groups or pairs of sprocket-wheels 41, better shown in Figs. 12, 14 and 26, as there are series of groups of counters. Adapted to be engaged by said sprocket-wheels are chains, generally designated by 42, having parallel links 43, as shown in Figs. 3, 4, 5, 12, 26, 29 and 32 to 38, inclusive, which are connected at the joints by means of axle-pins 44, said pins being enough longer than the width of the chain to permit rollers 45 to be mounted upon the ends thereof, which rollers are adapted to enter the notches in the sprocket-wheels, said notches forming bearings therefor. The chain thus becomes what is ordinarily known as a "roller-chain" in which two parallel link members are far enough apart so that the space between them may be utilized for the reception of numbering wheels. Each of the parallel link members is provided with an outwardly projecting lug 46, better shown in Fig. 35, through bores in which are projected pins 47 which form axes for a group of numbering wheels designated as 48, 49 and 50, and representing units, tens and hundreds, respectively, each wheel being provided with the numerals from 1 to 9, inclusive, and zero. I have limited the wheels to three, that being all that would usually be required in practice. The length of the links of all the chains is the same so that the groups are equally spaced and the spaces upon the vertical columns of the ballot for measures or candidates, are arranged to conform thereto; the number of groups in each chain being intended to correspond to the number of such spaces.

There are as many carrying chains or series of numbering groups, as there are political parties provided for upon the ballot-sheet, plus two, one of these to be used in case a voter desired to waive his privilege, or, in other words, to pass a measure or candidate, and the other to represent an irregular or independent vote. In the example illustrated, I have shown ten chains which may best be seen by combining Figs. 3, 4 and 5, eight of which chains represent political parties, one the "pass" feature and one the irregular vote.

Mounted rigidly upon the right-hand end of the shaft 32 is an internal gear-wheel 51, Figs. 3, 6, 14 and 18, which is in mesh with a spur-gear 52 upon the shaft 39. Upon the left-hand end of the shaft 39 is a gear 53, Fig. 14, which meshes with a gear 54 upon a parallel shaft 55, also shown in Figs. 3, 4, 5 and 24. Rigidly mounted upon the shaft 55 is a series of gear wheels 56, which are of equal diameter, and correspond in number to the counter carrying or numbering wheel chains.

Located beneath and in alinement with the gears 56 are rack-bars 57, shown also in Figs. 12 and 15, corresponding in number to said gears. The rack-bars extend from front to rear. The forward end of each rack-bar is jointedly connected by means of a pin 58, Fig. 12, to the lower part of a hand-lever, generally designated by 59, the upper portion of which is extended upwardly and exposed in front of the machine, as better shown in Fig. 1. There are as many hand-levers or keys as there are counter-carrying chains. Each of the levers 59 is pivoted at 60, Fig. 12, and the lower portion of the lever is bifurcated to receive the rack-bar. The bottom of each rack-bar 57 rests upon the floor 61, shown in Fig. 12, but omitted in Fig. 24, and the rear ends of said bars are passed loosely through vertical slots 62, Fig. 24, in an angle bar 63, rigidly attached to the frame, which slots serve as guides for said bars. Teeth 64, upon the upper edge of the rack-bars are normally out of engagement with the gears 56, but are adapted to engage said gears when the bars are lifted by the mechanism about to be described. Supported in suitable bearings and extending lengthwise of the machine is a rock-shaft 65, Figs. 3, 4, 5, 12, 23 and 24, upon which is keyed a series of arms 66 having friction rollers 67 thereon, yieldingly held against a beveled portion 68, shown in full lines in Fig. 12 and indicated in dotted lines in Fig. 24 at the bottom and upon the rear ends of the rack-bars by means of a coiled spring 69, Figs. 5 and 23. The arms project through slots 70, Figs. 12 and 23, in the floor 61, which limit their forward movement. Horizontal notches 71, 72 are extended laterally upon opposite sides of the slots 62, to receive rigid guide-plates 73 attached to the sides of the rack-bars. When a rack-bar is pushed back by pulling outwardly upon a lever 59, the plate 73 thereon enters the notch 71 and is moved back to its full limit, at which time the plate 73 will have passed entirely through the notch and out upon the rear side of the bar 63. The inclined portion 68 of the bar being in contact with a roller 67 upon an arm 66, the shaft 65 is rocked while the roller is pressed against the rack-bar with a yielding pressure. The plate 73 being freed from the slot 71 in its backward movement, the action of the roller upon the rack-bar causes it to be lifted until the top of the bar strikes the upper edge of the slot 62. The plate 73 is then in alinement with the notch 72 and upon reversing the lever 59 and pushing it back to its normal position, as shown in Fig. 12, the rack-bar is drawn back with it. When the rack-bar is raised, as described, the teeth 64 are in mesh with those upon a corresponding gear 56, and are so held by the plate 73 until the rack-bar is drawn back to its full limit, at which time the plate is freed from the notch 72 and the bar falls to its normal position with its teeth disengaged from those of the gear. It will thus be seen that each rack-bar is adapted to be given a four motion movement as a result of pulling out and pushing back the actuating lever 59 connected therewith. When the actuating lever is pushed back, the rack, being in engagement with the gear 56, actuates said gear and with it the shaft 55, thereby moving the ballot-sheet a distance corresponding to one horizontal space, and likewise moving the shaft 39 and with it all of the counter carrying chains, a distance corresponding to the length of one link therein, thus causing a new group of counters upon each chain to be moved into a position corresponding to the new horizontal space upon the ballot-sheet as hereinafter described.

In order to avoid any possibility of failure in the registering of the parts, it is necessary to temporarily lock the main actuating lever and to insure the full forward and backward movement of the rack-bars, for which purpose I provide the following described means: Supported in the bearings in the partitions $1^c$ and $1^d$, Fig. 23, is a longitudinal rock-shaft 74 below the floor 61, upon which is loosely mounted a series of levers 75, also shown in Figs. 12 and 13. The bearing portions of the levers are cut out lengthwise as shown at 76 in said last named figure to provide for the insertion of pins 77 which are rigidly inserted in the shaft and bear normally against the tops of said levers. The shaft 74 is held in a normal position by means of a coiled spring 78, Fig. 23. The levers 75 and 59 are in alinement with each other, respectively, and correspond in number. Each of the former is beveled upon its forward end as shown at 79, Fig. 12, and is in contact with a friction roller 80 upon the lower end of the corresponding lever 59. Upon the left-hand end of the shaft 74, Figs. 11, 14 and 15, is keyed an arm 81, to the upper end of which is jointedly connected a locking-bolt 82 which is adapted to enter a notch 83 in the inner face of the main actuating lever 20. When any of the levers 59 is moved outwardly from its normal position the corresponding lever 75 is tilted and with it, through the pin 77 the shaft 74 is rocked, thereby throwing the bolt 82 into the notch 83 and locking the main actuating lever. At the same time all of the pins 77, opposite the other levers 75 are free to move upwardly in the slots 76, without affecting the action of said levers. It will thus be seen that when any one of the levers 59 is in an abnormal position, the main actuating lever 20 is locked against movement.

The rear end of each of the levers 75 is bifurcated for the reception of the lower end of a bar 84, Figs. 12 and 13, which is extended upwardly to near the top of the case. A pin 85 passing through the rear end of the lever and through a slot 86 in the bar, serves to connect the two. The upper end of each of the bars 84 is arranged to contact, when lifted, with an arm 87 jointedly connected to a lug 88 attached beneath the top of the case, which arm is pressed downwardly by means of a spring 89. The result of this spring pressure upon the bars 84 causes a downward pressure to be exerted upon the rear ends of the levers 75, thus pressing the beveled portions 79 at the front against the rollers 80 upon the levers 59, thereby holding the lower end of each in its extreme forward position. A notch 90 in the upper face of each of the levers 75 is adapted to receive the rollers 80 when the levers 59 are reversed, said notches being so formed that when the rollers are therein they will ride upon the incline and the same spring pressure described will tend to hold them in the extreme position desired. This is an important feature inasmuch as it tends to prevent failure of operation which might otherwise result from careless manipulation of the hand levers.

As has been stated, both the ballot and counter carrying mechanism can be actuated either by the main actuating lever 20, or by any one of the levers 59, the former being used to set the ballot and counters in their respective initial positions. Assuming this to have occurred, the gear 33, Fig. 17, will stand in the position indicated in that figure with the dog 37 in the notch 35. When, however, one of the levers 59 is actuated, the shaft 32, through the action of the shaft 55 and connecting gears, will be moved in the direction indicated by the arrow thereby rotating the wheel 33, while the disk 36 remains stationary. This action causes the notch 35 to be moved step-by-step away from the pawl 37. There is a possibility, therefore, that when the teeth of the rack, in engagement with one of the gears 56, Fig. 24, are released by the fall of the rack-bar, that the shaft 55 may be moved too far and thus cause confusion, which may be avoided by the following described means. Mounted upon the shaft 39, Fig. 12, is an arm 91, which is extended rearwardly from said shaft. Said arm is counterpoised by means of a weight 92 and is held in frictional engagement with the shaft 39 by means of a spring washer 93, so that it will retain a given position until positively displaced. A tooth 94 upon the arm 91 is adapted to engage teeth 95 upon a ratchet wheel 96 keyed rigidly to the shaft 55, so that when the shaft 39 is moved in the direction indicated by the arrow, the arm 91 will be raised and the tooth 94 thrown into engagement with a tooth upon the ratchet-wheel, thereby forming a positive stop. The teeth 95 are so spaced as to permit the carrying chains to be moved a distance corresponding to the length of one link thereon, thereby insuring accurate registration of movement of the counters with the successive ballot spaces. The rear end of the arm 91 is in position to engage the arm 97 of a trip lever pivoted to the wall at 98. Said trip-lever is provided with a rearwardly extended arm 99, the function of which will be hereinafter referred to, and also a depending arm 100, shown also in Fig. 3. A cam 101 is keyed to the rock-shaft 65 in position to engage the arm 100 when said shaft is tilted, which is accomplished by the backward movement of any of the rack-bars, except that connected with the pass-lever, hereinafter to be referred to. The backward movement of the arm 100 causes the arm 97 to press downwardly against the rear end of the arm 91, thereby releasing the ratchet-wheel 96 and permitting the shaft 55 to be rotated by the backward movement of a rack-bar. The return of the rack-bar permits the rock-shaft 65 to return to its normal position and the arm 91, being held by frictional contact upon the shaft 39, is tilted by the rotation of the latter, so as to cause the tooth 94 to engage the next successive tooth upon the ratchet-wheel 96 and lock it against further movement.

Having described the mechanism for actuating the ballot and counter carrying chains, I will now describe the construction of the counter-wheels and the means for operating them: Each of the numbering wheels 48, 49 and 50, Figs. 26, 29 and 31 to 38, inclusive, is provided with ten ratchet teeth 102, adjacent and bearing a fixed relation to the numerals upon the periphery. The "units" and "tens" wheels are made broader than the "hundreds" wheel so as to provide a lateral margin 103 upon each for the purpose about to be stated. Keyed to the shaft 40 adjacent to each chain, is a ratchet-wheel 104, Figs. 3, 4, 5 and 12, the teeth of which are adapted to be engaged by a pawl 105 rigidly attached to a sleeve 106 upon a shaft 107. See also Figs. 32 to 38 inclusive. The teeth of the ratchet-wheel are equi-distant from each other and so spaced as to bear a fixed relation to the length of the chain links. Jointedly connected at 108, Fig. 12, to pawl 105, is a secondary pawl 109, provided with a tooth 110 at one end while the other end is jointedly connected at 111 with the bar 84. As previously stated, each of the bars 84 is pressed downwardly in a normal position by means of the spring controlled arm 87. The outer end of the pawl 105 is provided with a lug 112, which abuts against a reinforcing angle-bar 113 at the rear of and forming a part of the frame. When the arm 109 is in the normal position shown with the part 112 of the pawl 105 against the frame, the tooth 110 is lifted above the teeth of the ratchet wheel, as is also the tooth 114 upon the end of the pawl 105. It will be noted, however, that the rear faces of each of the teeth 110 and 114 is beveled so as to ride upwardly upon inclined faces of the teeth of the ratchet wheels 104, which are always rotated in the direction indicated by the arrow. Rigidly attached to the sleeve 106 is a pawl or "units counter-finger" 115, located in the same vertical plane with and adapted to engage the ratchet-teeth 102 upon the "units" counter-wheels 48. Also rigidly attached to said sleeve is an arm 116 which is connected with the pawl 105 by means of a pin 117, said pin passing through a bore in the finger 115, so that the three are rigid and move with each other. Pivoted upon the pin 117 are fingers 118 and 119 respectively, better shown in Figs. 32 to 38 inclusive, the former of which is in the vertical plane of the "tens" and the latter in that of the "hundreds" wheel. Teeth 120 and 121 upon the rear ends of said fingers are made wider than the ratchet teeth in the tens and hundreds wheels, so that a part of the former may rest normally upon the margin 103 of the "units" and the latter upon that of the "tens" wheel, for a purpose soon to be stated. Springs 122 are provided for each of the fingers 118 and 119, said springs being bent around the pin 117 so that one end may bear upon the top of the end of the finger with which it is connected, while the other bears upon the top of the sleeve, thereby tending to move the tooth thereon downwardly into engagement with the teeth upon said wheels. A heel 123, Figs. 33 and 34, upon each of the fingers 118 and 119, is adapted to abut against the under side of the sleeve 106, to limit the movement of the finger. Extending laterally from the finger 119 so as to project over and rest upon the top of the tens finger, is an arm 124, which is intended to hold the hundreds finger in an inoperative position for a purpose to be stated.

Formed in the margin 103 of each of the "units" and "tens" wheels, opposite to the zero character upon each, is a notch 125, Figs. 31, 33, 34, 37 and 38, which notches may be entered by the teeth upon the tens and hundreds fingers at the proper time, so as to enable said teeth to engage the ratchets respectively upon the wheels they are intended to actuate.

The operation of the counting mechanism, exclusive of that next to be described, for normally locking the counter-wheels, is as follows: Upon operating one of the finger-levers 59, Fig. 12, the rod 84 is lifted against the yielding pressure of the arm 87 as stated, thereby lifting the forward end of the arm 109 and depressing the tooth 110 into the space between the teeth upon the ratchet-wheel 104. Upon reversing the action of the lever 59 the rack-teeth 64 are brought into engagement with those upon the corresponding gear 56 upon the shaft 55, thereby resulting in moving the shaft 39 and the several chains thereon, as explained, a distance of one link. This causes the tooth 110 to ride upwardly upon a tooth of the ratchet-wheel 104, which lifts the forward end of the part 105 and depresses the other so that the tooth 114 falls between two teeth of the ratchet-wheel 104. This, in turn, permits the units finger 115, to descend, as shown in Figs. 31 and 32, in front of one of the ratchet teeth 102 of the units wheel, while the tens finger, riding upon the margin 103, is held out of engagement as shown in said figures. The movement of the counter carrying chain in the direction indicated by the arrow in Figs. 12 and 32, causes the tooth 102 in the numbering wheel 48 to be pushed against the tooth on the end of the finger 115, thereby rotating said wheel a distance represented by one tooth. In the meantime the lever 59 and bar 84 will have been restored to their respective normal positions and the ratchet-wheel 104, having been moved to its full limit, the tooth 114 will have ridden upwardly upon the incline of the ratchet tooth engaging it, thereby lifting the units finger out of engagement with the ratchet-tooth of the numbering wheel. Assuming the movement described to have referred to the first numeral upon the units wheel of a given group, it follows that the operation may be repeated nine times in connection with that group before the tens finger can operate. During this time the fingers will appear as indicated in Figs. 31, 32 and 36. When, however, the units finger falls into engagement with the tenth tooth, the notch 125 upon the units wheel will have been moved opposite to the tooth upon the tens finger, whereupon said tooth will fall into engagement with a ratchet tooth upon the tens wheel as shown in Figs. 33 and 37. Upon the completion of a cycle of the tens wheel, the notch therein will have been presented opposite to the tooth of the hundreds finger and in order to prevent the latter from entering it at the wrong time, I provide the arm 124, which holds it out of engagement until the notch 125 in the tens wheel is moved once from beneath the tooth of the hundreds finger when said finger will ride upon the margin of the tens wheel until the tens finger again falls into a notch, at which time all of the fingers will be engaged, as indicated in Figs. 34 and 38. It sometimes occurs that in exercising a choice among groups of candidates in different parties, the voter may desire to vote for several candidates whose names appear in the same horizontal space upon the ballot. In that case as many of the bars 84 will be lifted and as many groups of counters shifted as there are levers moved, while all the other counters, except those in the special groups involved, will remain unchanged. It should be noted that this statement has reference to the movement of the counters through the action of one or more of the levers 59 and not to that resulting from the main actuating lever, which may, under conditions hereinafter to be explained, as, for example, in the case of a "straight vote", affect an entire series of groups, or under other conditions all of the groups. In either of the latter cases, the movement of the fingers is necessarily quite rapid and hence should be positive in character in order to be certain. The construction of the escapement mechanism involved in the parts 105 and 109 with the ratchet wheels and the fingers 118 and 119, pivoted in the manner described, I regard as of special importance inasmuch as I have found them to act with certainty and accuracy under conditions more trying than would ever be found in actual practice.

Having described the means employed for rotating the counters, I will now explain the mechanism by which they may be locked against accidental displacement or unauthorized manipulation. Extending lengthwise of the machine between the vertical partitions 1°, Fig. 3, and 1ᵈ, Fig. 5, are inclined parallel frame-plates 126 and 127, shown also in Figs. 12 and 26. Said frame-plates are rigidly attached at their ends to said partitions as well as to parallel longitudinal channel plates 128, 129, Figs. 12, 26 and 55, interposed between them and of corresponding length, which give rigidity thereto. The plates 126 and 127 are in planes substantially tangential to a circle touching the bottom of the notches in the sprocket-wheels, so that when the chains are mounted upon said wheels the inner faces of the links 43, better shown in Fig. 26, will bear against the outer faces of said plates in the manner indicated in Fig. 29. Said plates, therefore, form a backing for so much of said chains as lie in parallel planes. Sheet metal housings or channel guides 130, also shown in Figs. 3, 4 and 5, are riveted at 131 to the plates 126 and 127. The channels in said guides are adapted to receive and guide the rollers 45 upon the chains while the inner edges or flanges 132, better shown in Fig. 29, fit closely against the lugs 46 of the chain.

Located between the respective pairs of sprocket-wheels upon the shaft 40, which carry the several chains, is an arched fitting 133, Figs. 26 and 55, which is rigidly attached to the plates 126 and 127, respectively, and is so formed that the outer faces of said plates are tangential to the curve formed by its outer surface above the upper edges of said plates, thereby forming a continuous backing for the chain throughout its upper curve for the purpose of supporting and holding in place the locking dogs or pawls for the counters about to be described. Pivotally mounted side by side upon each of the axle pins 44, which connect the chain links, are three locking dogs or pawls 134, Figs. 26, 29, 32, 33 and 34, the main body of each of which is straight, but is bent at its free end at right angles to the body as shown at 135, and thence back in a plane substantially parallel to said body, as shown at 136. The length of the part 135 should be such that when the engaging tooth or dog 136 is in locking engagement with a ratchet-tooth, the back at the free end should be flush with the back of the chain link so that during the movement of the chain, it will at all times, except as hereinafter stated, from the lower edge of the plate 127 upwardly over the curve around the sprocket wheel and thence downwardly to the lower edge of the plate 126, bear against a rigid backing formed successively by the plate 127, the curved portion 137, Fig. 55, of the fitting 133, and the plate 126. It is obvious that when thus held in engagement with a tooth upon a counterwheel, the latter will remain positively locked against displacement. In the half circle of travel made by the chain below the lower ends of the plates 126 and 127, the dogs may be held in place by means of a housing similar to that at the upper end.

At a point in the chain cycle immediately beneath the fingers, shown in Fig. 12, which actuate the counters, I form a notch 138 shown in full lines in Fig. 55 and in dotted lines in Fig. 26, in the part 133, said notch being of a sufficient depth as indicated in said last named figure, to permit a locking dog 134 to be moved downwardly far enough to escape the end of the ratchet tooth and allow the counter to be rotated when brought into contact with the counter moving fingers. It is manifest, however, that none of said locking dogs should be permitted to fall into said notch and become released except when a counting wheel is engaged by one of the fingers. For this contingency I provide as follows: Vertical slots 139 are formed in the fittings 133 in alinement with the dogs 134, for each of the respective numbering wheels. Pivoted within said slots at 140 are a corresponding series of bent levers 141, each of which is held in a normal position by means of a spring 142 below the pivotal point of the lever. The upper end of each lever is pushed outwardly by means of said spring, but is limited in its outward movement by means of a stop pin 143. The upper portion of each lever is curved to conform to the curve of the outer surface of the arch in which it is mounted, said curved portion being opposite to and extending over the notch 138 when the lever is in its normal position against the stop 143. The lower end 145 of each of the levers is bent outwardly away from the inner wall of the fitting for a purpose hereinafter to be described.

When a vote is registered, all of the chains are moved and the locking dogs in all of the groups not affected thereby ride over the notches 138 without being released from engagement with the counters, they being held in their respective locked positions by means of the spring-pressed levers 141, the curved portions of which form a bridge or backing therefor, as shown in Fig. 26. When, however, a counter wheel, corresponding to the vote to be registered, is moved by the actuating fingers, the ratchet tooth thereon, diametrically opposite to the finger, presses downwardly upon the locking dog, as shown in Figs. 32, 33 and 34, thereby forcing the back of said dog against the lever 141, which permits the counter to be rotated one notch, after which the pressure of the lever forces the dog into engagement with the next notch, where it is held during the completion of the next chain cycle. It will thus be seen that all of the counters are positively locked against movement, except when opposite to the notch 138 where they are still held normally, but yieldingly, locked, subject to release only by the registering of a counter.

It is obvious that provision should be made for arbitrarily setting all of the counters to an initial position prior to an election. For this purpose I provide similar means. In the front portion of the several arches is formed a notch 146, which is bridged over opposite the respective counters by a like series of levers 147, pivoted at 148 in slots 149 and having stops 150. The lower ends 151 are bent outwardly in the same manner as the levers 145. The notches 146 are in alinement with each other beneath corresponding groups of counters upon the several chains. The top portion 152, Fig. 12, of the case, which is normally locked to shield the mechanism from unauthorized access, is hinged at 153, and when tilted backward permits access to the counters. By actuating the main lever, each successive group of the several series may be moved opposite to the notch 146, when the yielding of the levers 147 which hold the locking dogs in engagement while passing said notch, permits the setting of the counters.

I will now describe the various locking devices used as checks against fraud or mistake, after which will be considered the automatic controlling mechanism for limiting the voter to his strict legal privileges while permitting him to exercise unlimited choice therein. In order that the coacting parts of the machine may not be disturbed in their coördinate relations, it is essential that the main actuating lever should be locked against movement when any of the hand-levers is being operated, and that all of the hand levers should be locked at all times except when the main lever is in its extreme left-hand position.

In addition to the above, it is essential that means should be provided for preventing more than one hand lever from being pulled at a time. The means for locking the hand-levers 59 when the main lever is raised from its extreme left-hand position, is as follows: Rigidly attached to the shaft 19, Fig. 15, is a collar 154, having a forwardly projecting arm 155, also shown in Fig. 30. Pivoted at 156 to the front face of the angle bar 63 is an elbow-lever 157, having a depending arm extending through a slot in the floor 61 and in position to engage a pin 158 in a bar 159, which I term the general-locking bar, also shown in Figs. 2, 6, 11, 12, 19, 23 and 24. Said bar is provided with teeth 160, the distance between which corresponds to that between the rack-bars 57, said teeth being arranged to project upwardly through slots 161, better shown in Fig. 30, in the floor 61. When the locking-bar is in an unlocked position, the teeth 160 stand adjacent to the rack-bars 57 as shown in Figs. 15 24 and 30, and are adapted to engage with notches 162, Fig. 24, when said bar is moved toward the right, thereby positively locking all of the rack-bars and with them the hand levers. An arm 163, Fig. 30, upon the elbow-lever 157, is jointedly connected with a dog 164 having a tooth 165 in position to engage an arm 155, when the main lever 20, is in the extreme position indicated in Fig. 15. The upper face of the tooth 165 is beveled, and the upper end is adapted to rest normally against a stop-pin 166. A spring 167 acts to press the dog against said stop. A loose collar 168, having a tooth 169 and an arm 170 projecting radially therefrom, is loosely mounted upon the shaft 19 adjacent to the collar 154. The arm 170 is extended downwardly through a slot in the floor in position to engage a pin 171 upon the general-lock-bar.

The operation of said mechanism is as follows: When the main lever 20 is in its extreme left-hand position, the arm 155 is in engagement with the tooth 165, as shown in Fig. 30, and the teeth of the locking-bar 159 being disengaged, all of the hand-levers are free to be operated. When, however, the lever 20 is slightly lifted, the dog 164 is tilted by the action of the arm 155, thereby forcing the depending arm of the elbow-lever 157 against the pins 158 and moving the locking bar 159 to the right, thereby locking all of the rack-bars 57. A very slight movement of the actuating lever will accomplish this result, and if returned to its normal position, the hand-levers will still remain locked. If lifted far enough, however, the inclined face of the dog 164 will be moved against the pin 166 until the tooth 165 is released, the bar 159 remaining in a locked position. The continued movement of the actuating lever to its extreme right-hand position will carry the arm 155 over into contact with the tooth 169 upon the loose collar and will move said tooth sufficiently to cause the arm 170 to be moved to the left-hand against the pin 171, thereby returning said main locking-bar to its normal position.

The mechanism just described is intended to serve as a protection in the event of a slight lifting of the lever 20 from its extreme left-hand position which would offer a chance for fraud or error, hereinafter to be explained in connection with the special controlling mechanism.

I will now describe the means for preventing two hand-levers from being actuated at the same time: Located immediately in front of the angle-bar 63, with one face bearing against said bar and the other upon the floor 61, are a series of short sway-bars 172, Figs. 5, 12, 15 and 24. Said bars are adapted to slide longitudinally and are held in place by means of sheet metal angle-plates 173, Fig. 24, which are rigidly attached to the face of the angle-bar 63. The ends of said sway-bars are arranged to abut against each other and all of said abutting ends are rounded as shown at 174 in said last named figure, the extreme length of all except the end bars corresponding to the distance between centers of the rack-bars 57. The location of the meeting ends of said rack-bars is in alinement with said centers, respectively, and notches 175 are formed in said rack-bars to receive the meeting ends of the sway-bars. The vertical front faces of said notches are rounded or beveled, as shown at 176, so that a backward pressure thereof will tend to separate the opposing ends of the sway-bars. A spring 177, Figs. 12 and 24, is secured to the bottom of the casing and extended upwardly through a slot in the floor 61 into contact with the outer end of the right-hand bar, said slot being so placed as to limit the movement of said spring toward the left to a point which permits the left-hand end of the bar to rest upon the center line of the rack-bar, as described, while allowing the spring to yield toward the right. The end sway-bar at the left-hand end of the machine, shown in Fig. 5, is provided with a pin 178, upon the outside of the partition 1ᵈ, which limits its movement toward the right. A lever 179 pivoted to a bracket 180 has its short arm in engagement with the outer end of said sway-bar while a spring 181, acting upon said lever, serves to press the sway-bar toward the right; the assumed view-point in all cases being the front of the machine. As a result of the construction described, all of the sway-bars are normally held under spring pressure with their meeting ends in alinement with the centers of the rack-bars and the adjustment is such that when any one rack-bar is pushed back between the ends of the adjacent bars, the movement of the ends of all the others will be past the corresponding centers of the other rack-bars, thereby locking them against backward movement. When, however, the actuated rack-bar is returned to its normal position, the sway-bars are also restored to their respective normal positions by the pressure of the springs 177 and 181. Inasmuch as the movement of the sway-bars is limited in scope to the thickness of one rack-bar, it follows that if an attempt were made to move two hand-levers at once they would work against each other and neither could be moved. This fact, however, would not prevent a number of levers from being pulled out in successive order before the return of any one of them; the rear ends of the rack-bars being lifted out of contact with the sway-bars in the manner hereinbefore described, as soon as said bars reach their full backward limit. In such a case the reversal of one lever serves to return all of the bars to their respective normal positions. The advantage of this feature will be explained later.

In order to prevent two hand-levers from being moved in opposite directions at the same time, I attach a locking wheel or disk 182, Figs. 5 and 11, to the shaft 55, which wheel is provided with notches 183 adapted to be engaged by a tooth 184 upon the upper end of the lever 179. As soon as the sway-bars are pushed out by the backward movement of a rack-bar, the lever 179 is moved thereby, which causes the tooth 184 to enter a notch 183 and lock said shaft until the rack-bar is released from the sway-bars and lifted into engagement with a gear 56 upon the shaft 55, when the tooth 184 is withdrawn.

A vertical bar 185, shown in full lines in Figs. 5 and 17, and indicated in dotted lines in Fig. 11, is jointedly attached at its upper end to the arm $33^k$, while the lower end is in position when said arm is depressed, to be interposed between the face of the disk 182 and the tooth 184, thereby locking the lever 179 against movement and with it the sway-bars, the rack-bars and the hand-levers 59. Inasmuch as this action is intended to be controlled by the part $33^s$, which can only be released by the election judges, it follows that none of the hand-levers can be actuated without their approval.

The following described means is provided for locking all of the hand levers when the main actuating lever is in an extreme right-hand position: Formed upon the inner face of the gear-wheel 23, Figs. 4, 12, 14 and 15, is a cam 186 having a notch 187, Figs. 4 and 12, in its periphery. A lever 188, shown also in Figs. 3, 14 and 57, is pivoted at 189, to a bracket 190 upon the frame. Said lever is provided with a tooth 191, upon one end, which is adapted to bear against the periphery of the cam 186 and at the proper time, to enter the notch 187 therein; being held in yielding engagement therewith by the downward pressure upon the opposite end of the lever 188, of a spring-controlled lever 192, Figs. 2, 3, 6 and 57. A lever 193, Figs. 14, 15, 24 and 57, is pivoted to a bracket 194 upon the floor 61. The rear end of said lever is extended over the top of the lever 188, while the forward end is projected through a notch 195 in the angle-bar 63 and over one of the sway-bars 172 in a vertical plane between two upwardly projecting pins 196. A spring 197, Fig. 57, tends to hold said lever normally against the upper edge of the notch 195, and the parts are so adjusted that it may be thus held when the tooth 191 upon the lever 188 is in the notch 187 of the controlling cam. When the main lever 20 is in its extreme left-hand position the notch 187 is in position to receive the tooth 191, thereby permitting the forward end of the bar 193 to be lifted above the pins 196, which are short enough to pass beneath it when so raised. When, however, the lever 20 is moved so as to force the tooth 191 out of said notch, the forward end of the lever 193 is depressed between the pins 196, thereby locking all of the sway-bars and with them all of the hand levers.

In describing the adjustable controlling means whereby a voter may be restrained from exceeding his rights while free to exercise an unlimited choice within them, it is desirable to bear in mind the arrangement or placing upon the ballot-sheet of the measures to be voted for, as well as that of the names of candidates either as individuals or groups. The ballot-sheet is made of a width corresponding substantially to that of the glass covered opening in front and of a length not less than that of the counter-carrying chains and so that it may be mounted upon the rolls as shown in Fig. 50, in such a way as to successively present, when moved, all of the names and measures printed thereon. The vertical columns stand for the several political parties, each having therein the names of all of its candidates, spaced at equal distances and bearing a fixed relation to the spaces between the respective groups of counters upon the counter-carrying chains behind it. The names of candidates for corresponding offices in the several parties are arranged in horizontal lines corresponding in position to the horizontal rows of counter-wheel groups in the respective series. The ballot-sheet, so arranged, constitutes a chart by which to adjust the controlling mechanism which consists of one or more movable elements adapted to be moved synchronously with the ballot-sheet and counter-carrying chains, and provided with limiting stops or elements thereon fitted to control locking mechanism whereby some or all of the voting levers may be locked under predetermined conditions. In the preferred form illustrated, I have shown a plurality of rotatable disks having means thereon for arranging varying combinations of stop-pins adapted to control such locking mechanism.

In Figs. 2, 3, 7 and 54, is represented a disk 198, which is rigidly attached to the shaft 32. Said disk is provided with a plurality of series of holes better shown in Fig. 7, and generally designated by 199. These are placed in curved lines, which are equi-distant from each other and extend from center to circumference, being designated consecutively by numerals $1^a$, $2^a$, etc., throughout the circumference of the disk. The successive holes of each row are also located in a series of concentric circles, which are likewise designated by numerals $1^b$, $2^b$, etc., successively from the periphery inwardly, as indicated in Fig. 7. There should be as many rows of holes in the "a" series, as there are separate groups of counters upon a counter-carrying chain, and as many holes in each of said rows in the "b" series as may be necessary to provide for the largest number of measures and candidates, singly or in groups, such, for example, as presidential electors, county commissioners, delegates or the like.

The disk 198 bears a predetermined relation not only to the ballot but to the adjustment of coacting parts of the machine and the first row of holes of the "a" series should correspond to the first measure or candidate at the head of the ballot. Inasmuch as there are frequently measures or propositions as well as candidates to be voted for, I have in the example illustrated, placed them at the head of the ballot, as shown in Fig. 53. These are numbered successively from 1ª to 4ª upon the left-hand vertical margin. The next in order upon the horizontal line of the ballot appears the "straight" ticket for the several parties numbered 5ª, following which are fifteen presidential electors numbered from 6ª to 20ª, inclusive. Then follows one horizontal line bearing the names of several different party candidates for Member of Congress, 21ª, another for "President of the board of equalization" 22ª, followed by six horizontal lines 23ª to 28ª, inclusive, bearing the several party names of groups of candidates for judges.

Whenever a measure or a single condidate in any given party is to be voted upon, a pin should be placed in hole 1ᵇ of the "a" series to which it belongs upon the ballot, or if a group of candidates is to be voted upon, there should be placed as many pins in a circular row as there are candidates in that group and the first pin of the series "b" should begin with the line in the series "a" corresponding to the number of the first horizontal row of names in the party or series of groups. For example, assuming that there are four measures to be voted upon and a "straight" ticket: in setting up the combination of pins 200, in the controller, five pins would be set in succession in the "a" series, viz: at 1ª, 2ª, 3ª, 4ª and 5ª; all being in the first circular row of the "b" series or in the outer margin. The next in order upon each of the party tickets, is a group of fifteen presidential electors represented by positions 6ª to 20ª, inclusive. In setting the pins for this group the first pin should be placed in the fifteenth hole of row 6ª and the other fourteen pins successively thereafter in the circular row of holes 15ᵇ, counting in a direction opposite to that of the rotation of the disk, as shown in Figs. 2 and 54. Following this order are two individual candidates which would be represented by two pins in the marginal holes of rows 21ª and 22ª, respectively, which, in turn, would be followed by six pins in the circular row 6ᵇ representing a group of six candidates in each party for judges, and so on until the pins are all set to bear a relation to the ballot-sheet.

The controlling mechanism to be used in conjunction with the pin combinations is as follows: Mounted upon a stud 201, Figs. 2, 6 and 54, which is rigidly attached to the frame partitions 1ᶜ is a loose sleeve 202, also shown in Fig. 3, to which is rigidly attached an elongated plate or arm 203, having a segmental rack 204 thereon. Supported in bearings in a bracket 205 at the lower and in a similar bracket 206 at the upper end of the plate 203, is a rock-shaft 207 having a pawl 208 upon its upper end, in position to be engaged by the stop-pins 200 in the disk. The plate 203 is yieldingly held in the normal position indicated in Fig. 2 by means of a coiled spring 209, Fig. 2, arranged to connect the same with the floor-plate, the backward movement of said part 203 being limited by said floor-plate. A central longitudinal bore is formed in the stud 201, Figs. 15 and 54, for the reception of a loose pin 210, which, when pushed in, as hereinafter described, is adapted to engage and actuate the upper end of a lever 211 pivoted between lugs 212, Fig. 54, upon the stud. The lower end of the lever is in position to engage pins 113 upon a locking bar 214, also shown in Figs. 20, 24 and 28. Said locking bar is located in bearings beneath the floor and is provided with teeth 215, arranged to project upwardly through slots in said floor and in position to engage with notches 216 in the rack-bars 57. Said notches are longer than the thickness of the lock-bar to permit simultaneous movement of the bar and rack. A releasing lever 192, heretofore referred to in connection with the lever 188, is pivotally mounted upon the stud 201 adjacent to a disk 217, Fig. 3, rigidly attached to the shaft 32. Said lever is provided with a tooth 218, Figs. 6 and 57, beveled as shown upon its forward face, in position to be engaged by pins generally designated by 219, projecting laterally from said disk. A tooth 220 upon the long arm of said lever, is adapted to engage with the teeth upon a ratchet-wheel 221 mounted upon a sleeve 222, which is journaled upon a stud 223 attached to the frame. A pinion 224 upon said sleeve, Figs. 2 and 3, is in engagement with the segmental rack 204. A spring 225, Fig. 6, serves to hold the tooth 220 in normal engagement with the ratchet-wheel 221.

A pawl 226, Figs. 3 and 6, is pivoted at 227 to an arm 228, which is rigidly attached to the shaft 65. When said shaft is rocked by the movement of a hand-lever, as above described, the pawl is brought into engagement with a tooth upon the ratchet-wheel 221, which it moves one notch, whereupon the pawl becomes disengaged as a result of the return of the shaft 65 to its normal position, thereby leaving the ratchet-wheel free to be rotated when the tooth 220 of the lever 192 is withdrawn.

The rock-shaft 207, Fig. 2, is not only adapted to rotate upon its own axis, but to be swung in the arc of a circle upon the axis of the part 203 and stands normally in the position indicated in Fig. 2, with the pawl 208 opposite to one of the rows of holes in series "a" adjacent to the outer circle of holes. When a hand-lever is moved and the ratchet-wheel 221 actuated, as described, by the pawl 226, the pinion 224, Fig. 2, in engagement with the rack 204 is rotated, thereby moving the upper end of the shaft 207 forward a distance corresponding to that between the concentric circles, in which the holes of the "b" series are located. If a stop-pin 200 is in the first hole, as shown in Fig. 2, the pawl 208 is caused to be engaged thereby, which causes the shaft 207 to be rocked. An arm 229, see also Fig. 54, which is rigidly attached to the lower end of said shaft in position to act upon the loose pin 210 in the stud 201, has its free end moved inwardly by the rocking of said shaft, thereby pushing the pin against the upper end of the lever 211 and moving the bar 214 into a locking position to lock all of the hand levers except that at the extreme right, which is known as the "pass-lever". It will be noted that there is no tooth on the limiter-bar opposite the right-hand rack-bar 57, as shown in Figs. 20 and 24. The tooth 218, Fig. 6, is then in the position indicated and all of the hand-levers except one, remain locked until said lever is actuated to release the ratchet-wheel 221 and permit the arm 203 carrying the limiter rock-shaft to be returned to its normal position. This result is accomplished by actuating the pass-lever which causes the disk 217 to be rotated one step in the direction indicated by the arrow, when a pin 219, Figs. 6 and 18, is caused to contact with the beveled face of the tooth 218 of the lever 192, thereby causing the short end of said lever to be pressed downwardly to release the tooth 220 and allow the spring 209, Fig. 2, to retract and move the part 203, having the segment 204, to its normal position. It is obvious that the locking-bar 214 must be restored to its normal position before any one of the voting levers can again be actuated. This result may be accomplished as follows: Supported upon the floor of the case is a block 230, Figs. 2, 6, 8 and 28, having a transverse notch therein, in which is pivoted upon a pin 231, a bent lever 232 having an arm 233 extending beneath the short arm of the lever 192. The other arm 234 of the lever 232 is in position to engage a pin 213 upon the limiter-bar 214 and restore said bar to its normal position when the short arm of the lever 192 is depressed.

It is essential, in voting upon "propositions," which requires but three hand-levers, viz., the "pass-lever" at the extreme right and the next two nearest thereto for "yes" and "no," that all of the others should be locked in order to avoid confusion. This is accomplished by means of a special locking-bar 235, Figs. 2, 6, 22, 23, 24, 25 and 28, which is supported in bearings beneath the floor 61 and is provided with teeth 236, better shown in Fig. 22, which project upwardly through slots in the floor adjacent to all of the rack-bars 57 except the last three at the right-hand, which correspond in construction to the others, but for purposes of greater certainty in description may be especially designated by 237, 238 and 239, respectively, Figs. 24 and 25, which are connected in their order with the hand-levers 240, 241 and 242, Figs. 1, 2 and 6, opposite the "yes," "no" and "pass" columns, respectively.

Pivotally mounted in a notch in the block 230, Figs. 2, 6 and 28, is a bent lever 243, which is pivoted upon the pin 231. The vertical arm of said lever is in position to engage one or another of two pins 244, 245 upon the bar 235, while the horizontal arm is passed through an opening in a depending portion 246, Figs. 2, 3, 6 and 59, of a lever 247, pivoted upon the stud 201. Said lever lies parallel to and is adjacent to the inner face of the internal gear 51, and is provided with a diamond-shaped cam 248 next to the flat face of said gear-wheel which is in position to be engaged by one or more pins 249, Figs. 6, 8 and 59, to lift said lever upwardly or by a similar pin 250 to push it down. The former action moves the lever 243, which, in turn moves the bar 235 to a locking position, thereby locking all of the hand levers not used in connection with proposition voting. As soon, however, as the last proposition is disposed of the pin 250 acts to depress the lever 247 and move the proposition-bar into a normal or unlocked position. The description and illustrations so far have been predicated upon the assumption of four propositions to be disposed of; hence the four pins 249 referred to, which should be removable; said pins bearing a fixed relation to the four marginal pins 200, shown in Fig. 2 and located respectively in the rows $1^a$, $2^a$, $3^a$ and $4^a$.

The pin in the row $5^a$, as has been stated, relates to the straight party vote, as placed upon the ballot-sheet. Inasmuch as the registering of such a vote would exhaust the voter's privilege, it is obvious that all of the hand levers including the pass-lever should be locked. Before describing such locking means, I will consider that employed for indicating to the voter the subject matter to be voted upon if propositions are to be considered, as well as the several party tickets represented by the respective vertical columns upon the ballot-sheet. Keyed to the shaft 9, Figs. 2, 3 and 6, is an arm 251, to the outer end of which is jointedly connected a link 252, which is, in turn, jointedly attached at its lower end to the lever 247. Keyed also upon the shaft 9 near its respective ends outside of the chains 14 for operating the upper ballot-roller, are arms 253, Figs. 12, and 27, the ends of which project through slots 254 in a label carrying plate 255, a face view of which is shown in Fig. 56, and which contains upon its outer face the label "Propositions." It should be remembered that the sprocket wheels 13, Fig. 12, and the roller 11, Figs. 48 and 50, upon which the ballot-sheet is mounted are loose upon the shaft 9, which is normally at rest and hence any rotation of said shaft by the movement of the arm 251 would have no effect upon the ballot-sheet, which is driven by the shaft 8.

Immediately above the top of the ballot-sheet is an opening 256, Figs. 1, 12 and 27, the length of which corresponds to the width of the ballot-sheet, which opening is protected by means of a transparent shield 257 of glass, celluloid or the like, through which may be displayed the label upon the plate 255. When the ballot sheet is in its initial position the cam 248, Fig. 6, is actuated by the first of the series of pins 249, thereby lifting the lever 247 and rocking the shaft 9, carrying the arms 253, which causes the plate 255 to be moved downwardly before the opening 256 and causes the label "Propositions" to be displayed to the voter, as shown in Fig. 1. The voter thereupon actuates successively one of the three right-hand levers to approve, disapprove or pass the several propositions. When the last of the series is disposed of, the cam 248, Fig. 6, is moved downwardly by the pin 250, thereby restoring the shaft 9 to its normal position and withdrawing the proposition label from sight. Opposite the opening 256 and behind the proposition plate, is a stationary curved plate 258 bearing labels corresponding in position to the vertical columns upon the ballot-sheet of the several political parties, such as "Republican," "Democratic," etc. As soon as the plate 255 is withdrawn, these labels, indicated in dotted lines in Fig. 1 are displayed to the voter. An indicator is provided for each of the several columns including that represented by the pass-lever, to indicate to the voter which measures or party he is voting for when he pulls a lever.

In each one of the spring controlled arms 87, Figs. 12 and 27, is a longitudinal bore into which is loosely projected a sliding pin 259 jointedly connected at 260 to a curved sheet metal strip 261 lying behind the plate 258, the forward end of which strip is arranged to project through a slot 262 in the casing. Upon the front of the strip is indicated a cross as shown in Fig. 1. When any one of the hand-levers is pulled outwardly, the bar 84 connected therewith and with the arm 87 is tilted, thereby pushing the cross-bearing indicator down opposite to the lever actuated. A comparatively slight movement of the lever is necessary to display the indicator so that if the voter sees that he has pulled the wrong lever, he may release it without registering and may then pull the proper one. The several "propositions" having been disposed of, the next thing in order, as indicated upon the ballot-sheet, is the "straight ticket." As soon as the last "proposition" is disposed of, all of the party levers are unlocked, as described. The voter is then free to decide whether to register a straight vote or pass it, which latter he may do by actuating the pass-lever. Should he decide, however, to register a straight vote, he can do so by pulling out and returning the hand-lever 59 opposite to the party of his choice which terminates his privilege; whereupon the machine is locked against further manipulation. This result can be accomplished as follows: Mounted loosely upon the stud 201, Figs. 8, 9, 10 and 54, is a lever 263, the rear inclined arm of which is in position to be engaged by a cam 264 upon the shaft 65. Upon the forward end of the lever is an upwardly projecting beveled tooth 265 adapted, when lifted, to be engaged by pins 266, Fig. 8, upon the margin of the disk 217. A lateral extension 267 is formed upon the forward end of the lever 263, having a slot 268 therein. Mounted loosely upon the stud 201 adjacent to the lever 263, is a secondary lever 269, to the upper end of which is jointedly attached a pawl 270, having upon its free end a lateral extension 271 adapted to rest loosely upon the extension 267 of the lever 263. A pin 272 is adapted to project loosely through the slot 268 to form a guide for the reciprocatory movement of the pawl. A tooth 273 is formed upon the outer end of the pawl 270 adapted, when lifted by the lever 263, to be engaged by a pin 274 in the disk 217, the position of which bears a predetermined relation to the pin 200 in the hole 5ª, as shown in Fig. 2, which pin is intended to control the registration of the "straight" vote.

The lower arm of the lever 269 is adapted to engage one arm of an elbow lever 275 having a pivot-pin 276 arranged to enter a bore in the floor 61. The opposite arm of said lever is arranged to engage a tooth 277, Fig. 10, upon the right-hand end of the general locking bar 159. The operation of said device is as follows: When the shaft 65 is rocked by the backward movement of a rack-bar, the cam 264 serves to tilt the lever 263, thereby raising both the tooth 265 and the tooth 273 controlled thereby. If, as the disk 217 is advanced, there is a tooth 266 in position to engage the tooth 265 the lever is reversed to the position shown in Fig. 8 and nothing further occurs; but if no such tooth is presented to throw said lever-arm down, a tooth 274 is caused to engage the tooth 273 and move it back, thereby actuating the lever 269 which, in turn, acting through the lever 275, serves to shift the main locking bar 159 to a locking position, thus locking all of the levers including the pass-lever. The voter having thus exhausted his privilege and locked the machine shifts the main lever 20 to its right-hand position and gives way to the next voter. The judges having released the special lock controlled by the part 33$^s$, Fig. 17, the next voter, having moved the main actuating lever to an unlocking position, proceeds to vote. Having registered his votes upon the "propositions", as described, it will be assumed for purposes of description, that he does not wish to register a "straight" vote. He thereupon actuates the pass-lever when the candidates for presidential electors are presented to him upon the ballot-sheet. If he wishes to vote for them as a body, he actuates the lever representing his party, as many times as there are electoral votes upon the ticket or fifteen times in the example shown. Referring to Figs. 2, 7 and 54, it will be seen that there are fifteen pins 200, in the fifteenth row of the "b" series commencing with the sixth row of the "a" series. This causes the shaft 207 to be moved inwardly, step-by-step, the pawl 208 moving in the arc of a circle corresponding to the curve of the rows of pin-holes in the "a" series, until it reaches the last of the fifteen pins, when a pin 219 upon the disk 217, acting upon the tooth 218, Fig. 6, of the lever 192, releases the ratchet 221 and restores the shaft 207 to its normal position.

Should a voter wish to distribute his vote between candidates of different parties, he may do so by pulling out as many levers as there are candidates in a given horizontal line upon the ballot for whom he wishes to vote. All the levers thus actuated will be restored to their respective normal positions by merely pushing one of them back, when a vote will be registered in each of the corresponding groups of counters in the several series actuated. When fifteen votes are registered, the limiter shaft will be tripped and restored to its normal position, thereby locking all of the levers except the pass-lever. It will be noted, however, that the voter having confined a portion of his votes to names upon horizontal lines, the disk 198 will have stood still during a portion of the time instead of advancing a step with each vote. The result will be that the levers will have been locked before all of the pins 200 of the group in question will have been passed. The voter must then use the pass lever to pass the remaining pins of that group and when this is done he can proceed to vote for any candidate for whom he is entitled to vote upon the remaining portion of the ballot. Having passed the group in question, there is next presented two individual candidates following in succession, for each of which he can cast but one vote; all of the levers but the one which he chooses to manipulate being locked. A group of six then follows represented by six pins in the "b" series. He may choose from names in the same horizontal line or in different lines of different columns, being limited, however, in the manner described, to six. Then follows two lines of individual candidates and a group of ten each of which are subject to the conditions relating to the individuals and groups already referred to.

The group of ten is followed by combinations representing a method for securing "minority representation," and is provided with means whereby, under the example illustrated, a voter may register three votes for one candidate, one and one-half votes for each of two candidates or one vote for each of three candidates in a given party, or he may divide his votes among candidates in different parties. In either case he is limited to the equivalent of three votes in whatever manner he may elect to register them and when so registered, all of the levers should be locked. For example, should he decide to register three votes for one candidate, the tooth 273, Figs. 8 and 10, will be tripped in the manner described for a "straight vote"; thereby actuating the general locking-bar 159, and preventing further action. Should he wish to avail himself of the second or third choice, he actuates the pass-lever one or more times and after having moved the proper party-lever and exhausted his privilege upon the ballot-sheet, the machine is finally locked against further manipulation. The provision contemplated is made to conform to the Illinois statutes and the regular printed ballot used in conformity thereto. A reference to 40$^a$, Fig. 53, will show that one horizontal line provides for "3 votes for 1 candidate," another, 42$^a$, "1½ votes for 2 candidates," and the third, 44$^a$, "1 vote for 3 candidates," with a space beneath each line, as in other cases, for printing the number of votes; so that the ballot itself indicates the choice. If any one of the three lines is chosen, the machine will be automatically locked as to the other two, and hence the action of the machine will be controlled by the relative positions of the horizontal lines.

While I have stated that two or more of the voting levers may be pulled out, one after another, to enable a voter to exercise an option in the selection of different candidates in the same horizontal line, I have not described the means employed for such accomplishment. For this purpose I employ what I term an option-bar 277, Figs. 2, 6, 8, 12, 21, 23, 24 and 25, which is slidably supported in bearings beneath the floor like the other lock-bars. The option bar is provided with an upwardly projecting tooth 278, better shown in Figs. 21, 24 and 25, for each of the rack-bars except the bar 239, connected with the pass-lever, said teeth being located upon the left-hand side of said rack-bars, and each being beveled upon its inner face as shown at 279. Formed upon each option bar so as to stand upon the right-hand side of said rack-bars, except 239, are projections 279ª, which are extended upwardly and thence horizontally toward the rack-bars, the horizontal portion being beveled as shown at 280. A notch 281 is thus formed beneath each of the horizontal extensions which is in alinement with a horizontal plate generally designated as 282, which is rigidly attached to the rack-bar, the bottom of the bar and plate in each instance being flush with each other. The edge of each of the plates 282 is extended laterally upon opposite sides of the rack-bar in lines oblique to the vertical plane of said bar, the part upon the right of the bar being extended rearwardly away from the face of the bar and that upon the left forwardly, so as to form diagonal faces 283 and 284, respectively. With respect to the pass-lever rack-bar 239, the conditions are reversed, the plate 285 thereon having its right-hand working face 286 extending laterally and obliquely from the rear toward the front and its left hand face 287 extended in like manner from the front toward the rear. A beveled tooth 288 corresponding in height to the teeth 278, is formed upon the end of the bar 277 at the right of the bar 239, while a projection 289 is formed upon the bar 277 at the left of the rack-bar. It will be noted that the beveled portions of the parts 288 and 289 are made to conform respectively to the working faces of the plate 285.

When any one of the party levers is pulled out, the working face 284 of the plate upon the rack-bar connected therewith is caused to engage with the beveled face 279 of the tooth 278 to move the bar 277 toward the left, thereby locking the pass-lever by throwing the tooth 288 in front of the plate 285. The notches 281 in the bar 277 are, however, made deep enough to permit either of the other rack-bars to be moved back without obstruction, thereby enabling a voter to select any desired number of candidates upon a horizontal line by pulling out the levers in successive order. The reversal of one lever serves to reverse them all. The length of the plates 282 is such that when a rack-bar is pushed back, its front edge stands behind and free from the option bar. The rear end of the rack-bar being lifted as hereinbefore described, to cause the rack thereon to engage with the gear 56. Said bar remains thus lifted until the plate 73, Fig. 24, is moved forward and freed from the notch 71. During this movement, the beveled face 283 of the plate 282 is engaged by the beveled face 280 of the option-bar, which is thus restored to its normal position, thereby enabling the pass-lever to be actuated if desired. The action of the pass-lever is the same in principle except that the directions of movement of the option-bar are reversed, which results in locking all of the other levers until the pass lever is restored to its normal position.

Owing to slight defects in workmanship, it might be possible, as a result of design or careless manipulation, to move any one of the rack-bars 57 far enough back to actuate the rock shaft 65, Figs. 6 and 24, without releasing the part 73 from the notch 70, which might result in actuating the ratchet-wheel 221 and thereby confusing the count. In order to avoid this, I provide means for preventing the return of a rack-bar until it is pushed back to its full limit.

Mounted in bearings beneath the floor 61 is a rock-shaft 290, Figs. 2, 12 and 24, having a series of locking dogs 291 loosely mounted thereon in alinement with the respective rack-bars 57. Notches 292 and 293, Fig. 24, are formed in the under face of the several rack-bars in position to enable a tooth upon the rear end of said locking dogs to enter one or the other according as the rack-bar is in one or another of its two extreme positions. Each of said dogs has its tooth pressed against the rack-bar by means of a spring 294 which connects an arm 295 thereon with the floor. The position of the notches 292 is such that when a voting lever is pulled out and the corresponding rack-bar is pushed thereby nearly to its extreme backward position, the dog enters said notch and prevents the return of the rack-bar until it reaches its full limit of backward movement when its rear end is lifted in the manner, hereinbefore described, sufficiently to free the bar from the dog and permits its return to a normal position. The function of the notches 293 is not only to enable the voted to display the "X" indicator above a column as a guide to his vote, but to prevent him from exhausting his privileges in the action of the machine without registering all of the votes intended, which latter might occur by reversing the hand-lever after it shall have caused a ratchet movement of one tooth on the wheel 221 and before reaching the full limit of outward movement.

In some of the States a restricted franchise is allowed to women, for which I have herein made provision. Journaled in bearings in the frame beneath the floor at the front of the machine, as shown at 296, Figs. 2, 5, 12 and 23, is a rock-bar 297. At the left hand of said rock-bar, as shown in Figs. 5, 11 and 58, is a shaft-portion 298, to which is rigidly attached an arm 299, which is connected to a stationary point upon the frame by means of a spring 300, the tendency of which is to move and hold the upper edge of the rock-bar beneath the forward ends of the levers 75 thereby locking all of the hand-levers except the pass-lever. A link 301 is connected at its forward end to a pin 302 upon the arm 299, while its rear end is jointedly connected to the depending arm of a lever 303 pivoted upon a stud 304. The upper end of the lever is jointedly connected at 305 to a bar 306, which is extended through a slot in the rear of the casing and provided with a knob 307 by means of which the bar may be manipulated by those having authority. A notch 308 in the bar 307 is adapted to be engaged by the casing when the bar is withdrawn so as to hold the bar 299 away from the levers 75 when no women are voting. A series of pins 309 are projected from the face of the gear 33 in position to engage a lug 310 upon the lever 303 as the gear is rotated. The pins are arranged to bear a predetermined relation to the names of candidates upon the ticket for which women are permitted to vote. Assuming the bar 306 to be pushed in to move the bar 299 to its locking position, as shown in Fig. 11, the candidate pulls the desired lever and if there is a pin 309 in position to engage the lug 310 the lever 303 is moved to release the bar 299 and permit the vote to be registered when the rock-bar will be returned to a locking position. It will thus be seen that as many votes may be registered as there are pins 309, and in case the latter do not occur in successive order the pass-lever may be used until the proper candidate is reached when a correspondingly placed pin 309 will permit a vote to be registered.

It frequently occurs that a voter may wish to vote for a candidate whose name is not upon the ballot-sheet. For this purpose I provide a special card-voting mechanism. Near the left hand end of the machine is located a separate counter-carrying chain generally designated by 311ª, Fig. 5, and a separate actuating lever 312ª, Figs. 1 and 11, which features with their coacting parts, are like those provided for regular party candidates and need not be further described.

In conjunction with the above is associated means whereby a card may be presented to and marked by the voter, automatically numbered and deposited within a closed receptacle.

Located within the main casing at the left hand end of the machine, is a special casing consisting of parallel vertical side-walls 311, Figs. 5, 11, 39, 43, 44 and 45, connected together by means of horizontally arranged top and bottom walls 312 and 313, which are provided with rear end flanges 314, 315, respectively, Figs. 5 and 11. Said flanges are attached to the rear wall of the main casing by means of screws 316. The casing extends from front to rear of the main inclosure and is closed at the front primarily by means of the slanting wall 4, Figs. 1 and 11. Within the inclosure described is located a sheet-metal follower frame consisting of an inclined front portion 317, with rearwardly extended parallel side flanges 318, which are bored to serve as bearings for short shafts 319, each of which is provided with a pair of gears 320 adjacent to said flanges. The gears upon the two shafts intermesh with each other, while those upon the upper shaft intermesh with stationary racks 321 upon the outer edges of the top wall, and those upon the lower shaft with like racks 322 upon the bottom of said casing. A winding drum 323 has its shaft mounted in supports 324 and is driven by means of a clock-spring 325, Fig. 5, mounted in the usual way upon the supporting shaft. A cord 326 is wound upon the drum 323 from which it is carried forward over a pulley 327 and attached to the follower frame. The tension of the clock-spring tends to move the follower toward the front of the chamber so that a package of cards 328 may be pressed with a resilient pressure against the front. An opening is formed in the casing 4 of the full size of the chamber, which opening is normally closed by means of a hinged door 329, Fig. 1, provided with any approved form of lock. An opening 330 of lesser area than that of the cards to be inserted within the chamber is formed in said door for the purpose hereinafter stated.

Within the casing 4, directly in front of the card-chamber, are two metal plates 331 and 332, Figs. 39 to 45, inclusive, having longitudinal grooves 333, one of which is shown in Fig. 39, into which pins 334, Fig. 39, are projected from the frame so that said plates are adapted to slide up and down in front of the card chamber. The two plates being normally connected with each other so as to be moved as one by means of a hook 335, Figs. 40, 41 and 42, pivoted at 336 in a notch in the lower end of the plate 331 and connecting with a suitable opening 337 in the part 332.

The plate 331 is cut away upon its rear face, as shown at 338 throughout its width and of a length corresponding to the opening or height of the card chamber; the depth of said cut being equal to the thickness of a card. When said plate is in the position indicated in Figs. 39 and 43, the cut-away portion is in registration with the card-chamber so that the foremost card is pressed therein by the action of the follower. An opening 339 is formed in the plate 331 in position to register with the opening 330 in the door when the slide is in the position last described.

The object of making the parts 331 and 332 separable is merely to provide means for readily introducing the cards to the card chamber. Upon opening the door 329 and releasing the hook 335 by means of the notch 340 adapted to receive a finger-nail, the part 331 of the slide is pushed up until its lower end is above the level of the top of the card chamber, when the latter may be filled with cards and the part 331 returned to its normal position and locked to the part 332 by means of the hook 335. The door 329 is then closed and locked, when the cards may be moved by the mechanism in the manner hereinafter described.

The following mechanism is provided for manipulating and registering the cards: Rigidly attached to the shaft 60, Fig. 11, upon which the voting levers are pivoted, is a segmental gear 341, which meshes into a gear 342, mounted upon a stud 343 attached to the upright partition. To the hub of the gear 342 is attached a gear segment 344, the teeth of which are in engagement with a rack 345, Figs. 11 and 39 to 45, inclusive, extending downwardly from the lower end of the slide 332. Mounted upon the stud 343, a stud 346 attached to the case and upon shafts 347, 348, respectively, see also Fig. 5, are sprocket wheels 349 over which is trained an endless sprocket-chain 350, having as many links as there are links in the counter-carrying chain 311$^a$, which is actuated by the hand-lever 312$^a$. Each link consists of two parallel plates formed from sheet-metal and jointed by the usual pivot pins 351. Each plate of each chain-link is provided with an extension 352, into which are riveted or otherwise rigidly secured crossbars bearing numerical characters 353, better shown in Figs. 5, 39 and 43 to 45, inclusive. The chain 350 is located beneath and in the same vertical plane as that of the card receptacle. The shafts 347, 348 of the upper sprocket-wheels 349 are journaled in the opposite ends of a bar 354. Sair shafts project through the bar and rest in slots 355, Figs. 11 and 39, in depending portions of the plates 311 forming the side walls of the card receptacle, which forms sliding bearings therefor and enables the bar 354 to be moved longitudinally. A spring 356 connected at one end to a plate 311 and at the other to a pin upon said bar, serves to hold the latter in the position indicated in Figs. 11 and 39 with the shafts at the rear ends of said slots. Stretched around the chain so as to be opposite to the printing characters and supported upon pins or rollers 357 is an inking ribbon 358 normally out of contact with the type.

Pivoted at 359 upon the frame is a lever 360, the upper end of which is connected to the shaft 348 while the lower end is bent forwardly, as shown at 361, thence laterally as indicated at 362, Figs. 11 and 39, and again outwardly as shown at 363 so as to project beyond the front face of the rack-bar 345. Said projection is beveled as shown at 364. Upon the rear face of the sliding plate 332 upon a stud 365, is pivoted a spring-controlled pawl 366 which is provided with a beveled portion 367 adapted to engage the bevel 364 upon the end of the lever 360 for the purpose of actuating said lever as hereinafter described.

The operation of said card voting mechanism is as follows: When the lever 312$^a$ is pulled out, the segmental gear 341 is oscillated thereby rotating the gear 342 to the left, which causes the segmental gear 344 to lift the rack 345 and with it the card slide, consisting of the parts 331 and 332, far enough so that the cut-away portion 338 upon the back thereof will be brought into registration with the top of the card chamber, thereby allowing the foremost card to be pushed into it by the follower and permitting the opening in the slide to register with that in the door so that the blank card may be exposed before the opening 330, Fig. 1, to permit the voter to write thereon the name of such candidate as he may prefer, whereupon he reverses the lever 312$^a$ thereby registering a vote upon one of the groups of counters in the series carried by the chain 311$^a$ opposite thereto. The same action of the lever serves to reverse the action of the gears described, and to move the slide 331 downwardly and with it the marked card. Inasmuch as the lower front sprocket-wheel 349, Fig. 11, is attached to the gear 342, the sprocket-chain 350 is likewise advanced one step or a distance corresponding to the length of one link, thereby causing a numbering type 353, to be presented opposite to a portion of the marked card 328 as indicated in Fig. 44. At the same time the beveled portion 367, of the pawl 366, is brought into engagement with the beveled portion 364 upon the end of the lever 360 which tilts the latter upon its pivot and moves the bar 354 forward, thus pressing the type 353 against the ink-ribbon 358, which, being in contact with the back of the card, causes a number to be printed upon said card. The cut-away portion of the slide is curved as shown at 367$^a$, which enables the card with the number impressed thereon to be released when the downward movement of the slide is completed as clearly indicated in Fig. 45. Any suitable receptacle may be provided in the bottom of the casing to hold the cards. The numbers upon the chain 350 are arranged in consecutive order throughout the cycle and correspond in position upon the chain to the horizontal lines upon the ballot-sheet, so that when a card is voted, the number thereon designates the office for which the vote is cast and the registration of a number upon the card voting chain serves with the numbered cards as a check against error as well as to indicate the proper number of votes cast. It will be understood that when the card-vote lever is in its normal position the slide is down and hence the opening 330 is closed so that the cards are securely protected against unauthorized marking.

The voting machine above described may be readily adapted for use in primary elections by providing adjustable locking means for locking all of the hand-levers but one or a plurality, if necessary, representing a given party, which means may consist of the following described elements. Slidably supported in brackets 368, Figs. 2, 6, 11 and 61, is a bar 369 which is provided with a rack 370 upon its right-hand end as shown in Figs. 2 and 61. A short shaft 371 is mounted in bearings in brackets 372 attached to the frame. A pinion 373 upon one end of the shaft is adjusted to engage the rack 370, while a like pinion 374 upon the opposite end of the shaft is in engagement with a rack 375, which is extended upwardly and supported in slidable bearings. The upper end of the rack is in engagement with a pinion 376 upon a stud 377, which is extended through the casing and provided with a knob 378 upon its outer end, also shown in Fig. 1. A vertical slot 379, Fig. 1, is formed in the casing parallel to the rack-bar 375 to which is attached a pointer 381. The names of the several parties provided for upon the machine are indicated in horizontal lines adjacent to the slot. The rotation of the knob 378 through the action of the gear 376 serves to move the rack 375 up or down, and, through the action of the pinions 374, 373, to move the bar 370 in proportion. Adjustable blocks 382 are connected to the channel-bar 369, adjacent to each of the rack-bars 57. Holes are formed in each of the blocks 382, adapted to register with like holes 383 in the bar 369. By means of pins 384 the blocks may be arbitrarily adjusted to any desired position with reference to the rack-bars 57. Slots 385 are formed in the floor 61, as shown in Fig. 15, for the reception of lugs 386, Figs. 24 and 61, which are extended downwardly through the slots in position to be engaged by the blocks 382.

The blocks are provided with notches 382$^a$ and are so adjusted with reference to the rack-bars and to the indicator 381 and the names of the several political parties upon the ticket, that when the indicator is opposite to a given name the blocks 382 of all the rack-bars 57 are caused to lie in the path of movement of the rack-bars 57 and to engage the lugs 386 thereon except the one corresponding to the rack-bar of the particular party indicated, with which the notch 382$^a$ will register, thereby locking all of the voting levers except that one. Fig. 61 clearly illustrates this feature. In that view the right-hand edge of the notch is flush with the left-hand edge of the bar 57 and with each successive bar the distance is doubled, which distance bears a fixed relation to the spaces between the party names upon the indicator shown in Fig. 1. Hence it follows that if the voter should represent the last party named upon the list, the block 382 opposite the left-hand rack-bar should be long enough to lock that bar when the notch 382$^a$ intended for the right-hand bar is in position to register therewith, or in other words, when the indicator 381 is at the lower end of the slot 379.

When a voter appears and announces his party, the knob 378 is rotated until the indicator stands opposite to the name of that party whereupon the voter operates the register for such candidates as he may select. Should the printed ballot fail to contain the names of his choice, he may use the card-vote mechanism to register his preference. Should there be a larger number of candidates than can be provided for in one column of the ballot-sheet, the blocks may be adjusted to allow two or more vertical columns and two or more voting levers for each party. The limiting mechanism above described for general voting may be adjusted to limit the number of candidates to be voted for at primaries.

It sometimes occurs in group voting that a given candidate may be indorsed by different parties for the same office. In such cases, the name of the candidate would necessarily be repeated in the same line in different columns. Were there no modification of the means above described for group voting, it would be possible for one voter to cast two or more votes for the same candidate. In order to avoid this result, I provide the following described mechanism: Located behind the carrier chains and in a plane parallel therewith, are two shafts 387, Figs. 12, 14 and 60, which are supported in suitable bearings, the one forming in effect a prolongation of the other. Said shafts form stationary supports for a series of sleeves or hubs 388, having forwardly extended arms 389, the forward ends of which stand close to, but out of contact with the pins 47, Figs. 3, 4, 5, 31 and 36 to 38, inclusive, upon which the counting wheels of the carrier chains are mounted. The pin 47 for each group of counters is shown to project laterally from one side of the chains. Whenever a name in a group of candidates is repeated in the same line, a roller 390, Figs. 12 and 60, is attached to a pin 47 in each group of counters corresponding to the location of the name upon the ballot-sheet, which roller is adapted, when the chain is actuated, to engage that one of the arms 389 which is opposite thereto. The number of lugs would vary according to the number of times the name to be indorsed is repeated. Each of the sleeves 388 is held in a normal position by means of a light coiled spring 391 and is provided with a cam 392 upon its rear, having a shoulder 393 upon the lower part to serve as a stop. Shafts 394 are arranged behind and parallel to the shafts 387 and serve in like manner as supports for sleeves 395, which are loosely mounted thereon and are yieldingly held against rigid collars 396 by means of springs 397, which, in turn, bear against rigid collars 398. A lug 399 is formed upon each of the sleeves 395 in position to be engaged by the cam 392. Rigidly attached to each sleeve and extending downwardly therefrom, are arms 400, the lower ends of which stand normally adjacent to the rear ends of the rack-bars 57, as shown in Figs. 3, 4, 5, 12 and 24, and slightly below the level of the upper edge of said bars, a notch 401, Figs. 24 and 60, being formed in the rear upper part of the bar to permit the latter to be lifted in the course of its operation as hereinbefore described. A slot 402, Figs. 15 and 24, is formed in the horizontal portion of the angle bar 63, the main body of said notch being extended rearwardly in alinement with the rack-bars 57. The lower ends of the arms 400 project downwardly through the lateral extensions of said slots, so as to stand normally adjacent to the ends of said rack-bars as stated. A series of lever-like locking dogs 403 are pivoted at 404 to the angle-bar 63, so that the body of each may stand normally parallel with the slot 402. An arm or tooth 405 is formed upon each of the dogs 403 and is caused to project over the adjacent slot 402. The rear end of each of the dogs 403 is pivotally connected as shown at 406 to a connecting bar 407.

The operation of said device is as follows: Rollers 390 having been attached to the pins of the registering groups corresponding to the name or names as repeated upon the ballot-sheet, the voter, upon the presentation of that line in a voting position, actuates the key representing the party of his choice which causes the lugs 390 upon the pins of the corresponding groups to engage and tilt the arms 389, thereby causing the cams 392 to actuate the lugs 399 upon the sleeves 395, thus sliding the latter to abnormal positions against the pressure of the springs 397. This, in turn, causes the depending arms 400 to be moved laterally so that the lower ends thereof will lie in the paths of movement of the rack-bars corresponding to the groups intended to be affected. The arm corresponding to the lever actuated is thus engaged by the bar and pushed back in the slot 402 until it is engaged by the tooth 405, which is actuated thereby, thus moving the forward end of the dog diagonally over the slot while the rear end is moved in an opposite direction to actuate the bar 407. The movement of the latter causes the forward end of each one of the corresponding dogs 402 to be moved laterally over the adjacent slot and behind the depending arm 400 standing therein, so as to effectually lock the same against action and prevent the movement of any of the remaining party levers of any party indorsing the candidate in question. The reverse movement of the key actuated, causes the notch 401 in the rackbar, to engage the lower end of the arm 400 and reverse it, which movement serves to restore the dog 403 in contact therewith, to a normal position and through it and the bar 407, the remaining dogs 403 are also restored. The springs 397 upon the shaft 394 thereupon cause the several sleeves 395 to be restored to their respective normal positions where they remain throughout the cycle or until actuated by dogs 390, upon other groups of counters for a like purpose.

One of the important objects of my invention is to provide means for indicating the summaries of votes registered in such a way that a comparison of different totals may prove their accuracy or enable inaccuracies to be determined and located. In order to accomplish this result, it is essential that a record should be made of the fact whenever a voter waives his right of choice concerning a measure or candidate. The number of votes registered added to the number of privileges passed, would obviously be equal to the total which might be registered by any one voter. I have stated that a chain carrying a series of groups of counters is provided for the pass lever the same as for the party levers and that whenever the passlever is actuated, a counter in a corresponding group is moved to register such act, but in case a voter should reverse the main lever before exhausting his privilege, it follows that unless special means be provided therefor, a portion of the privileges waived would not be registered. To meet this contingency, I provide the following described means to be controlled by the main lever for causing the registration of such of the waived privileges of a voter as may not be registered by the pass-lever.

It will be remembered that the movement of the main lever 20 from its extreme left to its extreme right-hand position, causes all of the counter-chains to complete a cycle of movement and that when in the first named position, the tooth 191, Fig. 4, is in the notch 187 of the cam 186. As soon as the cam commences to rotate, however, the tooth is moved out of the notch thereby actuating the lever 188, and maintaining it in a reversed position until the lever 20 is again shifted to the extreme left. Jointedly connected to the lever 188 at 408, Figs. 3 and 12, is an upright bar 409, the upper end of which rests normally beneath a lug 410, Fig. 12, upon the arm 409. A guide 411 attached to the frame serves to hold the bar 409 in vertical alinement with the lug 410, while pins 412 serve to limit the forward and backward movement. When the main lever 20 is actuated from left to right, the bar 409 is moved through the action of the cam 186 and lever 188 so as to lift the arm 109 and bring the counter pawls or fingers into engagement with the successive groups of counters upon the pass lever or "no-vote" chain, in a manner common to all of the counters as described, so as to move one counter in each successive group of that series of counters which the voter has failed to actuate by the pass lever. It should be recalled in this connection that the disk 36, Fig. 16, is in its initial position when the lever 20 is at the left and that with each step-by-step movement of the voting levers or pass-lever, the notch 35, Fig. 17, is moved one step away from the pawl 37 while the disk 36 remains at rest. When, therefore, the lever 20 is reversed, all of the distance thus traveled by the gear 33, representing a part of the cycle, will have to be traversed by the pawl before the clutch can act. As soon as this occurs the remainder of the cycle will be completed and the ratchet mechanism upon the "no-votes" chain, being held in an operative position by the no-vote bar 409, all of the no-vote counters not actuated by the retiring voter, through the pass-lever, will be moved by this mechanism.

In addition to the individual groups of counters which are intended to indicate the number of votes cast for the respective candidates I provide a counting mechanism adapted to register the total number of votes cast for the candidates of the several parties, as well as for indicating the total of privileges passed by the several voters at one election. Mounted upon the shaft 60, Figs. 1 and 12, adjacent to each of the hand levers 59 is a group of numbering wheels 414, which are arranged in the usual well known manner, with connecting means adapted to communicate motion to each in its order as a result of actuating the units wheel which is provided with the usual ratchet-wheel 415. The latter is adapted to be engaged by a pawl 416 on a lever 417 pivoted at 418 to a bracket 419 upon the frame. The lever 417 is bifurcated as shown at 420 so as to engage an extension of one of the pins 58 which serve to connect the hand-levers or keys to the rack-bars. Whenever a key is actuated the ratchet mechanism controlled thereby serves to move the unit-wheel of the series one step thereby registering one of said movements.

A series of doors 421, Fig. 1, are hinged at 422 to the casing to give access to the counters 414, which are normally concealed. Each cover is provided with a flange 423 adapted, when the cover is closed, to rest beneath a horizontal bar 424 which may be secured by means of any suitable lock 425 to the casing.

It is of vital importance to be able to determine in advance of an election that the counters and other parts of the machine are properly adjusted and in working condition. It is also important that the voting levers should be locked while making a test for this purpose in order to avoid possible error or fraud. Furthermore, provision should be made for operating all of the counters while the voting levers are locked. It is likewise desirable that the results of an election should be printed upon the ballot-sheet while said levers and counters are locked. These various results may be accomplished by the following described means: Supported in bearings in the partitions $1^c$ $1^d$ beneath the floor 61 is a rock-shaft 426, Figs. 2, 6, 12, 23, 62 and 63, which is parallel with the shaft 74, upon which the levers 75 are mounted. Rigidly attached to said shaft opposite to the rear ends of the respective levers 75 are hooked arms 427, each of which, when said shaft is rocked forwardly, is adapted to engage an upwardly bent portion 428 upon the lever opposite thereto in the manner clearly shown in Fig. 62. An arm 429, which is rigidly attached to the shaft 426, has its outer end jointedly connected to a controlling bar 430, which is bent rearwardly at its lower and forwardly near its upper end, to prevent interference with other parts. The upper end is provided with a yoke 431, having a rectangular opening therein, within which is located a cam 432 keyed to a horizontal shaft 433, having its bearings in the partitions $1^c$ $1^d$, respectively. Mounted upon said shaft is a gear wheel 434, which is in mesh with a rack-bar 435, the rear end of which is caused to project through an opening in the rear wall of the case and is provided with a knob 436, by means of which it may be operated from without the case. A guide-block 437, serves to hold the bar in mesh with the gear 434, while a stop-pin 438 is provided for limiting the backward movement of the rack-bar. Said bar is provided with notches 439 and 440 in its lower edge, the location of each of which bears a predetermined relation to the relative positions of the two cams upon the shaft 433, for the purpose hereinafter stated.

Rigidly mounted upon the shaft 433 adjacent to the cam 432 is a like cam 441, which is fitted within a rectangular opening in a yoke 442 upon the upper end of an inclined bar 443, the lower end of which is jointedly connected at 444 to an arm 445 upon the end of the shaft 446, having bearings in the partitions 1$^c$ 1$^d$ and lying beneath and parallel to the shaft 74. Arms 447, Figs. 12 and 23, are rigidly attached to the shaft 446 and arranged to extend rearwardly beneath the respective levers 75 so that the forward ends are adapted to engage the lower ends of the ratchet controlling bars 84, to lift the same when the shaft is rocked, so as to tilt all of the levers 109, as shown in Fig. 62, and bring the teeth of the pawls into operative engagement with those of the ratchet wheels 104 for actuating all of the counters when the main lever is operated.

The rack-bar 435 is so adjusted with reference to the gear 434 that when moved in or out to its full limit, it will cause the shaft 433 to be rotated two hundred and seventy degrees, and the cam 432 is so formed and adjusted upon the shaft as to cause one of its highest points to be uppermost when the rack-bar is pushed in to its full limit, as shown in Fig. 2, and also when withdrawn to the first notch 439, as shown in Fig. 62; said notch being so located that when it is reached the bar will have caused the shaft to rotate ninety degrees, thereby bringing the second high-point of said cam in the position previously occupied by the first. In either case the bar 430 will have been lifted and the shaft 426 rocked so as to cause the hooks 427 to engage the forward ends of the levers 75 and lock them against movement.

The cam 441 is of the same contour as that of its fellow but so placed upon the shaft that the two will have one high point and one low point in common diametrically opposite to each other and a high point upon one diametrically opposite to a high point upon the other. With this adjustment, three different positions of the rack-bar are contemplated for different purposes. When said rack-bar is in the first position shown in Figs. 2 and 6, one of the high points of the cam 432 is uppermost and the hand-levers are locked as stated. At the same time the low point of the cam 441 is uppermost, which causes the arm 445 to be pushed down, thereby leaving the bars 84 and the ratchet elements in their respective normal positions. When, therefore, the bar 435 is in its first position, the main lever 20 may be actuated to move all of the counter-chains through a complete cycle without actuating the counters. This enables the several groups of counters to be successively moved to a given position opposite the notches 146, Fig. 55, where they may be inspected and adjusted as hereinbefore described. The locking of the hand levers at this time eliminates the possibilities of mistake or chances of fraud from that source. Moreover, no injury can result to the machine by the careless movement of the main lever. This position of the rack-bar may be termed the "testing position" as it is also the "printing position" hereinafter to be referred to.

The "second position" is indicated in Fig. 62, in which the bar 435 is in the notch 439. In this position the hand-levers are still locked by the hooks 427, but the yoke or head of the bar 443, being upon the high point of the cam 441 the arm 445 is lifted, thereby rocking the shaft 446 and lifting the bars 84 through the action of the arms 447. This, in turn, sets the pawls of the ratchet mechanism into operating positions, respectively, so that upon operating the main lever, all of the counters will be actuated throughout the cycle. This position enables the counters to be tested to show their working condition. Moreover, it enables all of the counters to be set at zero before commencing to vote.

The "third position," viz.; that in which the rack-bar is withdrawn so as to engage the notch 440, as shown in Fig. 63, is what may be termed the "voting position." When the rack-bar is thus disposed, the low points of both cams are uppermost, which serves to lower both bars 430 and 443, thereby unlocking the levers 75 and restoring the bars 84 to their respective normal positions when the voting levers are free to be operated in the manner hereinbefore described.

It will be remembered that when the main lever 20 is actuated, the bar 409, Fig. 12, is lifted to bring the ratchet mechanism into operation upon the chain operated by the pass-lever. It is obvious that this action should be avoided when the rack-bar 435 is in a "testing" position. This result may be accomplished by means of a short arm 448, Fig. 12, mounted upon the shaft 433 and so adjusted as to push the bar 409 into an abnormal position, as shown in said figure, so that the bar may be lifted without engaging the lug 410 and lifting the pawl 109.

After registering the final vote, it is desirable that all of the counters should be locked against rotation upon their respective axes and so maintained throughout the complete chain-cycle. This may be accomplished as follows: Loosely fitted in the lower part of each of the arch-like frames 133, and resting upon the channel-plate 128, Figs. 26 and 55, is a U-shaped fitting, generally designated by 449, having upwardly extended wedge-shaped portions 450 adapted, when the part is lifted, to be interposed between the lower ends of the normally yielding levers 145 and 151 and the walls of the casing, so as to lock said levers against movement and thus prevent the locking dogs 134 from becoming disengaged from the ratchet teeth during their passage over the notches 138 and 146 of the arch. An opening 451 is formed in each of the plates 149, through which is extended a downward projection or stud 452, Fig. 26. Mounted upon the shaft 433 beneath each of said projections, is a cam 453, which, when the shaft is tilted by the movement of the rack-bar to its first position, acts to lift each of the parts 449, thereby locking the levers 145 and 151 against movement. When, however, the rack-bar 435 is in either the second or the third position, each of the cams 453 assumes the position indicated in Fig. 26 and permits the part 449 to descend so that the counters may be actuated by the ratchet mechanism.

One of the most important purposes of my invention, as stated, is to provide means for printing upon the ballot-sheet directly from the counters, both for the purpose of testing the relative positions of the counters previous to voting and for indicating the final results. This may be accomplished as follows: Supported in bearings in the partitions 1$^c$, 1$^d$ is a horizontal shaft 454, Figs. 1 and 12, which is adapted to be partially rotated by means of a lever arm 455, Fig. 1. Rigidly mounted upon said shaft opposite to each of the several counter chains is an eccentric 456, Fig. 12, upon which, in turn, is mounted a loose roller 457. The eccentrics are so adjusted as to cause the rollers 457 to lie close to the back of the ballot sheet 6, but normally out of contact therewith. When, however, the lever-arm 455 is moved to an abnormal position, the rollers, through the action of the eccentrics will be pressed against the back of the ballot sheet, the face of which, in turn, would be pressed against the faces of the counters. Assuming the printing faces of the latter to be inked, or a carbon sheet 458, Fig. 50, to have been interposed between the two, and the rack-bar 435 to have been moved to the primary position, a complete movement of the main lever would cause each group of the several series of counters to be successively presented opposite to the rollers 457, thereby causing the desired number in each group to be printed upon the ballot-sheet in proper proximity to the measure or candidate corresponding to that group.

In testing the machine at the outset to show a printed test, the bar 435 would be set in its primary position, and the main lever moved to complete a cycle of the counter chains. Each group of counters could then be inspected and adjusted one by one. The main lever having then been moved to the left-hand position, and the rack-bar 435 set to the "second position," the movement of the main lever ten times would cause the result of such movements to be printed upon the ballot-sheet, thus enabling an error of adjustment to be detected and corrected before proceeding with an election.

A test print may be taken as follows: Assuming that each group of counters is adapted to print a maximum of 999, and the rack-bar to be adjusted to a secondary position, the several groups may then be set to 990. Upon moving the rack-bar to a primary position and actuating a main lever a print may be taken from each group of counters when each impression will show 990. Upon again shifting the rack-bar to its secondary position and actuating the main lever ten times, reversing the rack-bar to a primary position and again taking a print, the impression in each instance will indicate zero throughout the cycle, thereby showing that the mechanism is properly set to commence voting. This fact having been established the bar 435 is moved to the third or voting position when the voting may be commenced. At this time the main lever would be in the right hand position, thereby causing all of the hand-levers to be locked with the head of the ballot presented to the voter. The first act of the first voter would be to unlock the voting keys or hand-levers by moving the lever 20 to the extreme left. At this stage the "proposition bar" would be lowered and there would be displayed before him the word "Propositions", as shown in Fig. 1, and the words at the head of the ballot indicating the measure or proposition to be voted upon as, for example, "Amendment to the constitution", and in the proper columns the words "Yes" and "No". These are intended to stand above and parallel to a line 459 upon the glass front, which is adapted to serve as a guide to the voter. In the position of the ballot indicated in Fig. 1, the head-line of the ballot-sheet 460, Figs. 51 and 52 would be hidden by the line 459. Should the voter favor the measure, he actuates the hand-lever 240, whereupon the part 261 with a cross thereon is displayed, which assures him that he is voting "Yes". If he declines to vote upon the measure he may actuate the pass-lever 242, when the next line upon the ballot-sheet would be presented above the line 459. In either case, upon reversing the key the ballot-sheet is moved up one line, and if he has disposed of the propositions, the proposition bar will have been withdrawn and the names of the parties above the respective columns will be displayed with the words: "Straight ticket"

at the head of each. He then exhausts his privilege by moving one key and voting the entire ticket or by moving the pass-lever and proceeding to make his selections in the manner already described. Upon exhausting his privilege, he moves the main lever to the right and gives place to the next voter. When all of the votes are registered, the bar 435 is pushed in, thereby locking the voting levers whereupon the final result may be printed upon the ballot in the manner described, in which case the number of votes registered for each candidate would be printed upon the ballot adjacent to the name as clearly indicated in Fig. 52, in which "92" for example, would indicate the number of votes for the straight Republican ticket and so on throughout the list. Upon closing the polls the aggregate of votes cast for the several candidates and measures of each party would be indicated by the counters 414, which figures could be added to the printed ballot-sheet and certified and returned by the election judges to the commissioners.

Having thus described my invention, I claim:

1. The combination with a ballot-sheet having thereon the names of party candidates disposed in separate lists with those of the several candidates for the respective offices in relatively corresponding positions, of means for movably supporting said sheet, a series of groups of movable counters for each list, each group corresponding in relative position to that of a name upon said ballot-sheet, means for actuating said ballot-sheet, means for moving a group of counters to correspond to the position upon the ballot-sheet of a candidate to be voted for, and means for actuating a counter to register a vote.

2. The combination of a plurality of series of groups of counters, each series being mounted upon a flexible movable support, the supports of the several series being in a common plane, means for independently actuating any member of any group of any series to register a vote when in a predetermined position, and means for locking the members of the remaining groups against registering movement.

3. The combination with a ballot-sheet having the names of party candidates disposed in separate lists, those of the several parties representing the respective offices being arranged in relatively corresponding positions, a series of groups of counters for each of said lists, each group bearing a fixed relative position to that of a name in the list with which it corresponds, a flexible longitudinally movable support for each series of groups of counters, independent means for moving said several supports and ballot-sheet step-by-step in unison, and means for locking said moving means, so that the same can be actuated but once upon a given group during the movement from end to end of said ballot-sheet.

4. In a voting machine, the combination of a plurality of series of groups of counters, each series being mounted upon an endless chain, revoluble means for supporting and moving said chains simultaneously in parallel planes, a ballot-sheet mounted upon rollers to complete a cycle of movement in conformity with a like movement of said chains, said sheet having thereon a plurality of columns located respectively in the planes of said counter-bearing chains, each column representing a party and having the names of candidates arranged thereon to conform to the respective positions upon the chain opposite thereto of the groups of counters, means for simultaneously moving said chains and ballot-sheet, and means for actuating a counter in one of said groups with each of said movements.

5. In a voting machine, the combination of a plurality of endless counter-carrying chains, a ballot-sheet mounted to move in unison with said chains, a plurality of levers corresponding to the different parties for actuating said chains and ballot-sheet with each vote registered upon the counters, and independent means for moving said chains and ballot-sheet throughout a complete cycle.

6. In a voting machine, the combination with a plurality of series of groups of counters arranged to be moved throughout a cycle, of a ballot-sheet bearing the names of party candidates in separate columns, the names of the candidates conforming in position, respectively, to that of the groups of counters, actuating elements representing the respective parties for moving said groups and ballot-sheet step-by-step to complete the cycle, means for actuating a counter in a predetermined group with each step and a general actuating element for completing the cycle when left incomplete by the movement of the actuating elements representing parties.

7. In a voting machine, the combination with a plurality of series of groups of counters, of a ballot-sheet arranged to complete a cycle of movement in unison with said series of counters, independent voting levers corresponding to different parties for moving said counter-groups and ballot-sheet step-by-step, a main actuating element, and means controlled thereby for locking all of said levers when said actuating element is in one predetermined position and for releasing them when in another.

8. In a voting machine, the combination with a plurality of series of groups of counters, of means for actuating the counters of any group of any series, means for moving the several series step-by-step, means for actuating a counter with each step, means for locking all of the counters but one against movement during a given step, means for passing one or more groups without actuating a counter, means for locking said counter actuating means and said counter passing means when a predetermined number of votes have been registered, and separate means for thereafter completing a cycle of movement of said several series of counters to bring predetermined groups of counters to initial positions, respectively.

9. The combination with a ballot-sheet having separate lists of party candidates, of a plurality of series of groups of counters, each series representing a party list while each group is arranged to bear a predetermined relation to a name therein, said ballot-sheet and counters being mounted to move simultaneously through a distance corresponding to the length of the longest list upon the sheet, means for actuating any counter of any list, means for locking said actuating means, and a movable controller having controlling elements arranged to bear a predetermined relation to the names upon the ballot-sheet for bringing said locking means into action at predetermined periods.

10. The combination with a movable ballot-sheet having thereon a plurality of lists of party candidates, of a plurality of series of groups of counters, each group of which is arranged to bear a predetermined relation to a name in one of said lists, a controller consisting of a series of adjustable elements said elements being capable of any predetermined arrangement with respect to the names upon said ballot-sheet, means for moving said ballot-sheet, counters and controller step-by-step in unison, means for actuating one of said counters with each of said movements, and means governed by said controller for locking said actuating means when one of said counters is moved to a predetermined position.

11. The combination with a ballot-sheet bearing separate party lists of candidates, of a series of groups of counters for each list, each group corresponding in relative position to a name upon said sheet, means for actuating said counters, locking means for arbitrarily locking said actuating means, a controller for actuating said locking mechanism, said controller having elements set therein to conform relatively in position to that of names upon said ballot-sheet, and means for moving said ballot-sheet, counters and controller in harmony with each other until a predetermined set of counters governed by said controller are actuated.

12. The combination in a voting machine of a movable ballot-sheet and a plurality of series of groups of movable counters with a movable controller having a series of arbitrarily adjustable elements mounted thereon, means for moving said ballot-sheet, counters and adjustable elements in unison, means for actuating a counter with each movement, and locking mechanism actuated by said controller for preventing more than a predetermined number of counters from being actuated.

13. The combination in a voting machine of a movable ballot-sheet, a plurality of series of groups of movable counters arranged to be moved in harmony therewith, means for successively moving said sheet and groups step-by-step, means for actuating a counter with each step, a controller arranged to be moved in harmony with said sheet and groups for limiting the number of counters to be registered by any one voter, means for producing a like step movement without actuating a counter representing a candidate, and means for withholding the action of said controller during said movement to enable the voter to exercise a choice within the limits of his legal privilege.

14. The combination in a voting machine of a ballot-sheet, a plurality of series of groups of counters arranged to bear a predetermined relation thereto, said sheet and counters being mounted to move a predetermined distance in harmony with each other, means for actuating said sheet and groups step-by-step, means for actuating any counter of any group during any predetermined step, means for moving the sheet and groups in like manner without actuating a counter representing a candidate, a movable controller having a plurality of pin holes therein, each of which is located to bear an arbitrary relation to the names upon the ballot-sheet, means for moving said controller in harmony with the movement of said ballot-sheet, locking mechanism for locking said actuating mechanism, and removable pins adapted to fit in the holes of said controller for bringing said locking mechanism into action.

15. The combination in a voting machine of a ballot-sheet mounted upon rolls in the form of an endless belt, a plurality of series of groups of counters, each series being mounted upon an endless chain, a revoluble controller having adjustable elements thereon for actuating a locking mechanism, said elements being arbitrarily arranged to conform to names of parties and candidates upon said ballot-sheet, keys representing separate political parties for moving said ballot-sheet, chains and controller step-by-step in unison, means for actuating one counter in a group with each key movement, a pass-key for causing said step-by-step movements without registration of a vote, and locking mechanism for locking said keys in conformity to the action of said controller.

16. The combination in a voting machine of a ballot-sheet having the names of parties with lists of party candidates thereon arranged in a predetermined order, a plurality of series of groups of counters, each series representing a party and each group a candidate, the groups conforming in relative position to the names upon the ballot-sheet, a controller having lock controlling elements arbitrarily located to conform in relative position to names of parties and candidates upon said ballot sheet, keys representing each party for moving said ballot-sheet, counter groups and controller step-by-step throughout a cycle, means for actuating a counter with each movement of a party-key, a pass-key for producing like steps without registration of a vote, locking mechanism actuated by said controlling elements for locking all of said keys at any stage in the cycle when the controller indicates that a voter's privilege is exhausted, and means for completing the cycle to bring the ballot-sheet, counters and controller to an initial position.

17. The combination in a voting machine of a movable ballot-sheet having a "proposition" space thereon in addition to lists of party candidates, a plurality of series of groups of counters, each group being arbitrarily arranged to represent a specific space upon said sheet, keys for actuating said ballot-sheet and counters step-by-step in unison, one of said keys representing a "yes" and the other a "no" vote applicable to said propositions, a pass-key for causing a step-by-step movement without registration of a vote, locking mechanism for locking all of the keys except the three enumerated, and a controller movable in harmony with said ballot-sheet for bringing said locking mechanism into action until said propositions are disposed of.

18. In a voting machine, the combination of a ballot-sheet having the names of candidates representing different political parties disposed thereon singly and in groups to represent individual offices or otherwise, of a plurality of series of groups of counters, each group in each series bearing a fixed relation to the name of a candidate upon said sheet, keys for moving said sheet and groups step-by-step in unison, means for registering a count with each step, a controller arranged to move in harmony with said sheet and counters, lock controlling elements thereon arranged singly and in groups to conform respectively to the location of the names upon said ballot sheet, and locking mechanism controlled by said elements to lock the keys when the lawful privileges of a voter are exhausted.

19. In a voting machine, the combination of a ballot sheet having the names of candidates representing different political parties disposed thereon singly and in groups to represent individual offices or otherwise, the names of candidates for each party being in vertical columns while those for the same office in all parties are in like horizontal lines, of a plurality of series of groups counters, each group in each series bearing a fixed relation to the name of a candidate upon said sheet, keys for moving said sheet and groups step-by-step in unison, means for registering a count with each step, a controller arranged to move in harmony with said sheet and counters, lock controlling elements thereon arranged singly and in groups to conform respectively to the location of the names upon said ballot-sheet, locking mechanism controlled by said elements to lock the keys when the lawful privileges of a voter are exhausted, means for partially moving a plurality of keys corresponding to any given horizontal line and then completing the movement in unison of all so actuated to enable combinations of groupings to be registered from different parties, and a pass-key for enabling a step-by-step movement to be made to pass the remainder of a group when a voter has selected from different parties a number corresponding to that in a given group.

20. The combination in a voting machine of a visible ballot-sheet protected against unauthorized manipulation, said sheet having thereon at least one stated measure to be voted upon in addition to separate party lists of candidates, separable movable indicators, one having a designated space to represent subject matter to be voted upon with signs indicating approval and disapproval, while upon the other indicator is designated the names of the several parties represented upon the ballot-sheet, means for moving the ballot-sheet, means for indicating a voting position, and means for displaying said indicators in the respective order in which the matter represented thereby is presented upon the ballot-sheet.

21. In a voting machine, a ballot-sheet movable by the voter to bring the subject matter to be voted upon to a voting position, register carriers movable in harmony with said ballot-sheet, and means operated by the machine for displaying a label to indicate to the voter the subject matter under immediate consideration.

22. In a voting machine, a ballot-sheet having thereon the names of party candidates disposed in parallel columns, with the names of different party candidates for like offices disposed in corresponding lines of said columns, register carriers arranged to conform to said columns with registering groups thereon adjusted to conform to the lines, means for actuating a plurality of registers representing different candidates in any one line until a certain number have been actuated to permit selection in group voting, and means for moving the ballot-sheet and register carriers without registration of a vote to pass the remainder of a given party group after the limit of selections have been made from different parties.

23. In a voting machine, a ballot-sheet having thereon the names of party candidates arranged in columns with groups of candidates in corresponding lines of different columns, register carriers arranged to conform to said columns with groups of registers in each disposed to conform to the relative position of said lines, means for moving said sheet to bring each successive line to a predetermined registering position, means for moving each row of groups to conform thereto, means for causing registration in a plurality of groups in any one line, means for limiting the registration to a number corresponding to that of a group of candidates, and means for passing the excess lines without registration of a vote after a number has been chosen from different parties equal to the full number of a group in one party.

24. In a voting machine, a movable ballot-sheet having thereon the names of party candidates disposed in parallel columns with the names of different candidates for like offices disposed in corresponding lines of said columns, register carriers, each having a series of groups of counters thereon, each carrier corresponding in position to that of a column and each group thereon to a name in a line of said column, key operated means for moving both ballot-sheet and register carriers step-by-step in unison, means for successively setting a number of keys to an abnormal position while said ballot-sheet and carriers are at rest, and means for reversing all of said keys by the movement of one to move said ballot sheet and carriers to register a vote in each of said series of groups.

25. In a voting machine, the combination with a counter carrying mechanism comprising a plurality of series of groups of numbering wheels, each series being mounted upon an endless carrier, a movably mounted ballot-sheet having the names of candidates thereon to be voted for, each name bearing a fixed relation to one of said numbering groups, a like carrier having like groups correspondingly located for registering waivers or privileges passed by a voter, keys corresponding to the several carriers for actuating them with said ballot-sheet step-by-step, means for registering a counter in any group of any predetermined series when a corresponding key is actuated, means for causing said carriers to complete a cycle after the registration of any one vote, and means for actuating a counter in each group of the pass privilege series after the last vote is registered by any given voter up to the end of the cycle, whereby a record may be made of privileges passed as a verifying factor in the final count.

26. In a voting machine, the combination of a plurality of series of groups of counters, each series being mounted upon an endless movable support, a ballot-sheet arranged to move synchronously with said movable supports, means for simultaneously moving said several series and ballot-sheet to initial positions respectively, means for displaying a label at the head of the ballot, to indicate measures to be voted upon, means for withdrawing said label after the last measure is disposed of by the voter, and means for presenting the several party names above each list of candidates.

27. In a voting machine, the combination of a plurality of series of groups of counters, each series being mounted upon an endless movable support, a ballot-sheet arranged to move synchronously with said movable supports, said sheet having thereon the names of party candidates disposed in parallel columns with the names of different candidates for like offices disposed in corresponding lines of said columns, candidates for offices having a number of members being arranged in groups, fragments of groups or individually, means for actuating said ballot-sheet and counters to enable a voter to exercise a choice either by voting for an entire group, a fraction of a group or specific individuals thereof, and means for locking the machine when the limit of choice has been reached to provide for minority representation.

28. In a voting machine, a ballot-sheet having thereon the names of party candidates disposed in parallel columns with the names of different candidates for like offices located in corresponding lines of said columns, register carriers for each of said columns together with one to indicate waivers in a separate column, each of said carriers having a series of groups of counters thereon, each carrier corresponding in position to that of a column and each group thereon to that of a name in a line of said column, key operated mechanism for moving both ballot-sheet and carriers step-by-step in unison, a pass-key, means for successively setting a number of voting keys to an abnormal position to provide for the movement of a counter in each of a series of groups, means for reversing all of said voting keys by the reversal of one and means for simultaneously locking said pass key.

29. In a voting machine, the combination with a ballot-sheet having the names of party candidates disposed in separate lists for voters whose privileges extend to all of the candidates, together with a separate list comprising candidates for whom voters having restricted privileges may vote, of an endless movable counter carrier for each list, each carrier being provided with a series of groups of counters arranged in conformity to the names in the list represented thereby, means for actuating a counter in any group of any series to register a vote, and means controllable by an authorized person for locking all of said counter-actuating means except that representing a restricted vote.

30. The combination in a voting machine adapted for the use of two classes of voters having different franchise privileges, of a movable ballot-sheet having thereon separate lists of party candidates for each of said classes of voters, a series of groups of counters mounted upon endless movable carriers, one for each list, means for registering a counter in any predetermined group, and means for locking all of the counters of one class while a voter in another class is exercising a privilege.

31. The combination in a voting machine adapted for the use of two classes of voters having different franchise privileges, of a movable ballot-sheet having thereon separate lists of party candidates for each of said classes, a plurality of series of groups of counters, each series representing a list and each group a candidate, the groups conforming in relative position to the names upon the ballot-sheet, a separate controller for each class of votes, each controller having lock controlling elements arranged to conform to the names in the list of the class to which it pertains, key actuated mechanism for actuating a counter in each group of each series, a pass-key applicable to the entire series, and means for locking all of the voting keys of one class while those of the other class are in use.

32. In a voting machine, a movable ballot-sheet having thereon the names of party candidates arranged in columns with the names of different candidates for like offices disposed in corresponding lines of said columns, register carriers, each having a series of groups of counters thereon each carrier corresponding in position to that of a column and each group thereon to a name in a line of said column, a corresponding carrier having like registers for independent voting, key operated mechanism for moving both ballot-sheet and carriers step-by-step in unison, a card-holder arranged to expose to the voter a portion of a card to permit him to write thereon, means for moving said card into a closed receptacle when the key for said independent carrier is actuated, and means for marking a number upon said card corresponding in position to a given group of counters upon said independent carrier.

33. A voting machine in which is combined a movable ballot-sheet having thereon the names of party candidates arranged in columns with the names of different candidates for like offices disposed in corresponding lines thereof, a register carrier for each column together with one for registering independent candidates not named upon the ballot-sheet, each carrier having a series of groups of counters thereon the relative positions of which bear fixed relations to names upon the ballot-sheet, key operated mechanism for moving said ballot-sheet and carriers respectively step-by-step in unison, a card-holder, means controlled by the key of said independent carrier for exposing a card with each registration of an independent vote and numbering means for numbering each card in conformity to the relative position of the counter registered therefor.

34. A voting machine in which is combined a movable ballot-sheet having thereon the names of party candidates arranged in columns with the names of different candidates for like offices disposed in corresponding lines thereof, a register carrier for each column together with one for registering independent candidates not named upon the ballot-sheet each carrier having a series of groups of counters thereon the relative positions of which bear fixed relations to those of the names upon the ballot-sheet, key-operated mechanism for moving said ballot-sheet and carriers respectively step-by-step in unison, a card-holder, means controlled by the key of said independent carrier for exposing a card with each registration of an independent vote, numbering means for numbering each card in conformity to the relative position of the counter registered therefor, and means for preventing access to a card at all times except when the key representing said independent vote is actuated.

35. In a voting machine, the combination of a movable ballot-sheet having thereon the names of party candidates disposed in parallel columns, register carriers each having a series of groups of counters thereon, each carrier corresponding in position to that of a column and each group to that of a name in said column, key operated mechanism for moving both ballot-sheet and register carriers step-by-step in unison to register a count, an indicator arranged to be located opposite to a party name upon a list of the several parties represented, and means controlled by said indicator for locking all of the keys except that of the party indicated.

36. In a voting machine, the combination of a movable ballot-sheet having thereon the names of party candidates disposed in separate columns, register-carriers each having a series of groups of counters thereon, each carrier corresponding in position to that of a column and each group to that of a name therein, key operated mechanism for moving both ballot-sheet and register carriers step-by-step in unison to register a count, a sliding bar having adustable blocks thereon for locking predetermined keys, an indicator for indicating any one of a plurality of parties, and means in operative connection therewith for moving said sliding bar to lock all of the keys except that representing the party designated by said indicator.

37. In a voting machine, the combination of a movable ballot-sheet having thereon the names of party candidates disposed in separate columns with the names of such candidates in one party as are to be indorsed by the votes of another disposed in corresponding lines of the latter, register carriers each having a series of groups of counters thereon, each carrier corresponding in position to that of a column and each group thereon to a name in a line of said column, key operated means for moving both ballot-sheet and register carriers step-by-step in unison, means for locking the keys in each column in which a given name in another column is repeated except that representing the party of a given voter, and means for actuating said locking means when a given key is moved to register an indorsement.

38. The combination in a voting machine of a ballot-sheet and a plurality of series of movable counters mounted to be moved in unison through a predetermined distance, means for moving the same step-by-step, separate means for moving the same throughout the entire distance by a single movement, and means for locking one moving means when the other is in an abnormal position.

39. In a voting machine, the combination of a series of movable counter carrying supports, each bearing a series of groups of counters, a ballot-sheet mounted to move in unison therewith, a plurality of voting levers corresponding to the different parties represented for actuating said supports and ballot-sheet in unison, means for actuating a counter in a group of a predetermined series by the movement of one of said levers, a main lever for moving said ballot-sheet and counter carrying supports throughout a cycle, and means for locking said main lever against movement when any one of said voting levers is actuated.

40. In a voting machine, the combination of a series of movable counter-carrying supports each provided with a series of groups of counters corresponding in position respectively to names upon a movable ballot-sheet, a movable ballot-sheet having the names of party candidates arranged in columns corresponding in position to the relative positions of said counter carrying supports, a series of voting levers for actuating said ballot-sheet and counter carriers step-by-step to actuate counters in any predetermined series, a main actuating element for simultaneously moving said ballot-sheet and counter carriers through a complete cycle, and means for locking one actuating element when the other is in an abnormal position.

41. The combination in a voting machine, of a ballot-sheet and a plurality of series of groups of movable counters mounted to be moved in unison through a cycle of a shaft having a gear-wheel thereon for each of said series of counters, a voting lever for each of said series, a rack-bar connected with said levers, but normally disconnected from said gears, and means for imparting a four motion movement to the free end of said bar to cause the teeth thereon to be brought into engagement with those of a corresponding gear to actuate the same when a voting lever is restored to its normal position, whereby the entire series of counters may be moved step-by-step by the movement of any one of said voting levers.

42. The combination in a voting machine of a ballot-sheet and a plurality of series of groups of movable counters mounted to be moved in unison through a given cycle of an actuating shaft having a gear-wheel thereon for each series of counters, a corresponding number of voting levers, a series of rack-bars having one end of each connected to one of said levers while the rack-bar thereon is in proximity to but normally disconnected from one of said gear-wheels, means for imparting a four-motion movement to the rack-portion of said bar to cause the teeth thereon to be brought into engagement with those of a gear-wheel when the voting lever connected therewith is restored to a normal position, and means for normally locking said actuating shaft against movement.

43. In a voting machine, the combination of a plurality of endless counter carrying members, counters mounted thereon, a ballot-sheet mounted to be moved in unison therewith, means for actuating the counters to register a vote, independent means for moving said counter carrying members and ballot-sheet throughout a complete cycle, means for locking the counters during said movement, and means for taking a printed impression from said counters upon said ballot-sheet during said cycle movement.

44. In a voting machine, the combination of a plurality of endless counter carrying, flexible supports, counters mounted at predetermined intervals thereon, a ballot-sheet having names of candidates positioned thereon to conform in substantial registration with the respective counters upon said supports, means for actuating said supports and ballot-sheet in unison, to complete a cycle and means for simultaneously taking an impression from said counters upon said ballot-sheet of a vote registered by said counters.

45. In a voting machine, the combination of a plurality of flexible, endless counter-carrying supports, counters mounted at predetermined intervals thereon, a ballot-sheet having names of candidates thereon, said names being positioned to conform in registration with the respective counters upon said supports, means for moving said supports and ballot-sheet step-by-step in unison, means for arbitrarily actuating any one of said counters during said movement to register a vote, means for locking all of said counters while leaving said supports free to be moved, means for moving said supports and ballot-sheet in unison through a complete cycle and means for taking an impression from said counters upon said ballot-sheet.

46. In a voting machine, the combination of a plurality of endless, counter-carrying supports, counters mounted at predetermined intervals thereon, a ballot-sheet having names of candidates thereon positioned to conform in registration with the respective counters upon said supports, separate means for mounting said ballot-sheet to enable it to be normally moved in unison with but out of contact with said counters, means for moving said counter-carrying and ballot carrying supports step by step in unison, means for arbitrarily actuating any one of said counters during said movement to register a vote, means for locking all of said counters while leaving said supports free to be moved, means for moving said supports and ballot-sheet in unison through a complete cycle and means for taking an impression from said counters upon said ballot-sheet.

47. In a voting machine, a plurality of series of groups of counters, each series representing a party, means for moving said series to complete a cycle, a ballot-sheet arranged to complete a cycle in unison with said several series of counters, independent voting levers corresponding to different parties for moving said counter groups and ballot-sheet step-by-step, means for locking all of said levers, means for locking all of said counters, a main actuating element for moving all of said series of groups of counters together with said ballot-sheet in unison to complete a cycle and means for taking an impression from said counters upon said ballot-sheet.

48. In a machine of the class described, the combination with a movable ballot-sheet having thereon the names of party candidates arbitrarily disposed, means for supporting and moving said ballot-sheet from end to end by each successive voter, a series of groups of movable counters for each party represented upon said sheet, each group corresponding in relative position to that of the name of a candidate upon said sheet, separate means for supporting and moving said counters, counter-actuating mechanism for each of said series of groups, means for locking the counter-actuating mechanism for each of the several series except that corresponding to a predetermined party while a vote is being registered, means for locking all of said counters, means for moving all of said counters and ballot-sheet in unison and means for taking an impression from said counters during said movement.

49. In a machine of the class described, the combination of a ballot-sheet having thereon the names of party candidates arbitrarily disposed, means for supporting said ballot-sheet, means for moving said supporting means to bring said ballot-sheet in printing relation to registering counters mounted upon independent supports, a series of groups of movable counters for each party represented upon said ballot-sheet, each group corresponding in relative position to that of the name of a candidate upon said sheet, counter actuating mechanism for each of said series of groups, means for passing names without registration, means for registering variations in choice among groups of candidates, means for locking said registering means when a given number in any given group has been registered, means for simultaneously locking all of said counters, means for moving said ballot supporting means and said counter supporting means in unison throughout a predetermined cycle and means for simultaneously taking an impression from said counters upon said ballot-sheet.

50. A voting machine in which is combined a plurality of series of groups of counters, each series being mounted upon an endless chain, each series representing a party and each group a candidate, a ballot-sheet having thereon the names of parties and candidates respectively arranged to correspond in relative position to said series of counters and groups, means for actuating predetermined groups of counters corresponding to the names upon said ballot-sheet, independent supporting means for supporting said ballot-sheet in spaced relation to said endless chains, means for moving said ballot-sheet and counters in unison and means for causing an impression to be taken from said counters upon said ballot-sheet.

51. The combination in a voting machine of a plurality of series of groups of counters arranged to bear a predetermined relation respectively to different parties and to the names of candidates upon a ballot-sheet, said counters being mounted upon a support adapted to be moved through a given cycle, a ballot-sheet, separate means for supporting the same to cause it to be moved throughout a corresponding cycle said sheet being normally out of contact with said counters, means for moving said counters and ballot-sheet through a cycle in synchronous relation to each other, and means for arbitrarily bringing one into printing relation to the other during any predetermined cycle.

52. The combination in a voting machine of a plurality of series of groups of counters arranged to bear a predetermined relation respectively to the names of parties and party candidates upon a ballot-sheet, means for supporting and moving said counters through a given cycle, a ballot-sheet mounted upon rollers in close proximity to but separated from said counters, means for actuating said rollers to cause said sheet to be moved through a cycle synchronously with the movement of said counters and means for taking an impression from said counters upon said ballot-sheet during said movement.

53. The combination in a voting machine of a plurality of series of groups of counters arranged to bear a predetermined relation respectively to the names of parties and party candidates upon a ballot-sheet, means for supporting and moving said counters through a given cycle to register a vote, a ballot-sheet, means for separately mounting the same to be moved through a corresponding cycle to serve as a chart in registering said vote, means for jointly moving both counters and ballot-sheet through a complete cycle at one movement, and means for taking an impression from said counters upon said ballot-sheet during said movement.

In testimony whereof, I have signed this specification in the presence of two subscribing witnesses, this fifth day of November 1910.

THEODORE P. CAULKINS.

Witnesses:
DAVID H. FLETCHER,
JENNIE L. FISKE.

Copies of this patent may be obtained for five cents each, by addressing the "Commissioner of Patents, Washington, D. C."